US009452593B2

(12) United States Patent
Tatarka et al.

(10) Patent No.: US 9,452,593 B2
(45) Date of Patent: Sep. 27, 2016

(54) MELT BLENDS OF AMORPHOUS CYCLOOLEFIN POLYMERS AND PARTIALLY CRYSTALLINE CYCLOOLEFIN ELASTOMERS WITH IMPROVED TOUGHNESS

(75) Inventors: Paul D. Tatarka, Union, KY (US); Timothy M. Kneale, Florence, KY (US)

(73) Assignee: TOPAS ADVANCED POLYMERS, INC., Florence, KY (US)

(*) Notice: Subject to any disclaimer, the term of this patent is extended or adjusted under 35 U.S.C. 154(b) by 1140 days.

(21) Appl. No.: 13/066,118

(22) Filed: Apr. 7, 2011

(65) Prior Publication Data

US 2011/0256373 A1 Oct. 20, 2011

Related U.S. Application Data

(60) Provisional application No. 61/342,527, filed on Apr. 15, 2010.

(51) Int. Cl.
*C08L 45/00* (2006.01)
*B32B 27/08* (2006.01)
*B32B 27/32* (2006.01)
*C08L 23/08* (2006.01)

(52) U.S. Cl.
CPC ............ *B32B 27/08* (2013.01); *B32B 27/325* (2013.01); *C08L 23/0823* (2013.01); *B32B 2250/03* (2013.01); *B32B 2250/242* (2013.01); *B32B 2250/40* (2013.01); *B32B 2307/412* (2013.01); *B32B 2307/558* (2013.01); *B32B 2307/714* (2013.01); *B32B 2307/7242* (2013.01); *Y10T 428/24992* (2015.01); *Y10T 428/31924* (2015.04)

(58) Field of Classification Search
CPC .................................................. B32B 27/08
USPC ................................................... 525/210, 211
See application file for complete search history.

(56) References Cited

U.S. PATENT DOCUMENTS

| 3,479,425 | A |   | 11/1969 | Lefevre et al. ............... 264/171 |
|---|---|---|---|---|
| 3,959,431 | A |   | 5/1976  | Nissel ........................... 264/171 |
| 4,166,083 | A |   | 8/1979  | Ueda et al. .................. 260/33.6 |
| 4,406,547 | A |   | 9/1983  | Aihara .......................... 356/414 |
| 4,418,178 | A |   | 11/1983 | DeWitt ............................ 525/97 |
| 4,874,808 | A |   | 10/1989 | Minami et al. ............... 524/291 |
| 4,918,133 | A |   | 4/1990  | Moriya et al. ................ 524/518 |
| 4,992,511 | A | * | 2/1991  | Yamamoto et al. ............ 525/97 |
| 5,278,214 | A |   | 1/1994  | Moriya et al. ................ 524/238 |
| 5,438,093 | A |   | 8/1995  | Stricharczuk et al. ....... 524/708 |
| 5,439,973 | A |   | 8/1995  | Yamamoto et al. ............ 525/66 |
| 5,494,969 | A |   | 2/1996  | Abe et al. ...................... 525/289 |
| 5,567,776 | A |   | 10/1996 | Tsuji et al. .................... 525/289 |
| 5,567,777 | A |   | 10/1996 | Tsuji et al. .................... 525/289 |
| 5,569,711 | A |   | 10/1996 | Yamamoto et al. ............ 525/66 |
| 5,574,100 | A |   | 11/1996 | Sagane et al. .................. 525/75 |
| 5,585,433 | A |   | 12/1996 | Yamamoto et al. ............ 525/66 |
| 5,648,443 | A |   | 7/1997  | Okamoto et al. ............. 526/281 |
| 5,693,728 | A |   | 12/1997 | Okamoto et al. ............. 526/115 |
| 5,837,787 | A |   | 11/1998 | Harrington ................... 526/160 |
| 5,912,070 | A |   | 6/1999  | Miharu et al. ................ 428/214 |
| 6,008,298 | A |   | 12/1999 | Hatke et al. .................. 525/210 |
| 6,068,936 | A |   | 5/2000  | Peiffer et al. ................. 428/500 |
| 6,090,888 | A | * | 7/2000  | Khanarian et al. ........... 525/88 |
| 6,489,016 | B2 |  | 12/2002 | Kishine ........................ 428/213 |
| 6,544,610 | B1 |  | 4/2003  | Minami et al. ............. 428/35.7 |
| 6,608,936 | B2 |  | 8/2003  | Boon ........................... 382/233 |
| 6,683,134 | B2 |  | 1/2004  | Miyamoto et al. ............ 525/70 |
| 7,026,401 | B1 |  | 4/2006  | Osan et al. ................... 525/191 |
| 7,267,855 | B2 |  | 9/2007  | Handlin, Jr. et al. ....... 428/34.1 |
| 7,365,130 | B2 |  | 4/2008  | Rivett et al. ................. 525/191 |
| 2005/0014898 | A1 | | 1/2005 | Kanai ......................... 525/163 |
| 2007/0007927 | A1 | | 2/2007 | Yang ............................. 525/88 |
| 2008/0033112 | A1 | | 2/2008 | Squire et al. ................ 525/240 |
| 2008/0300363 | A1 | | 12/2008 | Baugh et al. .................. 525/78 |

FOREIGN PATENT DOCUMENTS

| DE | 109 225 | 10/1974 | ................ C08F 1/42 |
|---|---|---|---|
| EP | 0 407 870 | 1/1991 | ............. C08F 32/08 |
| EP | 0 485 893 | 5/1992 | ............. C08F 32/08 |
| EP | 0 504 418 | 9/1992 | ........... C08F 210/00 |
| EP | 0 818 472 | 1/1998 | ................ C08F 4/54 |
| EP | 2008/018952 | 2/2008 | ............. C08L 23/02 |
| JP | 5-271 484 | 10/1993 | ............. C08L 23/02 |
| WO | WO 2008/018952 | 2/2008 | ............. C08L 23/02 |

OTHER PUBLICATIONS

Topas E-140 flyer, 2011.*
International Preliminary Report on Patentability; and Amendment and Response to Written Opinion of the International Searching UA Authority Under PCT Article 34 and PCT Rule 66.
Kirk-Othmer Encyclopedia of Chemical Technology, 3rd ed., vol. 16, pp. 385-499, Wiley 1981; and Internatinal Search Report and the Written Opinion of the International Searching Authority.

* cited by examiner

*Primary Examiner* — Irina Krylova
(74) *Attorney, Agent, or Firm* — Michael W. Ferrell

(57) ABSTRACT

A melt-blend resin composition prepared by melt-blending includes from 60 parts to 99 parts per hundred weight resin in the blend of an amorphous cycloolefin polymer composition exhibiting a glass transition temperature in the range of from 30° C. to 200° C.; and from 40 parts to 1 part per hundred weight resin in the blend of a partially crystalline, cycloolefin elastomer of norbornene and ethylene preferably having a glass transition temperature in the range of from −10° C. to 15° C. and a crystalline melting temperature in the range of from 60° C. to 125° C. and a % crystallinity by weight in the range of from 5% to 40%. The partially crystalline, cycloolefin elastomer optionally has a second glass transition temperature at less than −90° C.

20 Claims, 17 Drawing Sheets

FORCE-DEFORMATION DIAGRAM FOR TOUGH MATERIALS

FORCE-DEFORMATION DIAGRAM FOR BRITTLE MATERIALS

MELT BLENDS OF AMORPHOUS CYCLOOLEFIN POLYMERS AND PARTIALLY CRYSTALLINE CYCLOOLEFIN ELASTOMERS WITH IMPROVED TOUGHNESS

CROSS-REFERENCE TO RELATED APPLICATION

This application is based upon U.S. Provisional Patent Application Ser. No. 61/342,527, filed Apr. 15, 2010 of the same title. The priority of U.S. Provisional Patent Application Ser. No. 61/342,527 is hereby claimed and the disclosure thereof incorporated into this application in its entirety.

TECHNICAL FIELD

The present invention relates to melt blends of amorphous cycloolefin containing polymers with partially crystalline cycloolefin containing elastomers. A preferred embodiment is directed to melt blends of norbornene/ethylene resins which provides an improved property profile; especially improved toughness. Norbornene is also sometimes referred to as bicyclo[2.2.1]hept-2-ene or 2-norbornene:

Bicyclo[2.2.1]hept-2-ene

BACKGROUND

Polycycloolefin amorphous polymers (COP) and cycloolefin/acyclic olefin amorphous copolymers (COC) are known in the art and noteworthy for their superior transparency, barrier properties, chemical stability, solvent resistance and chemical purity. These materials are prepared as shown in Scheme I below:

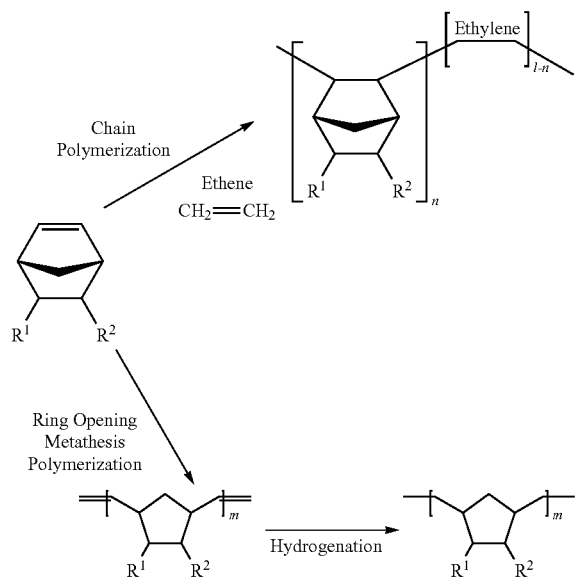

Scheme I

Cyclic olefin copolymers (COC) in particular are versatile transparent polymeric materials. The lack of mechanical durability or toughness in some aspects of COCs and COPs, especially brittleness (as opposed to ductility) has somewhat limited adoption of the material in some applications. Imparting additional durability into cycloolefin containing material without significantly compromising transparency and chemical purity has proven to be very difficult. Improving durability of COCs with respect to impact resistance, flexibility, and tear resistance is essential for this material to satisfy performance demands for new, challenging applications. Injection molding applications include durable and non-disposable medical devices, large capacity vials, cartridges and bottles, labware, and diagnostics. Injection blow molding and injection stretch blow molding can be used to make large size medical and consumer goods containers and housewares. Numerous attempts have been made to improve mechanical durability of cycloolefin compositions; however, recycle characteristics, transparency, and chemical purity have been particularly difficult to maintain while improving, for instance, impact resistance. See, for example, U.S. Pat. No. 5,438,093 to Stricharczuk et al., which discloses modified polycycloolefins including flame retardants, elastomer impact modifiers, fillers and so forth. See Col 7, lines 65, through Col. 10, line 33. One specific approach to providing more impact resistance to cycloolefin polymer compositions suggested in the art is to incorporate core/shell elastomers. See U.S. Pat. No. 6,683,134 to Miyamoto et al. as well as U.S. Pat. No. 5,574,100 to Sagane et al. Such compositions raise recycling issues as with other non-olefin components, discussed below.

U.S. Pat. No. 5,278,214 to Moriya et al. also discloses impact-modified cycloolefin based polymer compositions. These compositions generally include a specific cycloolefin-based polymer, a graft-modified elastomer and an amino compound which is reported to increase impact strength and gloss. See Col. 18. In addition to other components, the compositions may include additives such as an inorganic filler, an organic filler, a thermal stabilizer, a weathering stabilizer, an antistatic agent, an anti-slipping agent, an antiblocking agent, an anti-fogging agent, a lubricant, a pigment, a dye, natural oil, synthetic oil, wax, etc.

The following references disclose the use of Kraton styrene block copolymer elastomers in connection with cycloolefin copolymers:
- U.S. Pat. No. 7,365,130, issued Apr. 29, 2008, entitled "Cycloolefinic Copolymer for High Modulus Film", to Rivett et al.;
- U.S. Pat. No. 7,267,855, issued Sep. 11, 2007, entitled "Articles Prepared From Hydrogenated Controlled Distribution Block Copolymers", to Handlin, Jr. et al.;
- U.S. Pat. No. 6,544,610, issued Apr. 8, 2003, entitled "Container and Blow-Molded Product", to Minami et al.;
- U.S. Pat. No. 6,090,888, issued Jul. 18, 2000, entitled "Cyclic Olefin Polymer Blends Exhibiting Improved Impact Resistance and Good Transparency", to Khanarian et al.;
- U.S. Pat. No. 4,918,133, issued Apr. 17, 1990, entitled "Cycloolefin Type Random Copolymer Compositions", to Moriya et al.;
- U.S. Pat. No. 4,418,178, issued Nov. 29, 1983, entitled "Impact Modified Polymers of Cycloolefins", to DeWitt;
- U.S. Pat. No. 4,166,083, issued Aug. 28, 1979, entitled "Rubber Composition and Process for Preparation Thereof", to Ueda et al.;
- United States Patent Application Publication No. US 2008/0300363, published Dec. 4, 2008, entitled "Blends of Co-Precipitated Hydrogenated Ethylene-Dicyclpentadiene and Elastomeric Polymers to Provide Impact Modified Structural Polyolefins", of Baugh et al.;

U.S. Patent Application Publication No. US 2008/0033112, published Feb. 7, 2008, entitled "Polymer Compositions Comprising Cyclic Olefin Copolymers and Polyolefin Modifiers", of Squire et al.; and U.S. Patent Application Publication No. US 2007/0037927, published Feb. 15, 2007, entitled "Compatibilized Blends of ABS Copolymer and Polyolefin", of Yang.

U.S. Pat. No. 5,569,711 to Yamamoto et al. discloses cycloolefin resin compositions with elastomers and polyamides. The compositions are reported to have improved impact and grease resistance. See Cols. 33-34. See, also, U.S. Pat. Nos. 5,585,433 and 5,439,973 also to Yamamoto et al. The use of a polyamide negatively impacts recycle characteristics and introduces additional chemistry into the system.

U.S. Pat. No. 5,567,777 to Tsuji et al. discloses modified cycloolefin copolymers prepared with elastomer components which are reported to have improved impact resistance, strength and transparency. The process appears somewhat complex as are the compositions. See, also, U.S. Pat. No. 5,567,776, also to Tsuji et al. See, also, U.S. Pat. No. 5,494,969 to Abe et al. which discloses another resin composition wherein a cycloolefin resin is prepared in the presence of a cycloolefin elastomer.

United States Patent Application Publication No. US 2005/0014898 of Kanai discloses still another copolymer composition including a cycloolefin. There is provided in accordance with this publication a cyclic olefin based resin composition which includes: a cyclic olefin based resin (A); a modified cyclic olefin based resin (B) prepared by grafting and/or copolymerizing an unsaturated carboxylic acid or an unsaturated carboxylic acid anhydride to the cyclic olefin based resin (A); an olefinic elastomer (C); and a modified polyolefin (D) having an epoxy group, and in which a weight ratio of the component A to the component B, i.e. A/B, is in the range of $98/2$ to 2/98, a weight ratio of the component C to the component D, i.e. C/D, is in the range of $98/2$ to 2/98, and a ratio of the total weight of components A and B to the total weight of components C and D, i.e. (A+B)/(C+D), is in the range of $95/5$ to 50/50. Here, again, preparing the composition is relatively complex. See, also, U.S. Pat. No. 4,874,808 to Minami et al. and U.S. Pat. No. 7,026,401 to Osan et al. as well as Japanese Patent Publication JP 5271484.

It has been unexpectedly found in accordance with the present invention that partially crystalline cyclic olefin elastomers impart toughness or durability as seen in connection with ductility and impact resistance to brittle cycloolefin containing polymers, regardless of norbornene content, i.e. having a glass transition temperature in the range, for example, of 33° C. to 200° C., while maintaining superior optical properties and/or appearance of molded articles. Durable cycloolefin containing compositions can be extruded into thin and heavy gauge sheeting for thermoforming trays, containers, and so forth. Durable cycloolefin films can be used alone or coextruded with other polymers, especially polyolefins, to satisfy growing sustainably and resource conservation requirements for new flexible packaging applications, such as bags, pouches, forming films, and form-fill-and-seal films and the like.

Details of the invention will be appreciated from the discussion hereinafter provided.

SUMMARY OF INVENTION

The present invention is directed, in part, to an improved polymer composition including an amorphous cycloolefin containing resin melt-blended with an ethylene/cycloolefin, partially crystalline elastomer. The inventive blends exhibit unexpectedly superior toughness, such as high speed impact resistance anywhere from 2-25 times or more than that of the amorphous cycloolefin containing resin in the blend.

Another aspect of the invention is that the blended compositions provide unexpectedly superior resistance to stress whitening from flexing or otherwise stressing a part made from the inventive composition. There is shown in FIG. 1 a 2 mm thick test specimen of an invention melt blend (85% COC, 15% cycloolefin elastomer) which has been punctured in high speed impact testing in accordance with ASTM Test Method D 3763-08. It is seen that stress whitening is moderate and localized around the puncture produced by the hemispherical probe. There is shown in FIG. 2 a 2 mm thick test specimen which has also been punctured in high speed impact testing. The specimen of FIG. 2 was prepared from a melt blend of 80% COC and 20% Kraton styrene block copolymer (a thermoplastic elastomer of styrene, ethylene/butadiene). Here, there is severe stress whitening around the puncture which extends a substantial distance outwardly from the puncture, more than twice the diameter of the probe. There is also seen remote stress whitening around the 3" clamp hole where the test apparatus secures the test specimen. In this area, there is substantial flexing of the test specimen and phase separation is evident from the outer whitened ring seen in the photograph, which is separated or remote from the puncture of the specimen.

In one aspect of the invention, there is provided a melt-blend resin composition prepared by melt-blending (a) from 60 parts to 99 parts per hundred weight resin in the blend of an amorphous cycloolefin polymer composition exhibiting a glass transition temperature (Tg) in the range of from 30° C. to 200° C.; and (b) from 40 parts to 1 part per hundred weight resin in the blend of a partially crystalline, cycloolefin elastomer of norbornene and ethylene having a glass transition temperature (Tg) in the range of from −10° C. to 15° C. The partially crystalline cycloolefin elastomer may have multiple glass transitions (Tg); for example, one occurring at less than −90° C. and another which occurs in the range from −10° C. to 15° C.

The partially crystalline, cycloolefin elastomer of norbornene and ethylene generally has a crystalline melting temperature in the range of from 60° C. to 125° C. and a % crystallinity by weight in the range of from 2.5% to 40%, more preferably from 5 to 40% by weight.

Other aspects and advantages of the invention will become apparent from the discussion which follows.

BRIEF DESCRIPTION OF DRAWINGS

The invention is described in detail below with reference to the drawings wherein.

DETAILED DESCRIPTION

Figure 1:
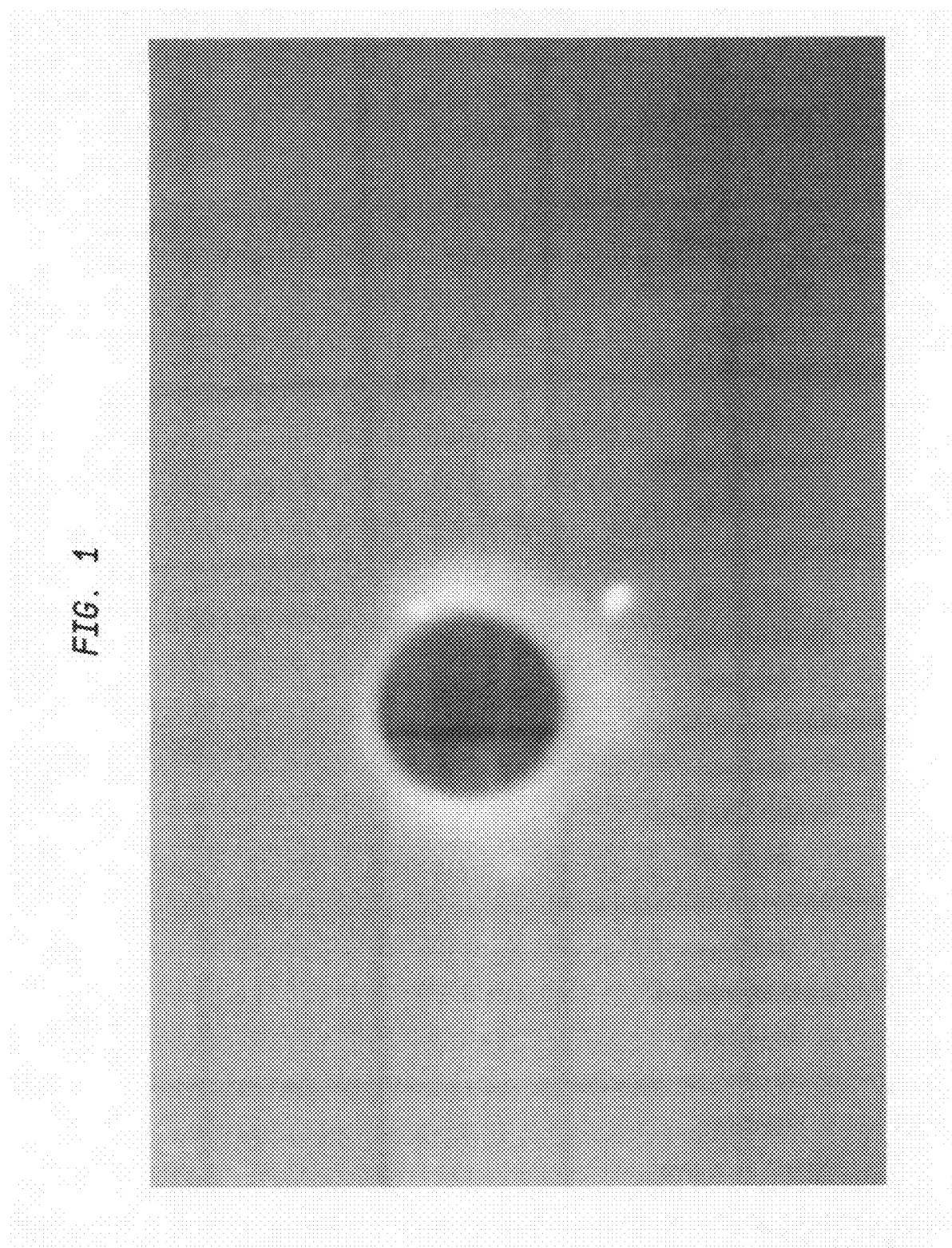
FIG. 1 is a photograph of a 2 mm thick test plaque which has been ruptured in high speed impact testing, the plaque having been injection-molded from a melt-blend of 15% partially crystalline cycloolefin elastomer and 85% amorphous COC resin.

The invention is described below with reference to numerous embodiments. Such discussion is for purposes of illustration only. Modifications to particular examples within the spirit and scope of the present invention, set forth in the appended claims, will be readily apparent to one of skill in the art.

Terminology used herein is given its ordinary meaning consistent with the exemplary definitions set forth immediately below; % means weight percent or mol % as indicated, or in the absence of an indication, refers to weight percent. mils refers to thousandths of an inch and so forth.

"Consisting essentially of" and like terminology refers to the recited components and excludes other ingredients which would substantially change the basic and novel characteristics of the composition or article. Unless otherwise indicated or readily apparent, a composition or article consists essentially of the recited components when the composition or article includes 90% or more by weight of the recited components. That is, the terminology excludes more than 10% unrecited components.

A "film" refers to a planar structure of generally uniform thickness having a thickness (gauge) of 10 mils or less. Typical film structures have thicknesses of from 2 to 8 mils, in many cases 4-6 mils; while thicker extruded planar structures are generally referred to as sheet.

"Amorphous cycloolefin polymer" and like terminology refers to a COP or COC polymer which exhibits a glass transition temperature, but does not exhibit a crystalline melting temperature nor does it exhibit a clear x-ray diffraction pattern.

"COC" polymer and like terminology refers to a cyclolefin copolymer prepared with acyclic olefin monomer and cycloolefin monomer by way of addition copolymerization.

"COP polymer" and like terminology refers to a cycloolefin containing polymer prepared exclusively from cycloolefin monomer, typically by ring opening polymerization.

Molecular weight of the amorphous cycloolefin copolymer is determined by means of gel permeation chromatography (GPC) in chloroform at 35° C., with the aid of an IR detector; the value is relative and based on a calibration using narrow-distribution polystyrene standards. The molecular weight of the cycloolefin polymers or copolymers can be controlled in a known manner by introduction of hydrogen, variation of the catalyst concentration or variation of the temperature. Molecular weight of the partially crystalline cycloolefin elastomers is measured by high temperature molar mass GPC in 1,2,4-trichlorobenzene at 140° C. using an appropriate standard and IR detector. Unless otherwise indicated, molecular weight refers to the weight average molecular weight.

Melt Volume Rate is measured in accordance with ISO Test Method 1133 at a load of 2.16 kg and a temperature of 260° C. for the partially crystalline cycloolefin elastomer and at a temperature of 230° C. for the amorphous cycloolefin polymer.

"Melt-blended" and like terminology refers to a process whereby polymers which are already formed such as COP, COC and COC elastomers are blended together in a molten state. Preferably, the COP, COC and COC elastomer polymers are substantially unreactive with each other and during the blending process as opposed to processes involving in situ polymerization and/or reaction between rigid polymer and elastomer ingredients as described in U.S. Pat. Nos. 7,026,401; 5,567,776; 5,494,969; 4,874,808; United States Patent Application Publication No. US 2005/0014898 and Japanese Publication No. JP 5271484 referred to above.

"Partially crystalline cycloolefin elastomer of norborene and ethylene", and like terminology refers to a partially crystalline elastomer which contains cycloolefin repeat units, exhibits both a glass transition temperature and a melting point and rubbery modulus at room temperature and below. A typical elastomer, for example, is an ethylene/norbornene copolymer elastomer having a norbornene content of about 8-9 mol %, with a target of 8.5 mol %. It is seen hereinafter that partially crystalline COC elastomers may exhibit a rubbery modulus plateau between about 10° C. and 20° C. and 80° C. and 90° C. As to thermal properties and crystallinity, these polymers optionally feature two glass transition temperatures of about 6° C. and below about −90° C. as well as an exemplary crystalline melting point of about 84° C. These polymers exhibit flexibility and elastic behavior, that is, elongation before breaking of up to 200% and more at temperatures as low as −50° C. and below as is discussed herein in connection with FIGS. 6, 7. Unlike amorphous COP and COC polymers, these COC elastomers typically contain between 10 and 30 percent crystallinity. While these materials are typically prepared by the catalytic reaction of norbornene and ethylene as hereafter described, additional monomers may be included if so desired. Likewise, the materials may include grafted on units and crosslinkers if so desired and polymerization techniques such as ring opening metathesis may be employed. Preferably, the partially crystalline, cycloolefin elastomer of norbornene and ethylene is predominantly, more than 50% by weight, norbornene and ethylene repeat units, more preferably more than 80% by weight norbornene and ethylene repeat units and still more preferably, more than 90% by weight norbornene and ethylene repeat units.

"Relative impact strength" and like terminology refers to the ratio of the impact strength (total energy) of an article made from a melt blend of the invention to the impact strength (total energy) of the same article made from the amorphous cycloolefin resin in the blend alone. For example, an article made from a mixture of 40/40/20 COC1/COC2/COC elastomer is compared with an article made from COC1/COC2 in a 50/50 ratio. For film and sheet Test Method ISO 7765-2 1994E, the disclosure of which is incorporated herein by reference, is used, utilizing the same test specimen geometry and preparation, testing equipment and parameters for the invention film and the film made from the amorphous copolymer composition alone. An extrusion cast film or sheet is preferred for testing in connection with film and sheet products. For injection molded articles, Test Method ASTM D3763-08, the disclosure of which is incorporated herein by reference, is used, utilizing the same test specimen geometry, preparation, testing equipment and parameters for the invention article and the article made from the amorphous cycloolefin resin composition alone. A planar, injection molded plaque is preferred for testing in connection with injection molded articles. In all cases, total energy refers to total energy to penetration unless specified otherwise.

A melt-blend of the invention exhibits characteristic localized stress whitening only as seen in FIG. 1 upon high speed impact testing in accordance with ASTM Test Method D3763-08 on a 2 mm thick injection-molded test specimen; that is, stress whitening occurs only contiguously to the puncture and there is no stress whitening at the clamp or other areas in the specimen remote to the puncture. "Localized stress whitening only" means that there is no stress whitening spaced apart (remote) from the puncture by this test method. The characteristic localized stress whitening index is calculated from a 2 mm thick test specimen which has been tested in accordance with ASTM Test Method D 3763-08 by measuring the average distance that stress whitening extends from the periphery of the puncture and dividing by the diameter of the probe; that is, 12.7 mm unless specified otherwise. It will be appreciated from the foregoing that exhibiting characteristic localized stress whitening only and a characteristic localized whitening index are inherent properties of the melt-blend and not restricted to any particular use or fabricated article.

Unless otherwise indicated, the Tg of the polymers was determined by the Perkin Elmer "half Cp extrapolated" (the "half Cp extrapolated" reports the point on the curve where the specific heat change is half of the change in the complete transition) following the ASTM D3418 "Standard Test Method of Transition Temperatures of Polymers by Thermal Analysis" (American Society for Testing of Materials, Philadelphia, Pa.).

Storage Modulus, E' and Loss Modulus, E", are measured by dynamic mechanical analysis (DMA), following ASTM D5026-06 and ASTM D4065-06 Test Methods, employing frequency of 1.0 Hz and a heating rate of 2° C. per minute over a temperature range of from −120° C. to 150° C. Storage or loss modulus may alternatively be measured in accordance with test methods ASTM D5279-08 (torsion) or ASTM D5023-07 (flexure).

Haze is determined in accordance with ASTM Test Method D 1003-00B. Haze values for nominal thicknesses are used to normalize haze to a particular thickness. A nominal thickness haze value is calculated for a film by multiplying the measured haze of a specimen by the nominal thickness and dividing by the actual thickness of the specimen upon which haze was measured. For example, the 6 mil haze value is calculated from haze measured on a 5 mil sample by multiplying by 6/5 or 1.2.

Unless otherwise indicated, a Test Method in effect as of Mar. 1, 2010 is utilized.

Figure 3:
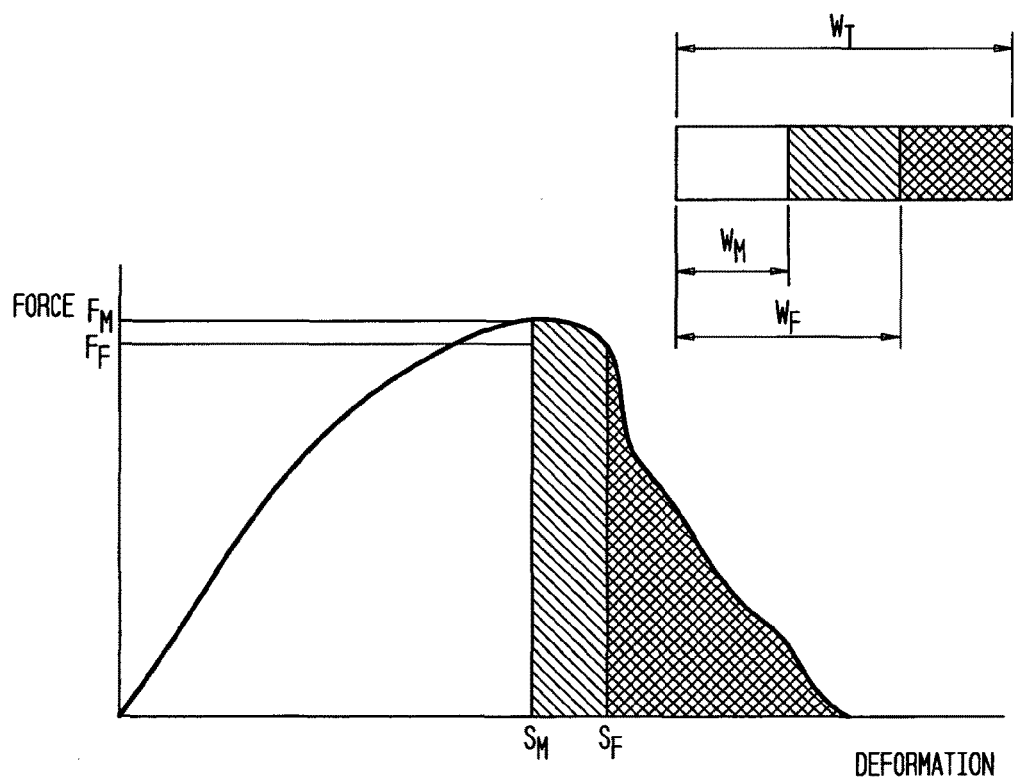
FIG. 3 is a schematic diagram showing the force-deformation characteristics for a relatively tough polymeric material.
Figure 4:
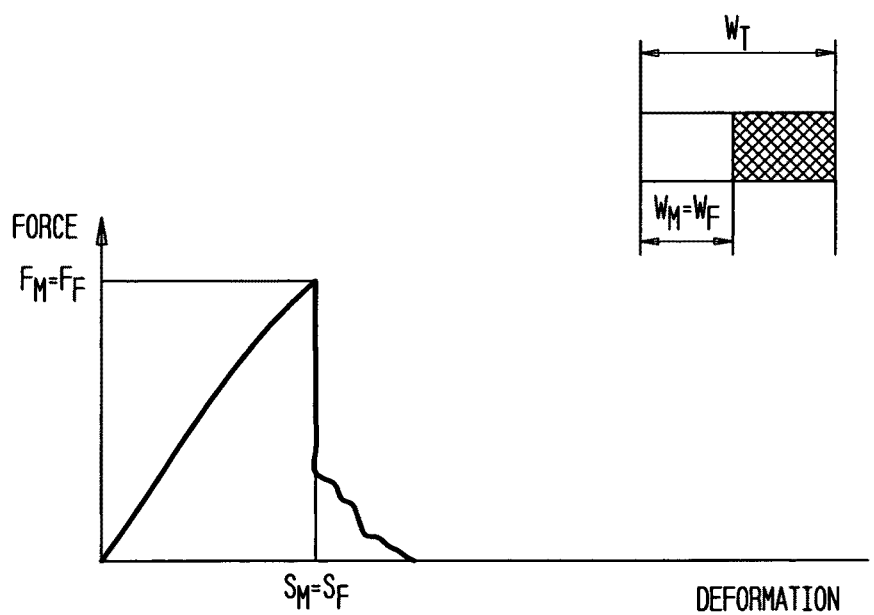
FIG. 4 is a schematic diagram showing the force-deformation characteristics for a relatively brittle polymeric material.

The present invention resides, in part, in the discovery that partially crystalline cycloolefin copolymers are readily melt-blended with amorphous COP or COC materials to provide unexpected benefits in terms of toughness and appearance of the compositions so produced, especially high-speed impact resistance. Most real world impacts are biaxial rather than unidirectional. Further complication is offered by different failure modes: ductile or brittle. Brittle materials take little energy to start a crack, little more to propagate it to a shattering climax. Other materials possess ductility to varying degrees. Highly ductile materials fail by puncture in drop weight testing and require a high energy load to initiate and propagate the crack. In a great many uses for plastics, relatively ductile behavior is desirable or required (FIG. 3). A recognized drawback associated with cycloolefin containing polymers, either COP or COC, is their relative brittleness as compared, for example, with thermoplastic polyester such as polyethylene terephthalate. Various test methods have been developed to characterize the ductile/brittle characteristics of polymers, for example, test method ASTM D3763-02 which characterizes Ductile Failure as a failure where the specimen deforms plastically before fracturing. The specimen is in one piece after the penetration and the deformed material exhibits plastic flow. This test method characterizes Brittle Failure as a failure where the specimen test area is broken into two or more pieces, with sharp edges and shows almost no plastic flow (FIG. 4).

Test Method ISO7765-2:1994(E) measures high speed impact properties by methodology wherein the test specimen is penetrated normal to its plane by a striker at a nominally uniform velocity. The resulting force-deformation or force-time diagram is electronically recorded. The test specimen is firmly clamped during the test. The force-deformation diagram obtained in these tests shows several features of the material's behavior under impact. For example, the fracture may be "brittle", "ductile", "tough", or characterized by initial damage or by crack initiation and propagation. In addition, dynamic effects may be present, such as load-cell/indentor resonance, specimen resonance and initial contact/inertia peaks. The various features which may be characterized by this method include:

Peak force, $F_M$: The maximum force exerted by the striker in the direction of impact during a test (see FIGS. 3-4).

Deformation at peak force, $s_M$: The deformation in the direction of impact at the centre of the test specimen corresponding to the peak force. For materials exhibiting a peak-force plateau, the deformation is taken at the centre of the plateau.

Energy at peak force, $W_M$: The area under the force deformation curve bounded by the origin, the peak force and the deformation at peak force (see FIGS. 3-4).

Total penetration energy, $W_T$: The total energy expended in penetrating the test specimen (see FIGS. 3-4).

Failure force, $F_F$: The force exerted by the striker in the direction of impact, measured at the failure point (see FIGS. 3-4).

Failure deformation, $s_F$: The deformation in the direction of impact at the centre of the test specimen, measured at the failure, point (see FIGS. 3-4).

Failure energy $W_F$: The area under the force-deformation curve bounded by the origin, the failure force and the failure deformation (see FIGS. 3-4)

These features are illustrated in FIG. 3 for tough (relatively ductile), polymer materials, and in FIG. 4 for brittle polymeric materials. It is seen from the Figures that for relatively tough material, the energy at peak force is substantially less than the energy at failure, while the energy at peak force for brittle materials approximates the energy at failure; in other words, the material fractures at peak load rather than undergo ductile or plastic deformation. Another fundamental difference between tough versus brittle materials is that the energy to failure and the energy to penetration is much greater for relatively tough material as opposed to brittle materials. In accordance with the invention, the impact energy to failure and energy to penetration of the melt blends is typically at least 2-3 times than that of the amorphous cyclolefin containing resins in the blend and may be much higher.

Amorphous Cyclolefin Containing Polymers

Cycloolefins are mono- or polyunsaturated polycyclic ring systems, such as cycloalkenes, bicycloalkenes, tricycloalkenes or tetracycloalkenes. The ring systems can be monosubstituted or polysubstituted. Preference is given to cycloolefins of the formulae I, II, III, IV, V or VI, or a monocyclic olefin of the formula VII:

(I)

(II)

(III)

(IV)

(V)

(VI)

(VII)

wherein $R^1$, $R^2$, $R^3$, $R^4$, $R^5$, $R^6$, $R^7$ and $R^8$ are the same or different and are H, a $C_6$-$C_{20}$-aryl or $C_1$-$C_{20}$-alkyl radical or a halogen atom, and n is a number from 2 to 10.

Specific cycloolefin monomers are disclosed in U.S. Pat. No. 5,494,969 to Abe et al. Cols. 9-27, for example the following monomers:

Bicyclo[2.2.1]hept-2-ene (=norbornene)

5-Methylbicyclo[2.2.1]hept-2-ene

10-Methyltricyclo [4.4.0.1$^{2,5}$]-3-undecene;

Tetracyclo [4.4.0.1$^{2,5}$.1$^{7,10}$]-3-dodecene,

Pentacyclo- [7.4.0.1$^{2,5}$.1$^{9,12}$.0$^{8,13}$]-3-pentadecene

Hexacyclo- [6.6.1.1$^{3,6}$.1$^{10,13}$.0$^{2,7}$.0$^{9,14}$]-4-heptadecene and so forth. The disclosure of U.S. Pat. No. 5,494,969 to Abe et al. Cols. 9-27 is incorporated herein by reference.

The above described cycloolefin monomers are incorporated into either COC or COP material in accordance with Scheme I above.

U.S. Pat. No. 6,068,936 and U.S. Pat. No. 5,912,070 disclose several cycloolefin polymers and copolymers, the disclosures of which are incorporated herein in their entirety by reference. Cycloolefin polymers useful in connection with the present invention can be prepared with the aid of transition-metal catalysts, e.g. metallocenes. Suitable preparation processes are known and described, for example, in DD-A-109 225, EP-A-0 407 870, EP-A-0 485 893, U.S. Pat. Nos. 6,489,016, 6,008,298, as well as the aforementioned U.S. Pat. Nos. 6,608,936, and 5,912,070, the disclosures of which are all incorporated herein in their entirety by reference. Molecular weight regulation during the preparation can advantageously be effected using hydrogen. Suitable molecular weights can also be established through targeted selection of the catalyst and reaction conditions. Details in this respect are given in the abovementioned specifications.

Particularly preferred cycloolefin copolymers include cycloolefin monomers and acyclic olefin monomers, i.e. the above-described cycloolefin monomers can be copolymerized with suitable acyclic olefin comonomers. A preferred comonomer is selected from the group consisting of ethylene, propylene, butylene and combinations thereof. A particularly preferred comonomer is ethylene. Preferred COCs contains about 10-80 mole percent of the cycloolefin monomer moiety and about 90-20 weight percent of the olefin moiety (such as ethylene). Cycloolefin copolymers which are suitable for the purposes of the present invention typically have a mean molecular weight $M_w$ in the range from more than 200 g/mol to 400,000 g/mol. COCs can be characterized by their glass transition temperature, Tg, which is generally in the range from 20° C. to 200° C., preferably in the range from 30° C. to 130° C. In one preferred embodiment the cyclic olefin polymer is a copolymer such as TOPAS® 8007F-04 which includes approximately 36 mole percent norbornene and the balance ethylene. TOPAS® 8007F-004 has a glass transition temperature of about 78° C. Other preferred embodiments include melt blends of partially crystalline cycloolefin elastomer and amorphous COC materials with low glass transition temperatures. One preferred material for blending with partially crystalline cycloolefin elastomer is TOPAS® 9506-04 which has a Tg of about 68° C. Still another preferred amorphous COC for blending with partially crystalline cycloolefin elastomer is TOPAS® 9903D-10 which has a glass transition temperature of about 33° C.

Figure 5:
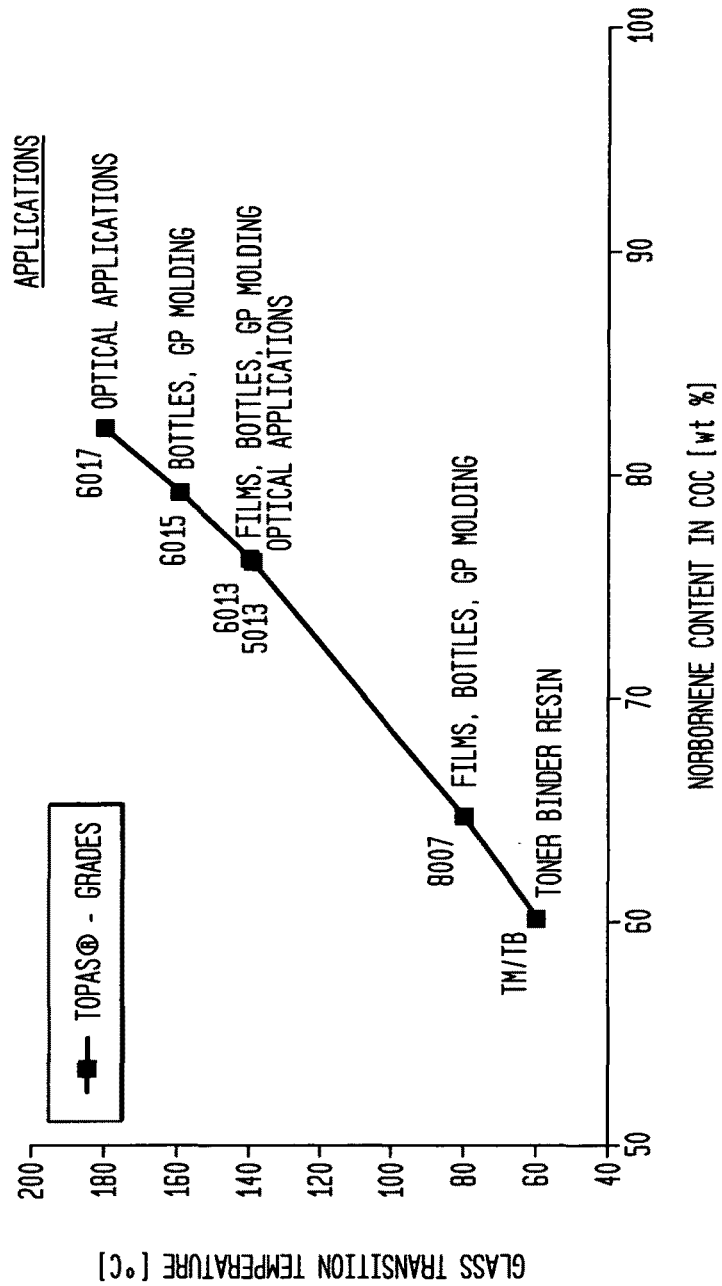
FIG. 5 is a plot of glass transition temperature (Tg) vs. norbornene content for amorphous COC resins.

COCs are particularly preferred because their temperature performance can be tailored by changing the cycloolefin content of the polymer. There is shown in FIG. 5 a plot of glass transition temperature versus norbornene content for various commercial grades to TOPAS® COC materials.

Table 1 lists molecular weights of specific COC material and COC elastomer, specifically TOPAS® Elastomer E-140 ("E-140") material discussed hereinafter.

TABLE 1

| Melt Volume Flow Rate and Molecular Weight for TOPAS ® Materials | | | | | | | |
|---|---|---|---|---|---|---|---|
| | Units | E-140 | 9903-D10 | 9506F-04 | 8007F-04 | 8007F-400 | 6013F-04 |
| Melt Volume Rate at 260° C.; 2.16 kg load Method: ISO 1133 | ml/10 min | 12 | 8 | — | 32 | — | 14 |
| Melt Volume Rate at 230° C.; 2.16 kg load Method: ISO 1133 Weight Average Molecular Weight ($M_w$) | ml/10 min | — | 3.3 | 6 | 12 | 11 | 1 |
| Chloroform at 35° C. | kg/mol | — | 138 | 114 | 98 | — | 87 |
| 1,2,4 Trichlorobenzol at 140° C. Method GPC Number Average Molecular Weight ($M_n$) | kg/mol | 154 | — | — | — | — | — |
| Chloroform at 35° C. | kg/mol | — | 42 | 55 | 40 | — | 40 |
| 1,2,4 Trichlorobenzol at 140° C. Method GPC | kg/mol | 68 | — | — | — | — | — |
| Polydispersity | | 2.26 | 3.29 | 2.07 | 2.45 | — | 2.18 |

Suitable COC material is also available from Mitsui Petrochemical Industries of Tokyo, Japan. Suitable COP materials are available from Zeon Chemicals of Louisville K.Y., under the trade name of Zeonex®, or from JSR Corporation of Tokyo, Japan, under the trade name of Arton®.

Cycloolefin Copolymer Elastomers

COC elastomers are elastomeric cyclic olefin copolymers also available from TOPAS Advanced Polymers. E-140 polymer features two glass transition temperatures, one of about 6° C. and another glass transition below −90° C. as well as a crystalline melting point of about 84° C. Unlike completely amorphous TOPAS COC grades, COC elastomers typically contain between 10 and 30 percent crystallinity by weight. Typical properties of E-140 grade appears in Table 2:

TABLE 2

E-140 Elastomer Properties

| Property | Value | Unit | Test Standard |
|---|---|---|---|
| Physical Properties | | | |
| Density | 940 | kg/m³ | ISO 1183 |
| Melt volume rate (MVR) - @ 2.16 kg/190° C. | 3 | cm³/10 min | ISO 1133 |
| Melt volume rate (MVR) - @ 2.16 kg/260° C. | 12 | cm³/10 min | ISO 1133 |
| Hardness, Shore A | 89 | — | ISO 868 |
| WVTR - @ 23° C./85 RH | 1.0 | g*100 μm/m² * day | ISO 15106-3 |
| WVTR - @ 38° C./90 RH | 4.6 | g*100 μm/m² * day | ISO 15106-3 |
| Mechanical Properties | | | |
| Tensile stress at break (50 mm/min) | >19 | MPa | ISO 527-T2/1A |
| Tensile modulus (1 mm/min) | 44 | MPa | ISO 527-T2/1A |
| Tensile strain at break (50 mm/min) | >450 | % | ISO 527-T2/1A |
| Tear Strength | 47 | kN/m | ISO 34-1 |
| Compression set - @ 24 h/23° C. | 35 | % | ISO 815 |
| Compression set - @ 72 h/23° C. | 32 | % | ISO 815 |
| Compression set - @ 24 h/60° C. | 90 | % | ISO 815 |
| Thermal Properties | | | |
| Tg—Glass transition temperature (10° C./min) | 6 <−90 | ° C. | DSC |
| $T_m$—Melt temperature | 84 | ° C. | DSC |
| Vicat softening temperature, VST/A50 | 64 | ° C. | ISO 306 |

Figure 6:
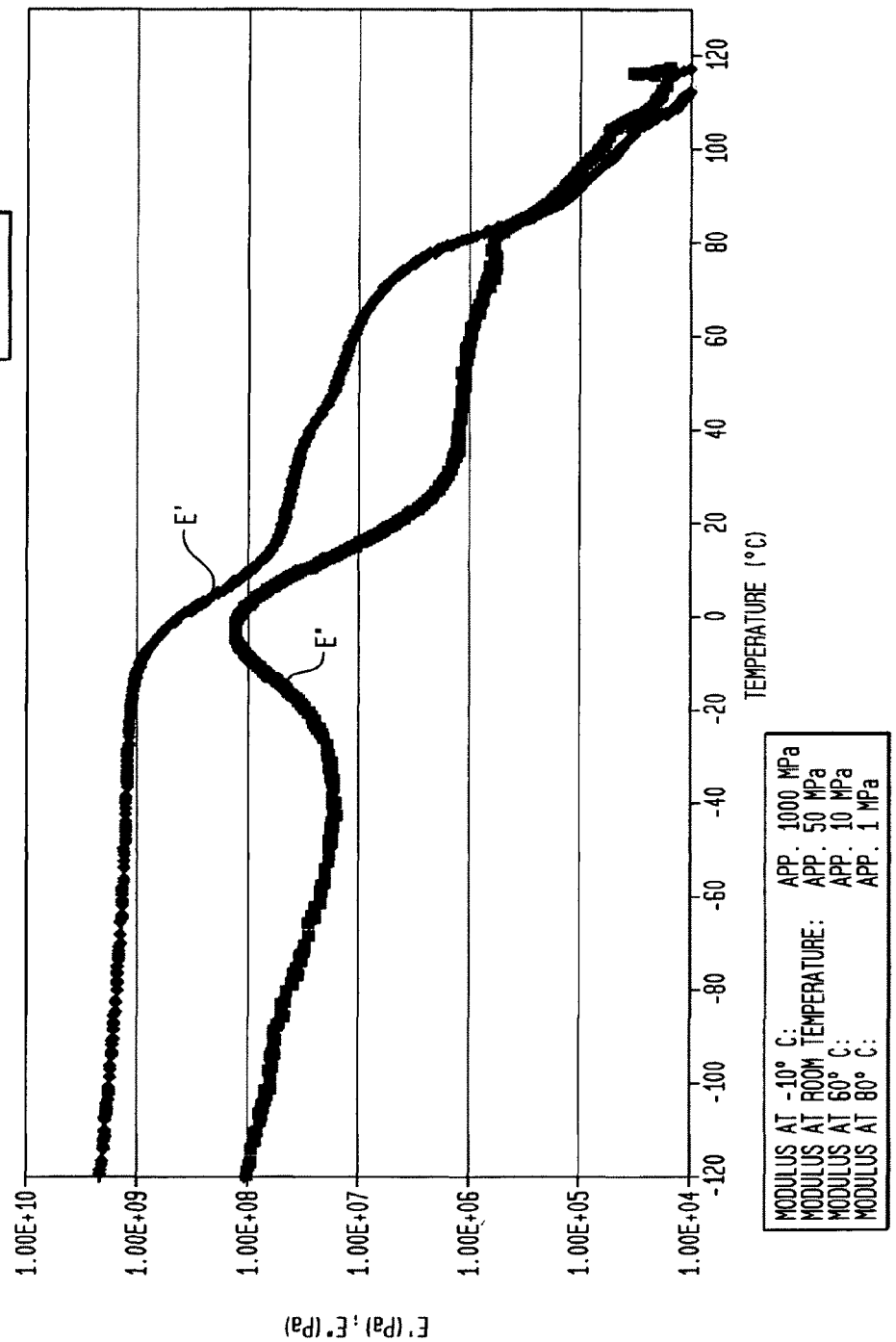
FIG. 6 is a plot of Storage Modulus, E' and Loss Modulus, E", vs. temperature for norbornene/ethylene elastomer.
Figure 7:
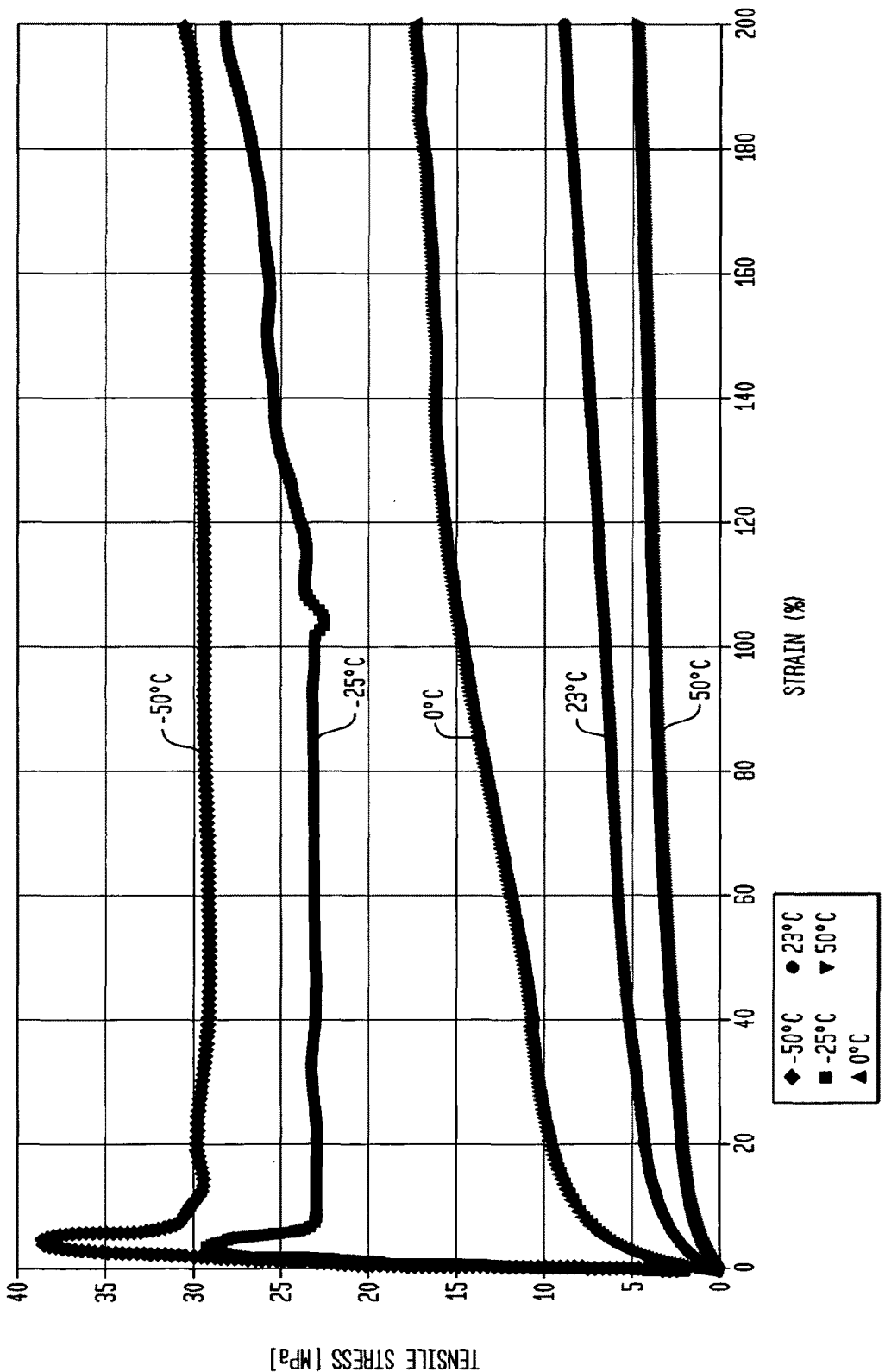
FIG. 7 is a plot of stress versus strain for partially crystalline cycloolefin elastomer, at temperatures of from 50° C. to −50° C.

As seen above, E-140 has multiple glass transitions (Tg); one occurs at less than −90° C. and the other occurs in the range from −10° C. to 15° C. There is shown in FIG. 6 a plot of Storage Modulus, E' and Loss Modulus, E", versus temperature for E-140 copolymer elastomer having a norbornene content of about 8%-9% (mol %). Testing was conducted following ASTM D5026-06 and ASTM D4065-06 test methods. It is seen the partially crystalline COC elastomer exhibits a rubbery modulus plateau between about 10-20° C. and 80-90° C. The partially crystalline, ethylene/norbornene copolymer elastomer may have a norbornene content of from 1-20 mol % provided performance criteria are met.

It is seen from FIG. 6 that the cycloolefin elastomer exhibits a Storage Modulus between $10^6$ Pa and $10^8$ Pa over a temperature range of from 20° C. to 70° C. The material remains elastic and flexible over a much wider temperature range as can be appreciated from FIG. 7 which provides data for the E-140 grade.

COC elastomer generally has very broad service temperature range, which means the material will retain useful mechanical properties, especially flexibility, from <−90° C. to about 90° C. For example, in FIG. 7, tensile stress-strain of E-140 shows excellent ductility, in excess of 200 percent strain measured at −50° C., −25° C., 0° C., 23° C. and 50° C. E-140 typically exhibits an elongation at break of at least 50%, more typically at least 100% and preferably at least 200% at a temperature of −50° C. Elongation may be measured in accordance with ISO 527-T2/1A or any other suitable method. The upper limit is not precisely known but may be up to 300%, 500% or event 1000% at 0° C.

Under ISO 974: 2000(E) Determination of the Brittleness Temperature by Impact, E-140 did not fail at test temperatures of −50° C., −60° C., −70° C., −80° C. and −90° C. Failure is defined as breakage or any crack visible by the naked eye. Therefore, COC elastomers are suitable for device and packaging applications subject to cryogenic, freezer and refrigerator environments.

TABLE 2A

Low Temperature Brittleness Testing of Elastomer

| | |
|---|---|
| Material | E-140 2 MM |
| Test Speed | 2000 ± 200 mm/s |
| Specimen Dimensions | 20 ± 0.25 mm long by 2.5 ± 0.05 mm wide and 2.0 ± 0.1 mm thick |
| Specimen Preparation | Die Punched from supplied material in machine direction 3 ± 0.5 minutes at test temperature |
| Test Equipment | Standard Scientific CS-153A-3 |
| Heat Transfer Medium | Methanol |
| Mounting Torque | 5 in-lb |

COC ELASTOMERS likewise have excellent abrasion resistance as is seen in Table 2B:

TABLE 2B

Abrasion resistance testing of Elastomer

| | |
|---|---|
| Material | E-140 2 mm |
| Testing load | 10N |
| Specimen Dimensions | Circular plaque with diameter of 16 ± 0.25 mm and thickness of 2.0 ± 0.1 mm |
| Specimen Preparation | Punched from supplied material with circular die with |
| Test Equipment | DIN abrasion tester according to ISO 4649 |

Abrasion resistance of untreated TOPAS Elastomer E-140 is already very good as indicated by the low abrasion volume of 18 ml observed in a test run according to ISO 4649. Crosslinked material has even better mechanical properties as discussed hereinafter.

COC elastomers also have excellent electrical insulating properties. Dielectric constant (or relative permittivity) for E-140 is at or about 2.24, 2.21 and 2.27 at respective frequencies of 1, 5 and 10 GHz. Dissipation factor is at or about 0.00025, 0.00033 and 0.00028 at these same respective frequencies. Testing was conducted in accordance with the guidelines of ASTM D2520-01, Test Method B—Resonant Cavity Perturbation Technique.

Without intending to be bound by any particular theory, it is believed that the suitable COC elastomers have a very low norbornene-ethylene-norbornene (NEN) triad content and have 2 distinct block portions. One set of polymer blocks is thought to have a relatively high norbornene content and cannot crystallize, while another set of polymer block copolymers is thought to have a relatively low norbornene content and can partially crystallize.

Generally, suitable partially crystalline elastomers of norbornene and ethylene include from 0.1 mol % to 20 mol % norbornene, have a glass transition temperature of less than 30° C., a crystalline melting temperature of less than 125° C. and 40% or less crystallinity by weight. Particularly preferred elastomers exhibit a crystalline melting temperature of less than 90° C. and more than 60° C. Cycloolefin elastomers useful in connection with the present invention may be produced in accordance with the following: U.S. Pat. Nos. 5,693,728 and 5,648,443 to Okamoto et al.; European Patent Nos. 0 504 418 and 0 818 472 (Idemitsu Kosan Co., Ltd. and Japanese Patent No. 3350951, also of Idemitsu Kusan Co., Ltd., the disclosures of which are incorporated herein by reference.

Other norbornene/α-olefin copolymer elastomers are described in U.S. Pat. No. 5,837,787 to Harrington et al., the disclosure of which is incorporated herein by reference.

Figure 8:
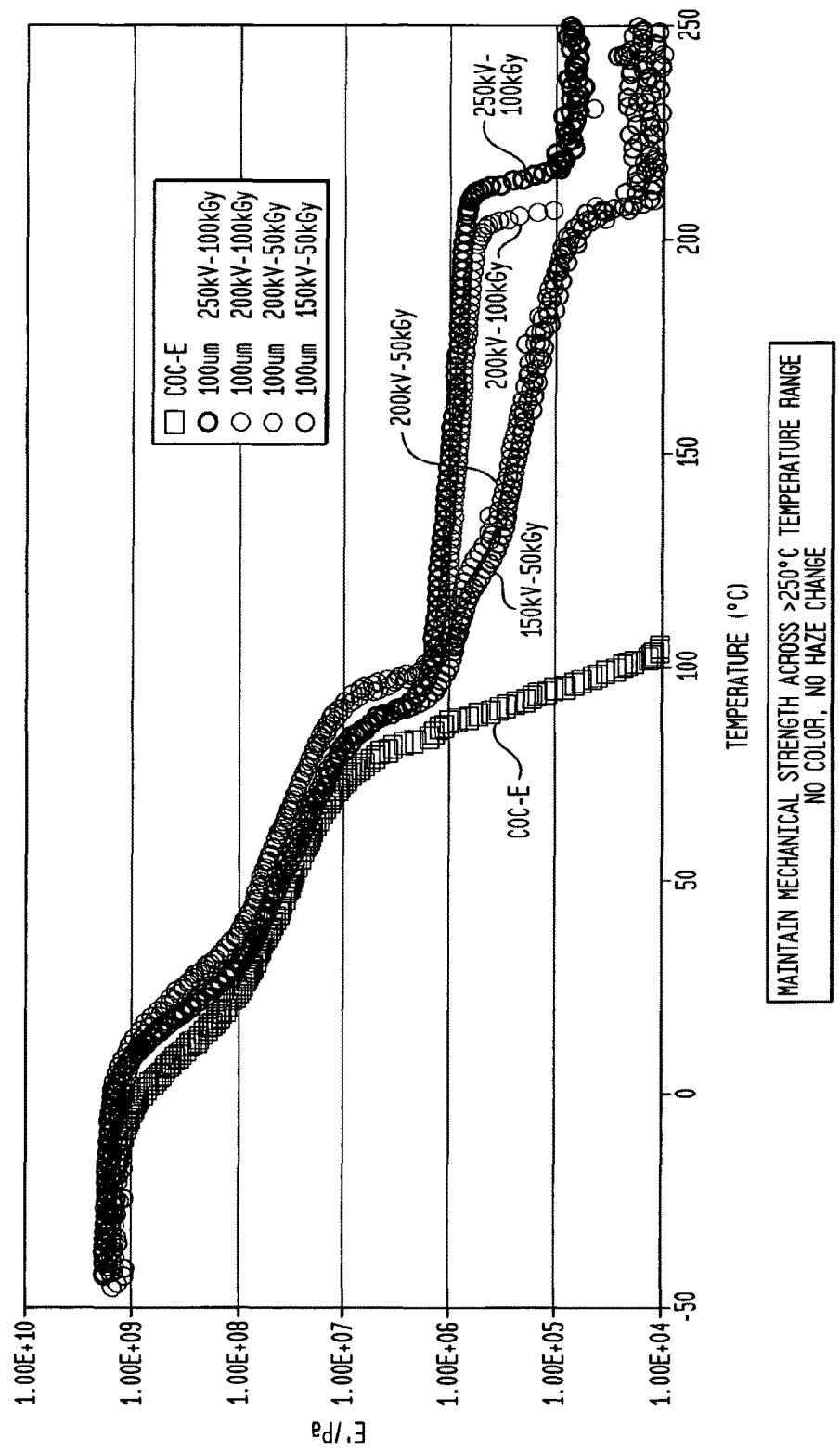
FIG. 8 is a plot of storage modulus versus temperature for cross-linked partially crystalline cycloolefin elastomer treated at various energies and dosages.

If high temperature performance is desired, the COC elastomer resin may be crosslinked by any suitable method, including with electron-beam radiation or by chemical means known in the art. Crosslinked COC elastomer resins have good optical clarity, are useful in blends, multilayer structures and are also useful in electronic and opto-electronic devices as is appreciated by one of skill in the art. Crosslinking with electron beam radiation extends useful mechanical properties in excess of 250° C. FIG. 8 shows the effect of e-beam cross linking on storage modulus of 100 micron E-140 film under beam energy range of 150-250 kV and radiation dosage range of 50-100 kGy. Significant amount of mechanical strength of non-crosslinked E-140 is lost at 90° C.-100° C. Crosslinking significantly improves and extends mechanical integrity in a range of 200° C. to more than 250° C. Cross-linking does not change transparency, color and haze of E-140 film.

Crosslinked COC elastomers are suitable for use in more aggressive environments. For example, many electrical and optical components used in electronic devices such as mobile phones and photovoltaic panels must be capable to endure 85° C. and 85 percent relative humidity environments. Crosslinked COC elastomers can be used as functional displays, lens, light guides, solar cell encapsulant films and front and back sheet for solar panels. UV resistance of crosslinked material is excellent, extending outdoor exposure without significant change in color and transparency as compared with non-crosslinked materials.

Crosslinked COC elastomers are a good alternative to moisture sensitive thermoplastic polyurethanes. However, crosslinked COC elastomers have a substantial improvement in abrasion resistance and are viable alternatives to polyurethanes for applications requiring high abrasion resistance such as laminate flooring and footwear. Thin films of crosslinked COC elastomers are an excellent laminating material for medical products, sporting equipment and camping gear.

In addition to the amorphous cycloolefin containing resin and the partially crystalline cycloolefin elastomer copolymer, suitable additives are used depending upon the desired end-product. Examples of such additives include oxidative and thermal stabilizers, lubricants, release agents, flame-retarding agents, oxidation inhibitors, oxidation scavengers, neutralizers, antiblock agents, dyes, pigments and other coloring agents, ultraviolet light absorbers and stabilizers, organic or inorganic fillers including particulate and fibrous fillers, reinforcing agents, nucleators, plasticizers, waxes, melt adhesives, crosslinkers or vulcanizing agents and combinations thereof. In the Examples which follow, major components of each composition are listed in the tables. Pre-compounded compositions contained the following additives: 0.74% blue (decolorizing), 0.28% Licowax C (internal lubrication) and 0.28% Hostanox 010 (antioxidant).

Among the advantages of the present invention is that the compositions are readily prepared and processed on conventional extrusion and injection molding equipment by conventional techniques. A further advantage stemming from improved miscibility is that the compositions do not need to be pre-compounded, but may be pellet blended and extruded directly to film and sheet from "salt and pepper" mixtures as is preferred by many film and sheet producers. Typical extrusion compounding conditions for representative compositions are set forth in Table 3 and typical injection molding conditions for compositions, including cycloolefin copolymers, are given in Table 4.

TABLE 3

Twin Screw Extrusion Compounding Conditions

Machine Data $P_{max}$ [kW]: 106
ZSK-40MC $RPM_{max}$ 1200

| Structure | | | | | | |
| --- | --- | --- | --- | --- | --- | --- |
| 8007F-04 | 92.00% | 84.50% | | | | 39.75% |
| 6013X20T1 | | | | 92.00% | 84.50% | |
| 6013S-04 | | | 89.50% | | | 39.75% |
| E-140 | 7.50% | 15.00% | 10.00% | 7.50% | 15.00% | 20.00% |
| Hostanox 010 | 0.25% | 0.25% | 0.25% | 0.25% | 0.25% | 0.25% |
| Licowax C | 0.25% | 0.25% | 0.25% | 0.25% | 0.25% | 0.25% |
| Screw # | | | | | | |
| Screw Speed [1/min] | 275 | 290 | 325 | 325 | 325 | 300 |
| Torque [%] | 93-95 | 92-93 | 90-91 | 86-90 | 88-90 | 91-93 |
| Power [kW] | 24.2 | | 26.0 | | | 24.5 |
| Rate [lb/hr] | 402 | 402 | 402 | 402 | 400 | 400 |
| S-mech (SEI) [kWh/kg] | 0.136 | | 0.142 | | | 0.135 |
| $T_{melt}$ (° C.) Die | 251 | 252 | 280 | 280 | 280 | 271 |
| PDie (psig) Die | 340 | 340 | 310 | 300 | 280 | 300 |

TABLE 4

Typical Injection Molding Conditions

Part 5.0 × 5.0 × 2 mm
Machine (Demag) 135 Ton

| | Units | C09-1-1 | C09-1-2 | C09-1-3 | C09-1-4 | C09-1-5 | C09-1-6 |
|---|---|---|---|---|---|---|---|
| Mold Temperature | | | | | | | |
| Front | ° F. | 135 | 135 | 235 | 235 | 235 | 150 |
| Back | ° F. | 135 | 135 | 235 | 235 | 235 | 150 |
| Cylinder Temperature | | | | | | | |
| Nozzle | ° F. | 445 | 445 | 530 | 530 | 530 | 450 |
| Front | ° F. | 450 | 450 | 520 | 520 | 520 | 480 |
| Middle | ° F. | 430 | 430 | 510 | 510 | 510 | 460 |
| Rear | ° F. | 410 | 410 | 480 | 480 | 480 | 440 |
| Speed | | | | | | | |
| Injection Velocity | in/sec | 2.5 | 2.5 | 2.5 | 2.5 | 2.5 | 2.5 |
| Screw Speed | RPM | 40 | 40 | 40 | 40 | 40 | 40 |
| Cushion | inch | 0.232 | 0.228 | 0.262 | 0.263 | 0.261 | 0.346 |
| Decompression Distance | inch | 0.10 | 0.10 | 0.10 | 0.10 | 0.10 | 0.10 |
| Timers | | | | | | | |
| First Stage Injection Time | sec | 0.49 | 0.49 | 0.49 | 0.49 | 0.49 | 0.48 |
| Second Stage Hold Time | sec | 15.00 | 15.00 | 15.00 | 15.00 | 15.00 | 15.00 |
| Cooling Time | sec | 15.00 | 15.00 | 15.00 | 15.00 | 15.00 | 15.00 |
| Mold Open Time | sec | 5.74 | 5.74 | 5.74 | 5.74 | 5.74 | 5.74 |
| Total Cycle Time | sec | 36.23 | 36.23 | 36.23 | 36.23 | 36.23 | 36.22 |
| Pressures | | | | | | | |
| First Stage Injection Pressure | psi | 1188 | 1201 | 976 | 991 | 985 | 1239 |
| Second Stage Injection Hold | psi | 487 | 487 | 317 | 316 | 317 | 322 |
| Back Pressure | psi | 125 | 125 | 200 | 200 | 200 | 200 |

Multilayer, all-olefin packaging films can likewise be produced using the inventive compositions combined with layers of other polyolefins. Polyolefin polymers suitable for additional layers include polyethylenes, polypropylenes, polybutenes, polymethylpentenes and so forth and are well known in the art. See *Kirk-Othmer Encyclopedia of Chemical Technology*, 3$^{rd}$ ed., Vol. 16, pp. 385-499, Wiley 1981, the disclosure of which is incorporated herein by reference. Such polymers are readily extruded into films and may be used to produce multilayer films in accordance with the invention as hereinafter described. "Polypropylene" includes thermoplastic resins made by polymerizing propylene with suitable catalysts, generally aluminum alkyl and titanium tetrachloride mixed with solvents. This definition includes all the possible geometric arrangements of the monomer unit, such as: with all methyl groups aligned on the same side of the chain (isotactic), with the methyl groups alternating (syndiotactic), all other forms where the methyl positioning is random (atactic), and mixtures thereof.

Polyethylene layers are particularly useful because of their processability, mechanical and optical properties, as well as compatability with the polymer blends of the present invention. Polyethylene layers are typically formed with commercially available polymers and copolymers such as low density polyethylene, linear low density polyethylene (LLDPE), intermediate density polyethylene (MDPE) and high density polyethylene (HDPE). The differences between these materials includes density and degree of branching. LLDPE material generally display higher melting point, higher tensile, higher modulus, better elongation and stress crack resistance than LDPE materials of approximately the same melt index and density. LLDPE and LDPE generally have densities of from 0.90 to 0.94 g/cm$^3$, while MDPE and HDPE typically have densities in the range of from 0.925-0.95 and >0.94 g/cc, respectively. Polyethylene is a semicrystalline thermoplastic whose properties depend to a major extent on the polymerization process (Saechtling, Kunststoff-Taschenbuch [Plastics Handbook], 27$^{th}$ edition).

HDPE typically has a density of greater or equal to 0.941 g/cc. HDPE has a low degree of branching and thus stronger intermolecular forces and tensile strength. HDPE can be produced by chromium/silica catalysts, Ziegler-Natta catalysts or metallocene catalysts. The lack of branching is ensured by an appropriate choice of catalyst (e.g. Chromium catalysts or Ziegler-Natta catalysts) and reaction conditions.

LDPE typically has a density in the range of 0.910-0.940 g/cc. LDPE is prepared at high pressure with free-radical initiation, giving highly branched PE having internally branched side chains of varying length. Therefore, it has less strong intermolecular forces as the instantaneous-dipole induced-dipole attraction is less. This results in a lower tensile strength and increased ductility.

LLDPE is a substantially linear polyethylene, with significant numbers of short branches, commonly made by copolymerization of ethylene with short-chain α-olefins (e.g. copolymerization with 1-butene, 1-hexene, or 1-octene yield b-LLDPE, h-LLDPE, and o-LLDPE, respectively) via metal complex catalysts. LLDPE is typically manufactured in the density range of 0.915-0.925 g/cc. However, as a function of the α-olefin used and its content in the LLDPE, the density of LLDPE can be adjusted between that of HDPE and very low densities of 0.865 g/cc. Polyethylenes with very low densities are also termed VLDPE (very low density) or ULDPE (ultra low density). LLDPE has higher tensile strength than LDPE and exhibits higher impact and puncture resistance than LDPE. Lower thickness (gauge) films can be blown compared to LDPE, with better environmental stress cracking resistance compared to LDPE. Lower thickness (gauge) may be used compared to LDPE. Metallocene metal complex catalysts can be used to prepare LLDPEs with particular properties, e.g. high toughness and puncture resistance. Polyethylenes which are prepared with metallocene catalysts are termed "m-LLDPEs". The variability of the density range of m-LLDPEs is similar to that of the density range of LLDPE, and grades with extremely low densities are also termed plastomers.

"MDPE" is polyethylene having a density range of 0.926-0.940 g/cc. MDPE can be produced by chromium/silica catalysts, Ziegler-Natta catalysts or metallocene catalysts. MDPE has good shock and drop resistance properties. It also is less notch sensitive than HDPE, stress cracking resistance is better than HDPE.

In the case of all of the types of polyethylene, there are commercial grades with very different flowabilities. Molecular weight can be lowered via control of the chain-termination reaction to such an extent that the product comprises waxes. HDPE grades with very high molecular weights are termed HMWPE and UHMWPE.

Multilayered polymeric films or sheets may be produced by co-extrusion. Co-extrusion is a well known process. U.S. Pat. Nos. 3,479,425; 3,959,431; and 4,406,547, the disclosures of which are incorporated herein by reference, describe co-extrusion processes whereby multilayered plastic films can be formed. Multilayered films are usually co-extruded by passing two or more melt streams of polymers through a die. The molten materials are fused together into a layered structure and are allowed to cool. Co-extrusion can be achieved by either (1) introducing the different polymer melt streams, from two or more extruders (one for each resin), in a combining block prior to the extrusion die; or (2) bringing the melt streams together within the die, using a multimanifold die. A multimanifold die is a die that has individual manifolds for each layer. Generally, the individual manifolds are designed to distribute a polymer layer uniformly before combining with other layers either inside or outside the die. Typically, multimanifold dies are flat or annular. Another suitable method for melt-bonding film layers of the present invention is lamination. The multilayered films can be laminated by superimposing at least one polymeric layer on another polymeric layer and bonding the layers together while applying heat.

It was discovered that COC elastomers are surprisingly effective as compatibilizers in blends of amorphous cycloolefin polymers and thermoplastic elastomers. One aspect of the invention is thus melt-blend resin compositions prepared by melt-blending:
  (a) from 60 parts to 94.5 parts per hundred weight resin in the blend of an amorphous cycloolefin polymer composition exhibiting a glass transition temperature (Tg) in the range of from 30° C. to 200° C.;
  (b) from 30-5 parts by weight of a thermoplastic elastomer; and
  (c) from 10 parts to 0.5 or less part per hundred weight resin in the blend of a partially crystalline, cycloolefin elastomer of norbornene and ethylene having a first glass transition temperature (Tg) in the range of from −10° C. to 15° C. and optionally having a second glass transition temperature (Tg) less than −90° C. as well as a crystalline melting temperature in the range of from 60° C. to 125° C. and a % crystallinity by weight in the range of from 5% to 40%.

Suitable elastomeric materials are described in *Kirk-Othmer Encyclopedia of Chemical Technology*, 3$^{rd}$ Ed., Vol. 8 pp. 626-640, the disclosure of which is incorporated herein by reference. Such materials include, without limitation, olefinic thermoplastic elastomers; polyamide thermoplastic elastomer; polybutadiene thermoplastic elastomer, e.g., syndiotactic 1,2-polybutadiene thermoplastic elastomer; polyester thermoplastic elastomer; polyurethane thermoplastic elastomer, e.g., thermoplastic polyester-polyurethane elastomer, and thermoplastic polyether-polyurethane elastomer; styrenic thermoplastic elastomer; vinyl thermoplastic elastomer, e.g., polyvinyl chloride polyol (pPVC). Particularly preferred in many cases due to optical characteristics and/or blend compatibility are styrene block copolymer elastomers such as styrene/butadiene block copolymers (SBS), styrene/ethylene/butadiene block copolymers (SEBS), styrene/isoprene block copolymers (SIS) and styrene/ethylene/propylene block copolymers (SEPS).

20-mil Sheet (See Table 5 Below)

Impact resistance, tensile properties, haze, gloss and glass transition temperature are summarized in Table 5 for 20-mil sheet samples of commercial TOPAS COC grades: 8007F-04, 9506X5 and 8007F-400. TOPAS 8007F-04 is a standard film and sheet grade, featuring excellent transparency, total haze of 2.5 percent; good heat resistance, glass transition temperature of 78° C.; high stiffness, MD & TD tensile modulus at about 300,000 psi. No elongation at yield, very low elongation at break of approximately 4 percent; very low puncture resistance of 30.6 pounds force and very low total energy absorbed of 0.15 ft-lb quantifies the brittle nature of not only this material, but also most COC commercial grades. Brittleness or lack of toughness and durability places COC at a significant disadvantage to other commercially available transparent polymers, such as polyamide, polycarbonate and copolyester.

TOPAS 9506X5 and TOPAS 8007F-400 are commercial "robust" extrusion processing grades for film and sheet applications. TOPAS 9506X5 has lower glass transition temperature of 68° C. and slightly higher molecular weight than TOPAS 8007-F400. Respective puncture resistance of 123 and 188 pound force and absorbed energy of 2.7 and 6.1 ft-lbs are substantially higher than those for TOPAS 8007F-04. However, failure mode, as indicated by numerous cracks, remains brittle. Elongation at yield of about 4 percent and elongation at break of more than 50 percent for 9506X5 is substantially higher than for TOPAS 8007F-04. Although TOPAS 9506X5 and TOPAS 8007F-400 have improved toughness and ductility; respective total haze of 43 and 59 percent versus 2.5 percent for TOPAS 8007F-04 is an unacceptable property tradeoff for nearly all COC applications. Transparency and appearance cannot be compromised in most applications.

TOPAS® 9903D-10, has glass transition temperature of 33° C. and slightly higher molecular weight than TOPAS 9506X5 which has a glass transition temperature of approximately 68° C. The 9903-D10 material, with relatively low norbornene content, blended well with the 8007 grade. A twin screw compounded blend was prepared consisting of 80/20 8007F-04 and 9903-D10 (id #F08-60-5). Miscibility was confirmed by single glass transition temperature, as measured by DSC, and small deviation from a predictive weighted average Tg of the pure components. Total haze remained low, and uncompromised. This compound closely matched the properties of TOPAS 8007F-04, but with glass transition temperature 10° C. lower.

Extruded 20-mil sheet composed of pellet blends of two 8007F-04 compounds, one with 9903-D10 (C08-1-2) and the other with E-140 (C08-1-3) did show noticeable puncture resistance improvement. Addition of 5 percent E-140 to 8007F-04 blended with 9903-D10 (F08-60-5 vs. F08-72-2) substantially and unexpectedly increased puncture resistance from 29 to 74 pounds force and total energy absorbed from 0.13 to 0.41 ft-lbs. Total haze increased modestly from 4.9 to 12.4 percent. Although both compounds remained very brittle, it was very surprising and unexpected for a small amount of COC elastomer to significantly improve (nearly triples) impact resistance of the 8007F-04/9903-D10 compound.

Energy at peak force increases in magnitude as the compounds become tougher and more ductile as will be appreciated from FIGS. 3 and 4.

20 percent COC elastomer works very effectively as an impact modifier for 8007F-04 (id#F08-68-15). Puncture resistance of 189 pounds force and total energy absorbed of 8.1 ft-lbs are several multiples higher than TOPAS 8007F-04. Elongation at yield and break were similar to that of 9506X5. However, unlike both TOPAS 8007F-400 and TOPAS 9506X5, high speed impact failure mode was ductile or nearly so. This means very few, if any, cracks, shorter than 10 mm in length, appeared in the sample in the impact region. These are unexpected and highly significant achievements for COCs which are regarded as brittle materials. Total haze at 20-mil was high at 59 percent. However, lower percentage of elastomer and/or better dispersion via more aggressive twin screw mixing does improve appearance.

Many useful articles can be molded and thermoformed from impact modified 9506X5 sheets. TOPAS 9506X5 has the additional benefit that thermoforming can be done at relatively low processing temperatures because of its 68° C. glass transition temperature. These include deep trays, storage bins for food or medical applications; especially when fast cycle forming and form-and-fill is required. Amorphous COC such as 9506X5 has an additional benefit of broad forming temperature range usually between 70° C. to 110° C.; making modified 9506X5 ideally suited for handling and forming complex shapes, such as braces, custom support articles, sports protective equipment, orthotic devices, and custom formed-to-the-body casts. Blending 9903-D10 and 9506X5 together with impact modifier reduces glass transition temperature, enabling lower forming temperatures between 35° C. to 70° C.

TABLE 5

20-mil Sheet Properties of TOPAS Commercial Grades vs. 8007 Compounded with 9903-D10 and E-140

| | Sample ID | F06-13-8 | F06-13-1 | F09-69-2 | F06-15-2 | F06-15-7 | |
|---|---|---|---|---|---|---|---|
| | Compound ID | — | — | — | — | — | — |
| | Description | 100% | 8007F-04 8007D-61 | 100% | 9506X5 | 100% | 8007F-400 |
| Property | Method | | | | | | |
| Gauge (mil) | | 20 | | 20 | | 20 | |
| Tg (DSC) (° C.) | ASTM D3418-03 | 78 | | 68 | | 78 | |
| Haze (%) | ASTM D1003-00 B | 2.5 | | 43 | | 59 | |
| Gloss (60°) | ASTM D2457 | 147 | | 108 | | | |
| Fast Puncture | ISO 7765-2: 1994 (E) | | | | | | |
| Thickness (mil (mm)) | | 19.0 (0.483) | | 20.0 (0.507) | | 20.3 (0.515) | |
| Peak Force (Resistance) (lbf (Newton)) | | 30.6 (136) | | 123.4 (549) | | 188.4 (838) | |
| Deformation at Peak Force (inches (mm)) | | 0.11 (2.8) | | 0.25 (6.38) | | 0.52 (13.2) | |
| Energy at Peak Force (ft-lb (Joule)) | | | | | | | |
| Total Energy (ft-lb (Joule)) | | 0.15 (0.2) | | 2.70 (3.66) | | 6.51 (8.82) | |
| | Failure Mode | Very Brittle | | Brittle | | Brittle | |
| Tensile Modulus | ASTM D882-02 | | | | | | |
| MD (psi) | | 298,000 | | 261,000 | | | |
| TD (psi) | | 293,000 | | 254,000 | | | |
| Tensile Yield | ASTM D882-02 | | | | | | |
| MD (psi) | | — | | 6,960 | | | |
| TD (psi) | | — | | 7,500 | | | |
| Elong. Yield | ASTM D882-02 | | | | | | |
| MD (%) | | — | | 2.9 | | | |
| TD (%) | | — | | 4.0 | | | |

TABLE 5-continued 20-mil Sheet Properties of TOPAS Commercial Grades vs. 8007 Compounded with 9903-D10 and E-140

| Tensile Break | ASTM D882-02 | | | | |
|---|---|---|---|---|---|
| MD (psi) | | 8,600 | | 6,510 | |
| TD (psi) | | 8,620 | | 5,010 | |
| Elong. Break | ASTM D882-02 | | | | |
| MD (%) | | 4 | | 50 | |
| TD (%) | | 4 | | 200 | |
| Flexibility | Multiple Corner Folds | Brittle | | Very Good | Very Good |

| | Sample ID | F08-60-5 | | F08-72-4 | |
|---|---|---|---|---|---|
| | Compound ID | 100.0% | C08-1-2 | 87.5% 12.5% | C08-1-2 C08-1-3 |
| | Description | 79.00% 19.70% | 8007F-04 9903-D10 | 79.00% 17.24% 2.47% | 8007F-04 9903-D10 E-140 |

| Property | Method | | | | |
|---|---|---|---|---|---|
| Gauge (mil) | | 20 | | 20 | |
| Tg (DSC) (° C.) | ASTM D3418-03 | 68 | | | |
| Haze (%) | ASTM D1003-00 B | 4.9 | | 7.9 | |
| Gloss (60°) | ASTM D2457 | 123 | | 118 | |
| Fast Puncture | ISO 7765-2: 1994 (E) | | | | |
| Thickness (mil (mm)) | | 20.2 | (0.514) | 20.6 | (0.524) |
| Peak Force (Resistance) (lbf (Newton)) | | 29.0 | (129) | 33.9 | (151) |
| Deformation at Peak Force (inches (mm)) | | 0.09 | (2.41) | 0.13 | (3.25) |
| Energy at Peak Force (ft-lb (Joule)) | | 0.10 | (0.129) | 0.09 | (0.119) |
| Total Energy (ft-lb (Joule)) | | 0.13 | (0.18) | 0.18 | (0.249) |
| Failure Mode | | Brittle | | Brittle | |
| Tensile Modulus | ASTM D882-02 | | | | |
| MD (psi) | | 297,000 | | 279,000 | |
| TD (psi) | | 295,000 | | 257,000 | |
| Tensile Yield | ASTM D882-02 | | | | |
| MD (psi) | | — | | — | |
| TD (psi) | | — | | — | |
| Elong. Yield | ASTM D882-02 | | | | |
| MD (%) | | — | | — | |
| TD (%) | | — | | — | |
| Tensile Break | ASTM D882-02 | | | | |
| MD (psi) | | 8,270 | | 7,930 | |
| TD (psi) | | 8,290 | | 7,020 | |
| Elong. Break | ASTM D882-02 | | | | |
| MD (%) | | 3.7 | | 3.7 | |
| TD (%) | | 3.6 | | 3.4 | |
| Flexibility | Multiple Corner Folds | Very Good Low Stress Whitening | | Several Folds Low Stress Whitening | |

| | Sample ID | F08-72-2 | | F08-68-15 | |
|---|---|---|---|---|---|
| | Compound ID | 75% 25% | C08-1-2 C08-1-3 | 100% | C08-1-3 |
| | Description | 79.00% 14.78% 4.93% | 8007F-04 9903-D10 E-140 | 79.00% 0% 19.70% | 8007F-04 9903-D10 E-140 |

| Property | Method | | | | |
|---|---|---|---|---|---|
| Gauge (mil) | | 20 | | 20 | |
| Tg (DSC) (° C.) | ASTM D3418-03 | | | 58 | |
| Haze (%) | ASTM D1003-00 B | 12.4 | | 59.7 | |
| Gloss (60°) | ASTM D2457 | 116 | | 93.7 | |
| Fast Puncture | ISO 7765-2: 1994 (E) | | | | |
| Thickness (mil (mm)) | | 20.6 | (0.522) | 18.8 | (0.478) |
| Peak Force (Resistance) (lbf (Newton)) | | 73.7 | (328) | 189.3 | (842) |
| Deformation at Peak Force (inches (mm)) | | 0.13 | (3.32) | 0.61 | (15.6) |
| Energy at Peak Force (ft-lb (Joule)) | | 0.32 | (0.436) | 6.20 | (8.4) |

TABLE 5-continued 20-mil Sheet Properties of TOPAS Commercial Grades vs. 8007 Compounded with 9903-D10 and E-140

| | | | | | |
|---|---|---|---|---|---|
| Total Energy (ft-lb (Joule)) | | 0.41 | (0.557) | 8.11 | (11.0) |
| | Failure Mode | Brittle | | Ductile - Brittle | |
| Tensile Modulus | ASTM D882-02 | | | | |
| MD (psi) | | 261,000 | | 243,000 | |
| TD (psi) | | 253,000 | | 218,000 | |
| Tensile Yield | ASTM D882-02 | | | | |
| MD (psi) | | — | | 6,780 | |
| TD (psi) | | — | | 4,910 | |
| Elong. Yield | ASTM D882-02 | | | | |
| MD (%) | | — | | 4 | |
| TD (%) | | — | | 4 | |
| Tensile Break | ASTM D882-02 | | | | |
| MD (psi) | | 7,310 | | 6,390 | |
| TD (psi) | | 6,930 | | 4,590 | |
| Elong. Break | ASTM D882-02 | | | | |
| MD (%) | | 3.6 | | 43 | |
| TD (%) | | 3.5 | | 170 | |
| Flexibility | Multiple Corner Folds | Very Good | | Excellent | |
| | | Low Stress Whitening | | Ductile - Brittle Impact | |

Injection Molding: 9903-D10 Compounds (See Table 6 Below)

TOPAS 8007S-04, TOPAS 6013S-04 and compounds with 9903-D10 were injection molded into 0.125 and 0.250-inch thick flex bars and 0.125×6×6-inch plaques. Durability of these molded articles was assessed by High Speed Puncture (ASTM D-3763-08) and Notched Izod Impact (ASTM D-790-07).

The addition of 10 percent 9903-D10 did not improve impact resistance of TOPAS 8007S-04, but did show very modest impact resistance improvement for TOPAS 6013S-04, but at the expense of higher haze. Both polymers remained brittle and very notch sensitive, as confirmed by low Notched Izod energy values.

The addition of 20 percent 9903-D10 marginally improved puncture resistance and total puncture energy of 8007; but was noticeably better in 6013. However, notched Izod impact strength remained low and largely unchanged, suggesting no change to polymer morphology. 9903-D10 is not very effective to improve toughness or impact resistance of either TOPAS 8007S-04 and TOPAS 6013S-04.

It is seen from the data that 20 weight percent 9903-D10 is needed to make a meaningful increase in both energy at peak force and total energy for 8007S-04 compounds. 6013S-04 is more brittle than 8007S-04 because it contains more norbornene comonomer and has a lower molecular weight. 10 weight percent 9903-D10 is sufficient to improve significantly both peak and total energy for 6013 S-04.

Total haze of less than 10% for the 8007 compounds is acceptable for many injection molding applications. Total haze between 20 and 30% for 6013 compounds suggest some incompatibility with 9903-D10. Flexural modulus and flexural strength of both 8007 and 6013 compounds changed little from 9903-D10. However 6013 was noticeably stronger and stiffer than 8007 compounds. Heat distortion temperature is reduced, but not in proportion to 9903-D10 content; suggesting some immiscibility.

TABLE 6

Injection Molded Properties of 8007 and 6013 Compounds With 9903-D10

| Compound ID Description | | 8007S-04 | | C08-1-1 88.80% 8007 9.90% 9903-D10 | | C08-1-2 79.00% 8007 19.70% 9903-D10 | |
|---|---|---|---|---|---|---|---|
| Property | Method | | | | | | |
| Haze (%) | ASTM D1003-00 B | 3.0 | | 9.0 | | 7.2 | |
| Clarity (%) | ASTM D1003-00 B | 97.4 | | 90.9 | | 96.5 | |
| Transmittance (%) | ASTM D1003-00 B | 90.0 | | 35.5 | | 35.8 | |
| Gloss (60°) | ASTM D2457 | 144 | | 91 | | 100 | |
| HDT (0.455 Mpa/66 psi) (° C.) | ASTM D648-07 | 73.8 | | 65.2 | | 64.8 | |
| HDT (0.250-inch bars) (° F.) | Method B | 164.8 | | 149.4 | | 148.6 | |
| High Speed Puncture | ASTM D3763-08 | | | | | | |
| Thickness (mil (mm)) | | 125.6 | (3.19) | 125.6 | (3.19) | 125.6 | (3.19) |
| Peak Force (Resistance) (lbf (Newton)) | | 148.4 | (660) | 142.5 | (634) | 152.4 | (678) |
| Deformation at Peak Force (inches (mm)) | | 0.44 | (11.2) | 0.35 | (8.98) | 0.46 | (11.7) |
| Energy at Peak Force (ft-lb (Joule)) | | 3.06 | (4.15) | 2.4 | (3.26) | 3.63 | (4.92) |
| Total Energy (ft-lb (Joule)) | | 3.53 | (4.78) | 3.11 | (4.21) | 4.31 | (5.84) |

TABLE 6-continued

Injection Molded Properties of 8007 and 6013 Compounds With 9903-D10

| | | | | | | |
|---|---|---|---|---|---|---|
| Failure Mode | | Brittle | | Brittle | | Brittle |
| Flexural Modulus (tangent) | ASTM D790-07 | | | | | |
| (0.125-inch bars) (psi) | Procedure A | 396,000 | | 386,000 | | 377,000 |
| Flexural Strength* | ASTM D790-07 | | | | | |
| (0.125-inch bars) (psi) | Procedure A | 14,100 | | 13,600 | | 13,200 |
| Notched Izod Impact | ASTM D256-06a | | | | | |
| (0.250-inch bars) (ft-lb/in) | Method A | 0.36 | | 0.35 | | 0.37 |
| Break | | complete | | complete | | complete |

| | | Compound ID | C08-1-4 | | C08-1-5 | |
|---|---|---|---|---|---|---|
| | | Description | 6013S-04 | 88.80% 9.90% | 6013 9903-D10 | 79.00% 19.70% | 6013 9903-D10 |

| Property | Method | | | | | | |
|---|---|---|---|---|---|---|---|
| Haze (%) | ASTM D1003-00 B | 2.7 | | 21.2 | | 31.8 | |
| Clarity (%) | ASTM D1003-00 B | 97.5 | | 95.2 | | 95.5 | |
| Transmittance (%) | ASTM D1003-00 B | 90.5 | | 33.1 | | 29.5 | |
| Gloss (60°) | ASTM D2457 | 135.0 | | 97 | | 96 | |
| HDT (0.455 Mpa/66 psi) (° C.) | ASTM D648-07 | 132.3 | | 118.8 | | 116.8 | |
| HDT (0.250-inch bars) (° F.) | Method B | 127.1 | | 245.9 | | 242.3 | |
| High Speed Puncture | ASTM D3763-08 | | | | | | |
| Thickness (mil (mm)) | | 126.0 | (3.2) | 125.2 | (3.18) | 125.2 | (3.18) |
| Peak Force (Resistance) (lbf (Newton)) | | 133.1 | (592) | 161.6 | (719) | 158.7 | (706) |
| Deformation at Peak Force (inches (mm)) | | 0.21 | (5.32) | 0.45 | (11.4) | 0.40 | (10.1) |
| Energy at Peak Force (ft-lb (Joule)) | | 1.36 | (1.85) | 3.52 | (4.77) | 3.10 | (4.20) |
| Total Energy (ft-lb (Joule)) | | 2.12 | (2.87) | 3.98 | (5.4) | 3.62 | (4.91) |
| Failure Mode | | Brittle | | Brittle | | Brittle | |
| Flexural Modulus (tangent) | ASTM D790-07 | | | | | | |
| (0.125-inch bars) (psi) | Procedure A | 456,000 | | 449,000 | | 442,000 | |
| Flexural Strength* | ASTM D790-07 | | | | | | |
| (0.125-inch bars) (psi) | Procedure A | 14,700 | | 14,900 | | 15,300 | |
| Notched Izod Impact | ASTM D256-06a | | | | | | |
| (0.250-inch bars) (ft-lb/in) | Method A | 0.36 | | 0.39 | | 0.41 | |
| Break | | complete | | complete | | complete | |

*= Flexural Stress at 5% Strain

Injection Molding: E-140 (See Tables 7A-7C Below)

TOPAS 8007F-400 has better high speed impact properties than TOPAS 8007S-04 and TOPAS 6013S-04. Total haze, however, is too high and gloss and transmittance is too low for thick-walled, transparent injection molded applications. The addition of 7.5 percent E-140 to TOPAS 8007S-04 increased Notched Izod Impact resistance from 0.36 to 0.71 foot-pounds per inch notch, suggesting enhancement of toughness and reduction of notch sensitivity.

The addition of 15 percent E-140 improved the toughness and impact resistance of 8007S-04 dramatically; impact resistance increased nearly 5-fold to 470 pounds force and total energy absorbed increased nearly 8 fold to 22 foot pounds (C09-1-2 vs. C09-1-1). Failure mode was clearly ductile because no cracks were observed at or around the puncture area. Notched Izod impact resistance improved more modestly to 0.85 ft-lb per inch notch. Heat distortion temperature remained nearly unchanged versus TOPAS 8007S-04. The results seen were unexpected and clearly superior.

Energy at peak force and total energy increased five to six-fold with the addition of 15% E-140 in the 8007 polymer; compare C09-1-2 (Table 7A) with 8007, third Col., Table 6. This amount of E-140 was not as effective in 6013, which remained brittle. A blend with equal parts of 8007 and 6013 with 20 percent E-140 gave surprising improvement, greater than several fold improvement in both peak and total energy as is seen in Table 7B, discussed hereinafter.

Figure 2:
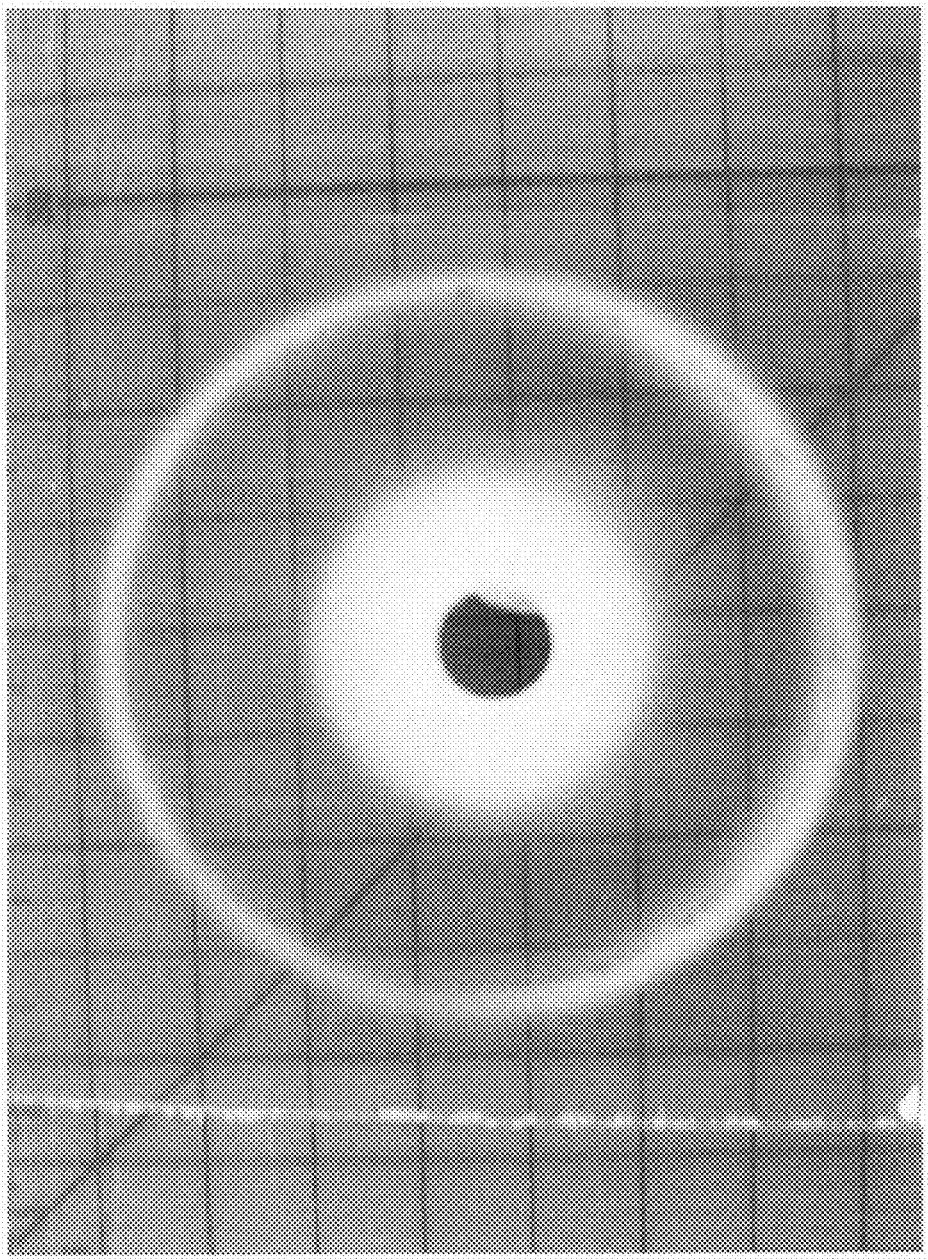
FIG. 2 is a photograph of a 2 mm thick test plaque which has been ruptured in high speed impact testing, the plaque having been injection-molded from a melt-blend of 20% styrene block copolymer and 80% of an amorphous COC resin.

The addition of 15% E-140 to 9506F-04, a material with lower Tg than 8007S-04, improves toughness, similar in magnitude as 8007S-04; however, a distinct advantage of using 9506F-04 is the significant reduction in total haze from 72 to 33 percent. The trade-off for better appearance is somewhat lower heat distortion temperature, 58° C. versus 73° C. An unexpected benefit of using E-140 as an impact modifier for rigid COC is low stress whitening after impact. The difference in appearance after impact testing between COC/E-140 blended specimens as compared to COC/styrene block copolymer blended specimens is indeed striking as seen in FIG. 1 and FIG. 2 above and further discussed below.

Figure 9:
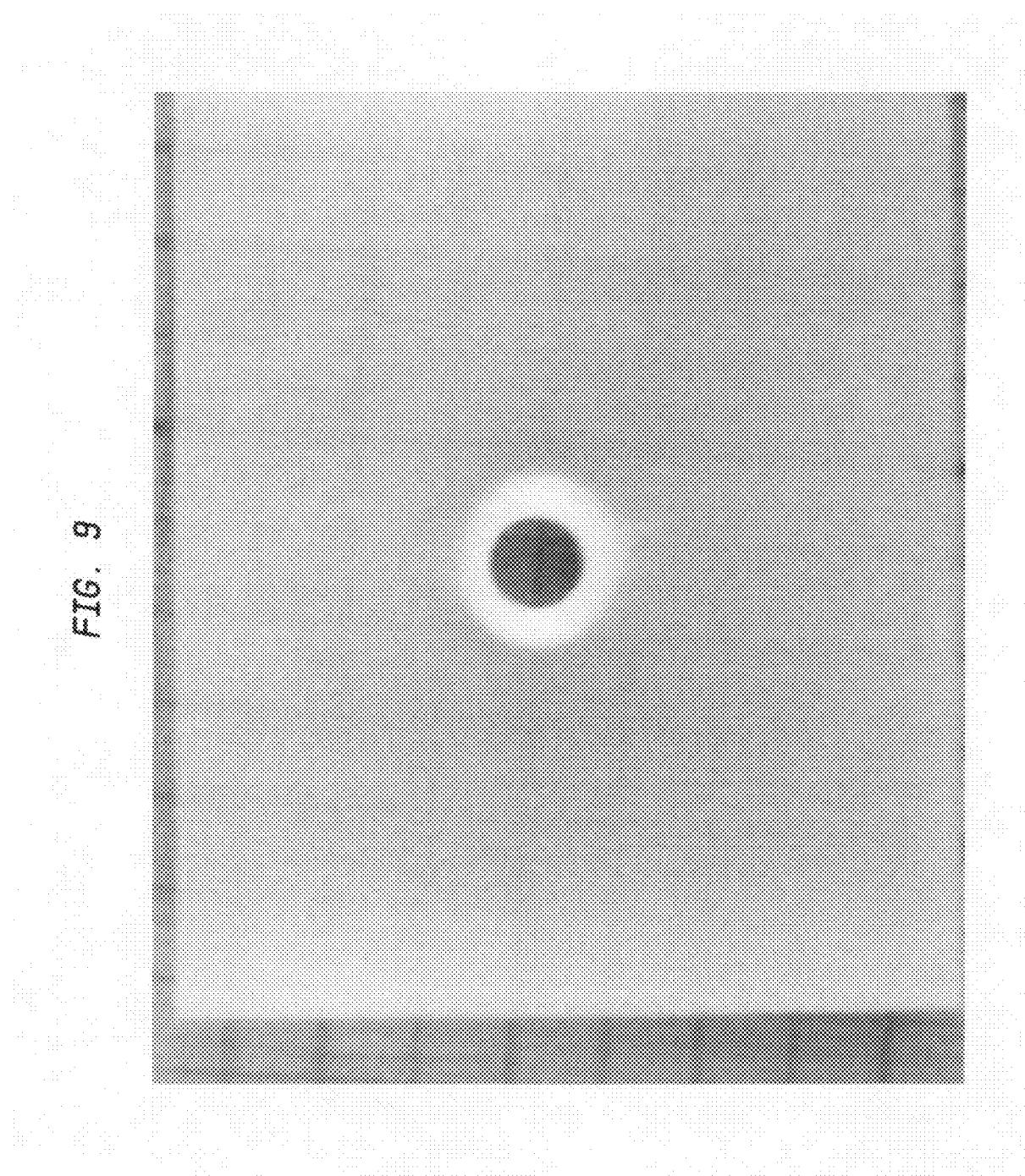
FIG. 9 is a photograph of a 2 mm thick test plaque which has been ruptured in high speed impact testing, the plaque having been injection-molded from a melt blend of 15% partially crystalline cycloolefin elastomer and 85% amorphous COC resin.

Another surprising and unexpected benefit of using E-140 as an impact modifier is stress whitening can be avoided almost completely in rigid, relatively lower melting COC materials, such as 9903D-10 and 9506F-04. By comparing FIG. 1 (C09-10-5, 9506/E-140 material) and FIG. 9 (C09-1-2, 8007/E-140 material), stress whitening in 9506F-04 blends with E-140 appears to be half of that in 8007F-04 blends with E-140. The 8007 material has a glass transition about 10 degrees Celsius higher than the 9506 material. Stress whitening is undesirable in certain commercial applications where appearance, especially after abuse and rough handling, must be uncompromised.

A three-component polymer blend consisting of TOPAS 8007S-04/TOPAS 6013S-04 and E-140 in 40/40/20 weight percent ratios (C09-1-6) also exhibited unexpected toughness and impact resistance as is seen in connection with the compositions listed in Table 7B. Puncture resistance of 447 pounds force, total energy absorbed of 22 foot pounds, notched Izod impact strength of 0.78 ft-lbs per inch notch and ductile mode of failure performed similarly to the 8007S-04 compound with 15 percent E-140 (C09-1-6 vs. C09-1-2). Heat distortion temperature of C09-1-6 is about 27° C. higher than the 8007/E-140 material, which expands its utility into more application which requires higher heat resistance, such as steam sterilization. COC's are generally miscible. Intermediate glass transition temperature is achieved by compounding two distinct grades of COC, each with different Tg.

Mechanical properties of these blends with 2 COC polymers and E-140 are summarized in Table 7B. Several of these COC+E-140 compounds are ductile. The only exception was 40/40/20 9506F-04/6013X20 T1/E-140 (C09-10-8). By substituting 9903D-10 for 9506F-04, the compound became ductile (C09-10-9). Apparently, 9903D-10 is more compatible with 6013×20 than 9506F-04. Compounds of 9506F-04 and 8007F-04 (C09-10-6) and 9903D-10 and 8007F-04 (C09-10-7), each with 20% E-140, had respective total haze of 59 and 44 percent on 2 mm injection molded plaques. Perhaps better match of refractive indices between E-140 and 9903D-10 enables lower total haze.

Figure 10:
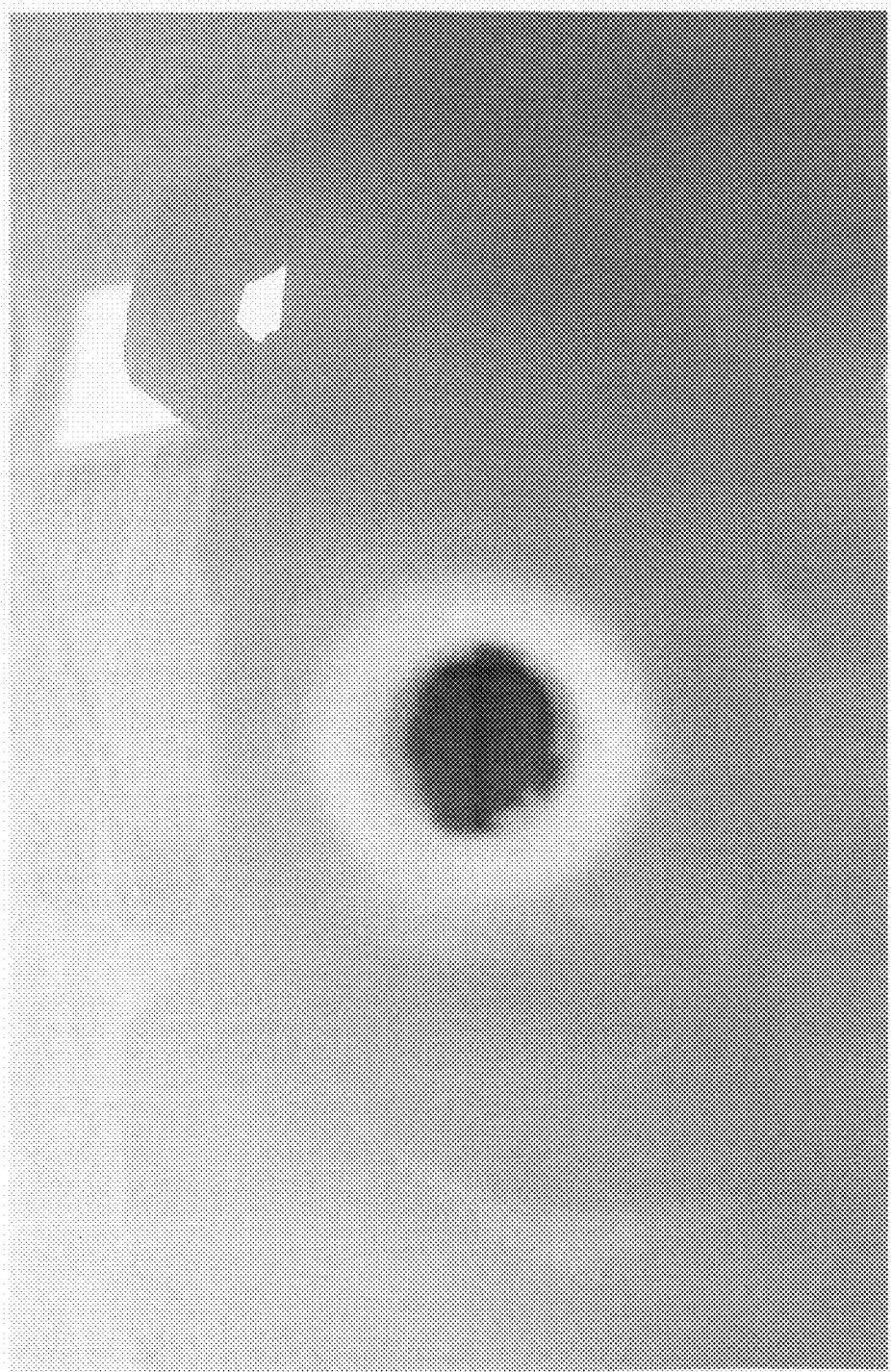
FIG. 10 is a photograph of a 2 mm thick test plaque which has been ruptured in high speed impact testing, the plaque having been injection-molded from a melt blend of 20% partially crystalline cycloolefin elastomer, 40% of a first amorphous COC resin and 40% of a second amorphous COC resin.
Figure 11:
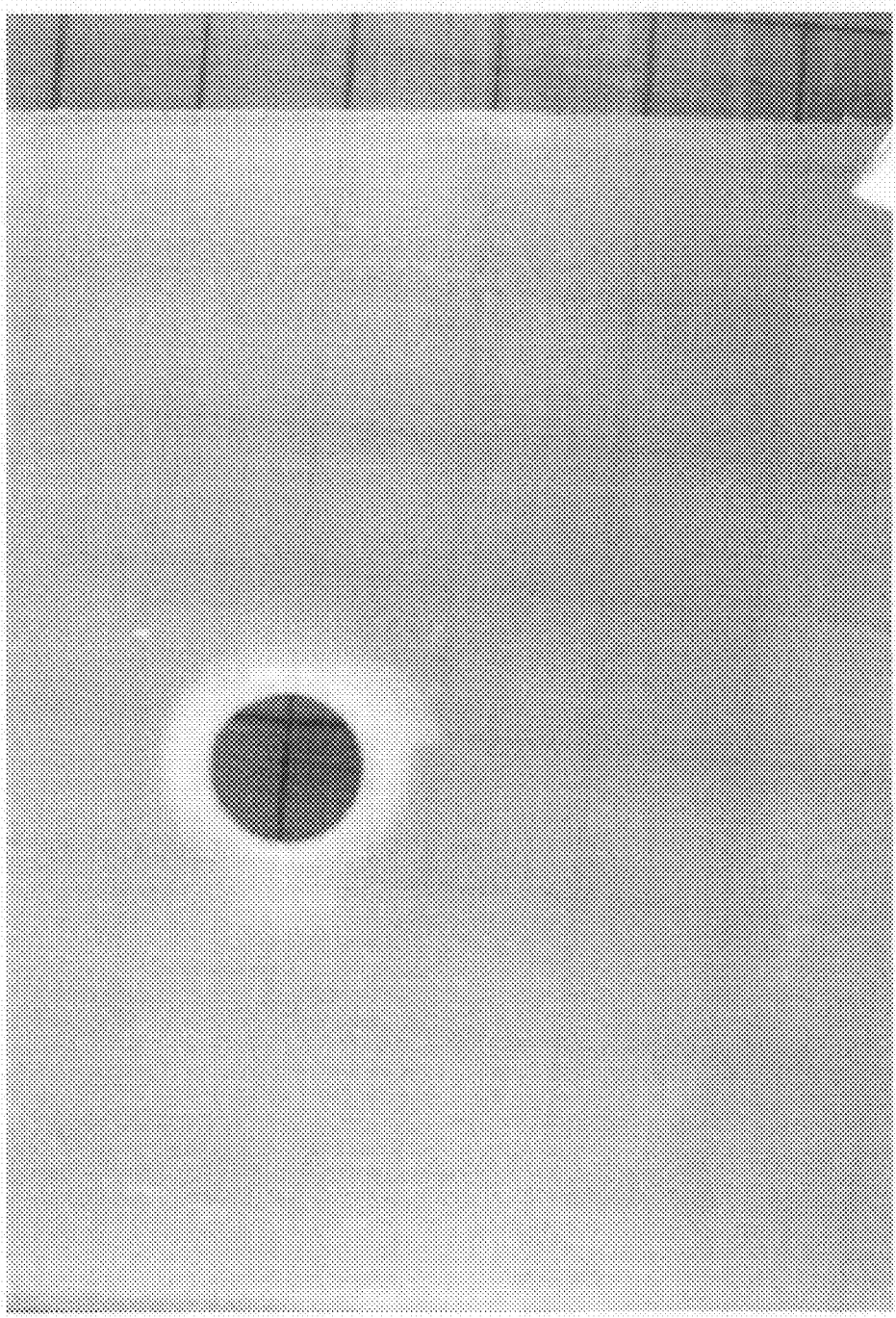
FIG. 11 is a photograph of a 2 mm thick test plaque which has been ruptured in high speed impact testing, the plaque having been injection-molded from a melt blend of 20% partially crystalline cycloolefin elastomer, 40% of a first COC resin and 40% of a second COC resin.
Figure 12:
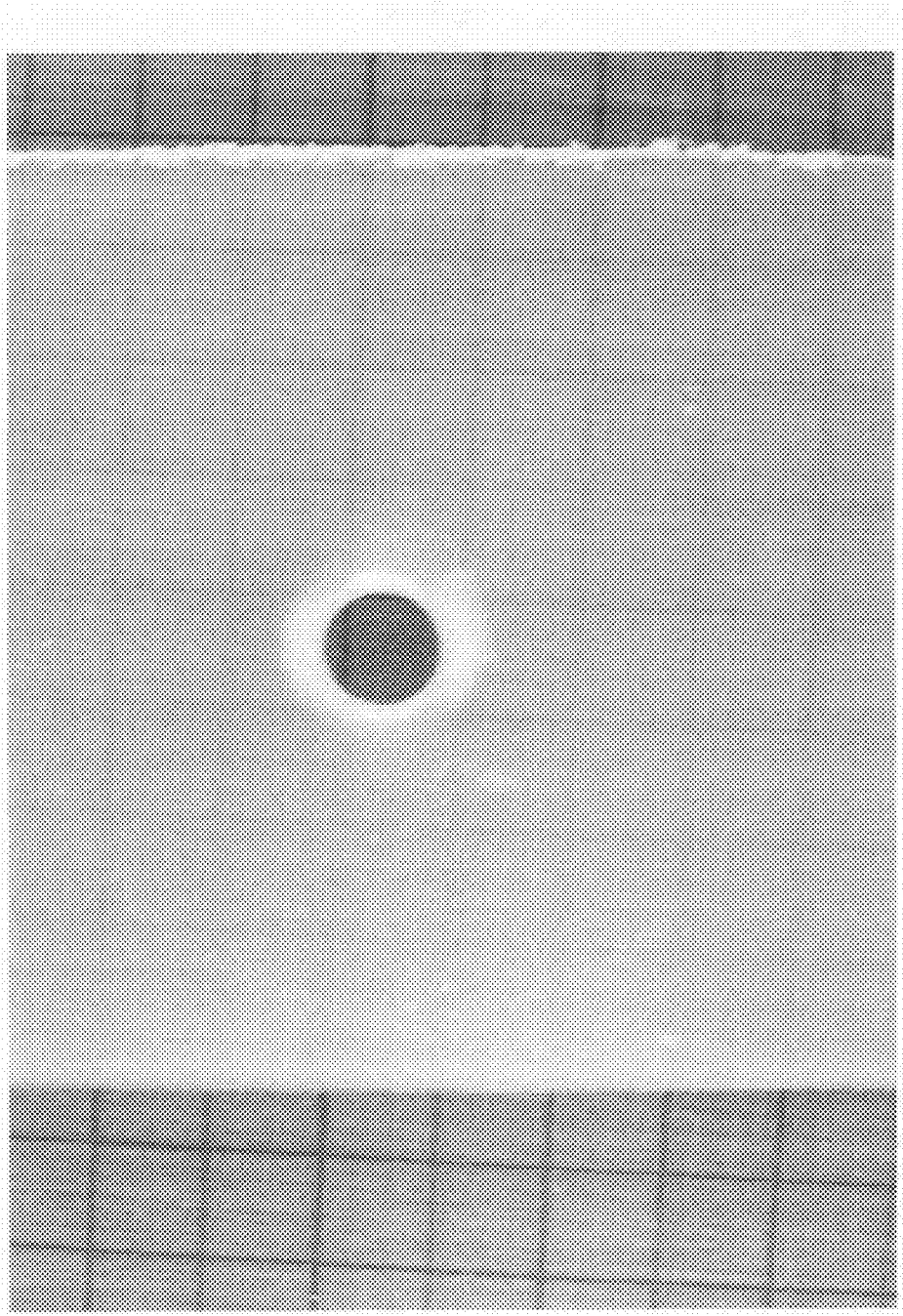
FIG. 12 is a photograph of a 2 mm thick test plaque which as been ruptured in high speed impact testing, the plaque having been injection-molded from a melt blend of 20% partially crystalline cycloolefin elastomer, 30% of a low temperature COC resin and 50% of a standard grade COC resin.
Figure 13:
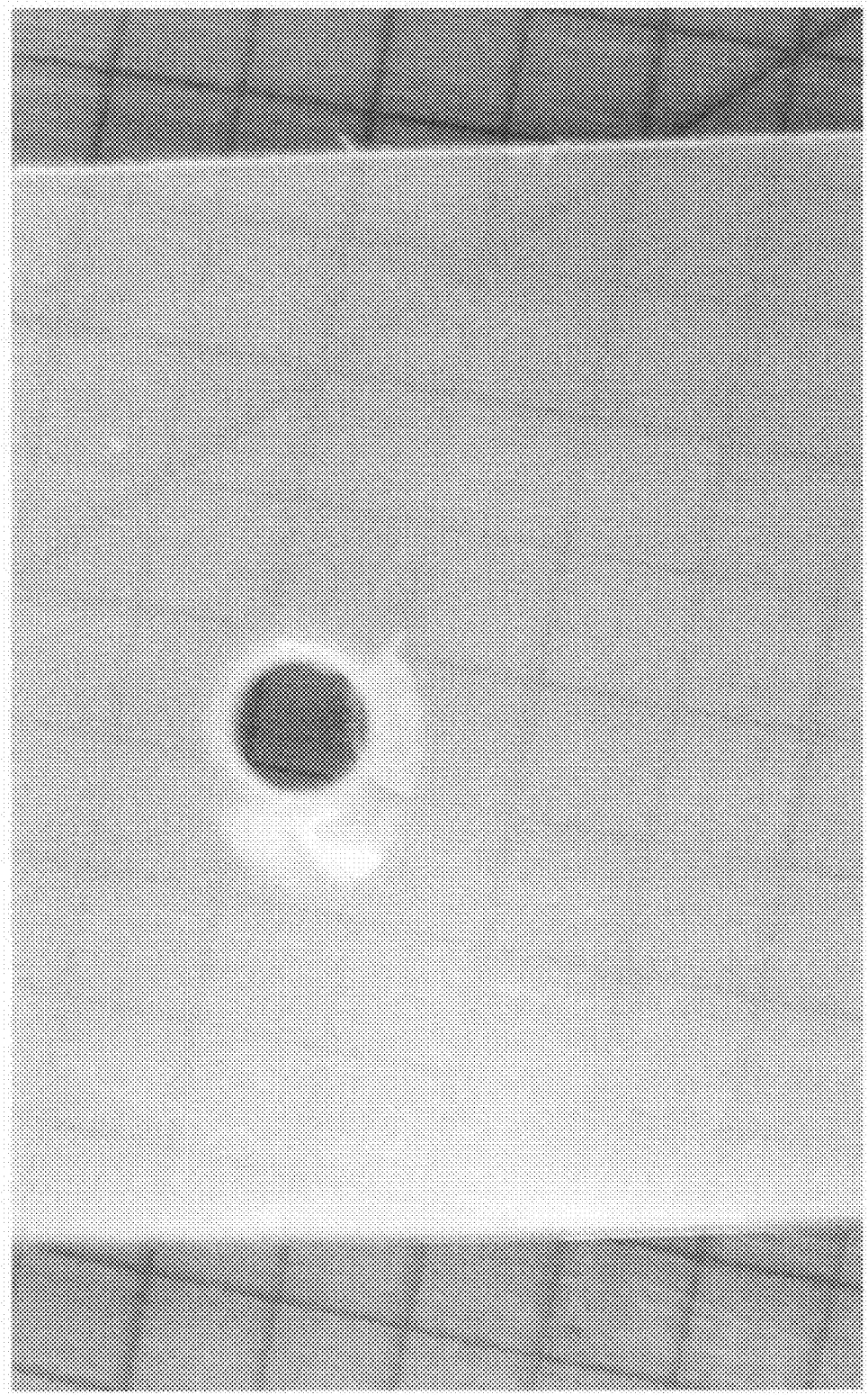
FIG. 13 is a photograph of a 2 mm thick test plaque which has been ruptured in high speed impact testing, the plaque having been injection-molded from a melt blend of 20% partially crystalline cycloolefin elastomer, 40% of a low temperature COC resin and 40% of a relatively high temperature COC resin.

8007 and 6013 compounds with E-140 showed light but noticeable stress whitening at the impact zone. Compare FIG. 9 (C09-1-2, 8007/E-140) and FIG. 10 (C09-1-6, 8007/6013/E-140). All COC+E-140 compounds which contain 15 to 40 weight percent of either 9506F-04 or 9903D-10 exhibited slight stress whitening after high speed impact. See, also, FIGS. 11, 12 (C09-10-6 and C09-10-7). In fact, 40/40/20 9903D-10/6013X20T1/E-140, FIG. 13 (C09-10-9), does not show any substantial stress whitening. 9506F-04 and 9903D-10 improves adhesion of E-140 to 8007 or 6013, enabling significant reduction or elimination of stress whitening.

Figure 14:
FIG. 14 is a photograph of 2 mm thick test plaque which has been ruptured in high speed impact testing, the plaque having been injection-molded from a melt blend of 20% partially crystalline cycloolefin elastomer and 80% of a first amorphous COP resin.
Figure 15:
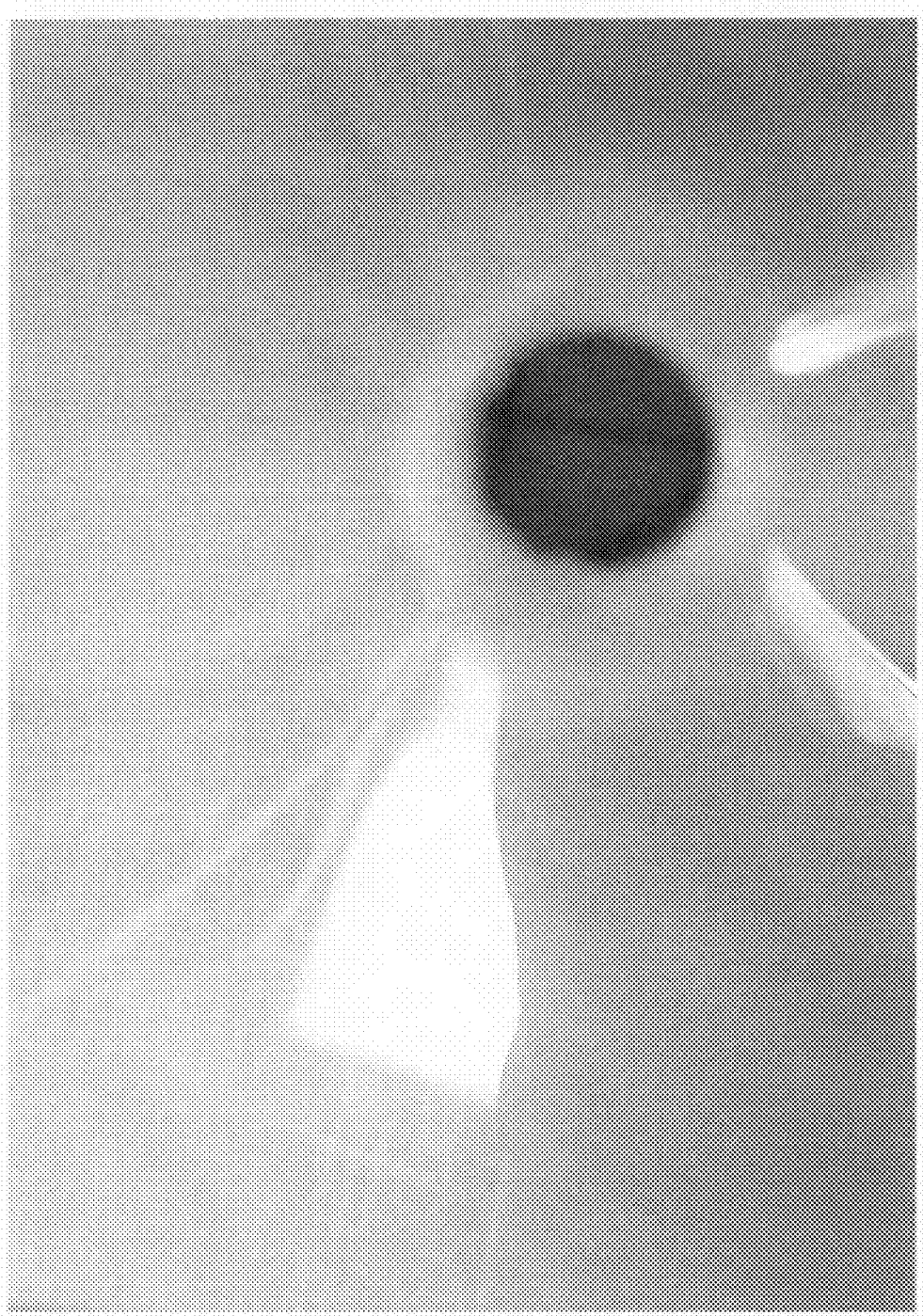
FIG. 15 is a photograph of a 2 mm thick test plaque which has been ruptured in high speed impact testing, the plaque having been injection-molded from a melt blend of 20% partially crystalline cycloolefin elastomer and 80% of a second amorphous COP resin.

E-140 can effectively impact modify COP, as well. In Table 7C, select optical and mechanical properties of injection molded compounds of Zeonor 750R and Zeonex 690R, each with 20 percent E-140, are ductile. The appearance of impact modified Zeonor 750R is better than Zeonex 690R. Total haze of 2 mm thick plaque is 46 versus 91 percent and gloss measured at 60 degrees is 146 versus 98. Zeonor 750R compound did not stress whiten upon impact; whereas Zeonex 690R compound exhibited light stress whitening. See FIGS. 14, 15 (test specimens for C09-10-3, the 750R containing material and C09-10-4, the 690R containing material, respectively).

It was also discovered E-140 functions unexpectedly well as a compatibilizer for the impact modification of COC with styrene block copolymer such as Kraton RP6935 (AH1535). As seen in Table 7D, small percentages of E-140 and a known compatibilizer, Septon 2104, were added to COC-Kraton compounds. It is seen in the table that 2 percent E-140 had a significant effect whereas Septon 2104 had no effect. 2 percent E-140 significantly improves (reduces) total haze, from 15 to 6 percent, and improves (increases) gloss, from 139 to 153, without sacrificing toughness, stiffness and heat resistance. E-140 appears to improve the compatibility of the Kraton rubber within the COC matrix by reducing the size of the Kraton rubber domains. These smaller domains scatter less light. Excellent adhesion between COC and Kraton enables high impact strength and absorbed impact energy. The reduction in notched Izod impact from 4.48 to 2.5 ft-lb/inch is consistent with slightly smaller Kraton domains. Two and three percent each of both compatibilizers, E-140 and Septon 2104, showed reduction in total haze and notched Izod impact strength (C09-10-12 & C09-10-13). E-140 is an effective compatibilizer for 6013S-04 and Kraton RP6935 (AH1535).

TABLE 7A

Injection Molded Properties of One-Component COC & E-140 Compounds & TOPAS 8007F-400 Reference

| | Compound ID | C09-10-5 | | C09-1-1 | | C09-1-2 | |
|---|---|---|---|---|---|---|---|
| | Description | 85.0% 9506F-04 | | 92.5% 8007 | | 85.0% 8007 | |
| | | 15.0% E-140 | | 7.5% E-140 | | 15.0% E-140 | |
| Property | Method | English | (Metric) | English | (Metric) | English | (Metric) |
| Specific Gravity (g/cc) | ASTM D792 | | (1.0) | | (1.01) | | (1.00) |
| Haze (%) | ASTM D1003-00 B | 33 | | 44 | | 72 | |
| Clarity (%) | ASTM D1003-00 B | 99 | | 99 | | 96 | |
| Transmittance (%) | ASTM D1003-00 B | 76 | | 77 | | 76 | |
| Gloss (60°) | ASTM D2457 | 113 | | 107 | | 93 | |
| Tg (° C.) | ASTM D5279-08 & | | | | (98) | | (99) |
| (Tan Delta) (° F.) | ASTM D4065-06 | | | 208 | | 210 | |
| HDT (0.455 Mpa/66 psi) (° C.) | ASTM D648-07 | | (58) | | (72) | | (73) |
| (0.250-inch bars) (° F.) | Method B | 137 | | 161 | | 163 | |
| High Speed Puncture | ASTM D3763-08 | | | | | | |
| Thickness (mil (mm)) | | 78.3 | (1.99) | 81.1 | (2.06) | 78.7 | (2.0) |
| Peak Force (Resistance) (lbf (Newton)) | | 474.3 | (2110) | 94.4 | (420) | 469.9 | (2090) |
| Deformation at Peak Force (inches (mm)) | | 0.72 | (18.2) | 0.42 | (10.6) | 0.72 | (18.3) |

TABLE 7A-continued

Injection Molded Properties of One-Component COC & E-140 Compounds & TOPAS 8007F-400 Reference

| | | | | | | | |
|---|---|---|---|---|---|---|---|
| Energy at Peak Force (ft-lb (Joule)) | | 17.70 | (24) | 1.63 | (2.21) | 16.52 | (22.4) |
| Total Energy (ft-lb (Joule)) | | 22.86 | (31) | 2.96 | (4.02) | 22.27 | (30.2) |
| Failure Mode | | DUCTILE | | Brittle | | DUCTILE | |
| Stress Whitening | | Very Light | | | | Light to Moderate | |
| Flexural Modulus (tangent) | ASTM D790-07 | | | | | | |
| (0.125-inch bars) (psi (Mpa)) | Procedure A | 294,000 | (2029) | 372,000 | (2567) | 333,000 | (2298) |
| Flexural Strength* | ASTM D790-07 | | | | | | |
| (0.125-inch bars) (psi (Mpa)) | Procedure A | 10,000 | (69.0) | 13,000 | (89.7) | 11,700 | (80.7) |
| Notched Izod Impact | ASTM D256-06a | | | | | | |
| (0.250-inch bars) (ft-lb/in (J/m)) | Method A | 0.87 | (46.5) | 0.71 | (37.9) | 0.85 | (45.4) |

| | | Compound ID | C09-1-3 | | C09-1-4 | |
|---|---|---|---|---|---|---|
| | | Description | 90.0% 6013 10.0% E-140 | | 92.5% 6013X20 T1 7.5% E-140 | |
| Property | Method | | English | (Metric) | English | (Metric) |
| Specific Gravity (g/cc) | ASTM D792 | | | (1.01) | | (1.01) |
| Haze (%) | ASTM D1003-00 B | | 103 | | 102 | |
| Clarity (%) | ASTM D1003-00 B | | 59 | | 18 | |
| Transmittance (%) | ASTM D1003-00 B | | 52 | | 34 | |
| Gloss (60°) | ASTM D2457 | | 97 | | 97 | |
| Tg (° C.) | ASTM D5279-08 & | | | (150) | | (150) |
| (Tan Delta) (° F.) | ASTM D4065-06 | | 302 | | 302 | |
| HDT (0.455 Mpa/66 psi) (° C.) | ASTM D648-07 | | | (133) | | (133) |
| (0.250-inch bars) (° F.) | Method B | | 271 | | 271 | |
| High Speed Puncture | ASTM D3763-08 | | | | | |
| Thickness (mil (mm)) | | | 78.7 | (2.0) | 78.3 | (1.99) |
| Peak Force (Resistance) (lbf (Newton)) | | | 58.2 | (259) | 57.1 | (254) |
| Deformation at Peak Force (inches (mm)) | | | 0.57 | (14.5) | 0.46 | (11.7) |
| Energy at Peak Force (ft-lb (Joule)) | | | 1.65 | (2.24) | 1.29 | (1.75) |
| Total Energy (ft-lb (Joule)) | | | 3.27 | (4.43) | 1.78 | (2.42) |
| Failure Mode | | | Brittle | | Brittle | |
| Stress Whitening | | | | | | |
| Flexural Modulus (tangent) | ASTM D790-07 | | | | | |
| (0.125-inch bars) (psi (Mpa)) | Procedure A | | 400,000 | (2760) | 403,000 | (2781) |
| Flexural Strength* | ASTM D790-07 | | | | | |
| (0.125-inch bars) (psi (Mpa)) | Procedure A | | 15,000 | (103.5) | 14,900 | (102.8) |
| Notched Izod Impact | ASTM D256-06a | | | | | |
| (0.250-inch bars) (ft-lb/in (J/m)) | Method A | | 0.46 | (24.6) | 0.43 | (23.0) |

| | | Compound ID | C09-1-5 | | 8007F-400 | |
|---|---|---|---|---|---|---|
| | | Description | 85.00% 6013 15.00% E-140 | | Lot 118976 | |
| Property | Method | | English | (Metric) | English | (Metric) |
| Specific Gravity (g/cc) | ASTM D792 | | | (1.00) | | (1.02) |
| Haze (%) | ASTM D1003-00 B | | 101 | | 92 | |
| Clarity (%) | ASTM D1003-00 B | | 6 | | 91 | |
| Transmittance (%) | ASTM D1003-00 B | | 32 | | 72 | |
| Gloss (60°) | ASTM D2457 | | 97 | | 85 | |
| Tg (° C.) | ASTM D5279-08 & | | | (150) | NA | |
| (Tan Delta) (° F.) | ASTM D4065-06 | | 302 | | NA | |
| HDT (0.455 Mpa/66 psi) (° C.) | ASTM D648-07 | | | (132) | | (75) |
| (0.250-inch bars) (° F.) | Method B | | 270 | | 169 | |
| High Speed Puncture | ASTM D3763-08 | | | | | |
| Thickness (mil (mm)) | | | 78.0 | (1.98) | 126.0 | (3.2) |
| Peak Force (Resistance) (lbf (Newton)) | | | 66.5 | (296) | 169.1 | (752) |
| Deformation at Peak Force (inches (mm)) | | | 0.27 | (6.92) | 0.48 | (12.3) |
| Energy at Peak Force (ft-lb (Joule)) | | | 0.71 | (0.96) | | |
| Total Energy (ft-lb (Joule)) | | | 3.02 | (4.09) | 5.62 | (7.62) |
| Failure Mode | | | Brittle | | Brittle | |
| Stress Whitening | | | | | | |
| Flexural Modulus (tangent) | ASTM D790-07 | | | | | |
| (0.125-inch bars) (psi (Mpa)) | Procedure A | | 415,000 | (2864) | 385,000 | (2657) |
| Flexural Strength* | ASTM D790-07 | | | | | |
| (0.125-inch bars) (psi (Mpa)) | Procedure A | | 15,100 | (104.2) | 13,100 | (90.4) |

TABLE 7A-continued

Injection Molded Properties of One-Component COC & E-140 Compounds & TOPAS 8007F-400 Reference

| | | | | | |
|---|---|---|---|---|---|
| Notched Izod Impact | ASTM D256-06a | | | | |
| (0.250-inch bars) | Method A | 0.45 | (24.0) | 0.40 | (21.4) |
| (ft-lb/in (J/m)) | | | | | |

*= flexural stress at 5% Strain

TABLE 7B

Injection Molded Properties of Two-Component COC & E-140 Compounds

| | | Compound ID Description | C09-10-8 40.0% 9506F-04 40.0% 6013X20 T1 20.0% E-140 | | C09-10-9 40.0% 9903D-10 40.0% 6013X20 T1 20.00% E-140 | | C09-1-6 40.00% 6013 40.00% 8007 20.00% E-140 | |
|---|---|---|---|---|---|---|---|---|
| Property | Method | | English | (Metric) | English | (Metric) | English | (Metric) |
| Specific Gravity (g/cc) | ASTM D792 | | | (1.0) | | (1.0) | | (1.00) |
| Haze (%) | ASTM D1003-00 B | | 45 | | 39 | | 91 | |
| Clarity (%) | ASTM D1003-00 B | | 99 | | 99 | | 93 | |
| Transmittance (%) | ASTM D1003-00 B | | 68 | | 70 | | 68 | |
| Gloss (60°) | ASTM D2457 | | 108 | | 106 | | 96 | |
| HDT (0.455 Mpa/66 psi) (° C.) | ASTM D648-07 | | | (83) | | (51) | | (97) |
| (0.250-inch bars) (° F.) | Method B | | 181 | | 123 | | 206 | |
| High Speed Puncture | ASTM D3763-08 | | | | | | | |
| Thickness (mil (mm)) | | | 78.0 | (1.98) | 79.1 | (2.01) | 74.4 | (1.89) |
| Peak Force (Resistance) (lbf (Newton)) | | | 85.4 | (380) | 436.1 | (1940) | 447.4 | (1990) |
| Deformation at Peak Force (inches (mm)) | | | 0.23 | (5.8) | 0.69 | (17.4) | 0.62 | (15.8) |
| Energy at Peak Force (ft-lb (Joule)) | | | 0.85 | (1.15) | 14.82 | (20.1) | 11.80 | (16.00) |
| Total Energy (ft-lb (Joule)) | | | 1.97 | (2.67) | 19.77 | (26.8) | 22.13 | (30.00) |
| Failure Mode | | | Brittle | | DUCTILE | | DUCTILE | |
| Stress Whitening | | | | | None | | Moderate | |
| Flexural Modulus (tangent) | ASTM D790-07 | | | | | | | |
| (0.125-inch bars) (psi (Mpa)) | Procedure A | | 268,000 | (1849) | 217,000 | (1497) | 330,000 | (2277) |
| Flexural Strength* | ASTM D790-07 | | | | | | | |
| (0.125-inch bars) (psi (Mpa)) | Procedure A | | 9,420 | (65.0) | 6,940 | (47.9) | 12,000 | (82.8) |
| Notched Izod Impact | ASTM D256-06a | | | | | | | |
| (0.250-inch bars) (ft-lb/in (J/m)) | Method A | | 0.77 | (41.1) | 0.94 | (50.2) | 0.78 | (41.7) |

| | | Compound ID Description | C09-10-6 40.0% 9506F-04 40.0% 8007F-04 20.0% E-140 | | C09-10-7 30.0% 9903D-10 50.0% 8007F-04 20.0% E-140 | |
|---|---|---|---|---|---|---|
| Property | Method | | English | (Metric) | English | (Metric) |
| Specific Gravity (g/cc) | ASTM D792 | | | (1.0) | | (1.0) |
| Haze (%) | ASTM D1003-00 B | | 59 | | 44 | |
| Clarity (%) | ASTM D1003-00 B | | 98 | | 98 | |
| Transmittance (%) | ASTM D1003-00 B | | 70 | | 69 | |
| Gloss (60°) | ASTM D2457 | | 101 | | 103 | |
| HDT (0.455 Mpa/66 psi) (° C.) | ASTM D648-07 | | | (67) | | (54) |
| (0.250-inch bars) (° F.) | Method B | | 153 | | 129 | |
| High Speed Puncture | ASTM D3763-08 | | | | | |
| Thickness (mil (mm)) | | | 83.1 | (2.11) | 92.1 | (2.3) |
| Peak Force (Resistance) (lbf (Newton)) | | | 483.3 | (2150) | 535.0 | (2380) |
| Deformation at Peak Force (inches (mm)) | | | 0.78 | (19.7) | 0.80 | (20.3) |
| Energy at Peak Force (ft-lb (Joule)) | | | 19.18 | (26) | 21.32 | (28.9) |
| Total Energy (ft-lb (Joule)) | | | 21.98 | (29.8) | 26.18 | (35.5) |
| Failure Mode | | | DUCTILE | | DUCTILE | |
| Stress Whitening | | | Light | | Light | |
| Flexural Modulus (tangent) | ASTM D790-07 | | | | | |
| (0.125-inch bars) (psi (Mpa)) | Procedure A | | 281,000 | (1939) | 280,000 | (1932) |
| Flexural Strength* | ASTM D790-07 | | | | | |
| (0.125-inch bars) (psi (Mpa)) | Procedure A | | 9,700 | (66.9) | 9,380 | (64.7) |

TABLE 7B-continued

Injection Molded Properties of Two-Component COC & E-140 Compounds

| | | | | | |
|---|---|---|---|---|---|
| Notched Izod Impact (0.250-inch bars) (ft-lb/in (J/m)) | ASTM D256-06a Method A | 0.77 | (41.1) | 0.87 | (46.5) |

*= flexural stress at 5% Strain

TABLE 7C

Injection Molded Properties of Zeonor & Zeonex with E-140 Compounds

| Compound ID Description | | C09-10-4 80.00% Zeonex 690R 20.00% E-140 | | C09-10-3 80.00% Zeonor 750R 20.00% E-140 | |
|---|---|---|---|---|---|
| Property | Method | English | (Metric) | English | (Metric) |
| Specific Gravity (g/cc) | ASTM D792 | | (1.0) | | (1.0) |
| Haze (%) | ASTM D1003-00 B | 91 | | 46 | |
| Clarity (%) | ASTM D1003-00 B | 87 | | 98 | |
| Transmittance (%) | ASTM D1003-00 B | 59 | | 74 | |
| Gloss (60°) | ASTM D2457 | 98 | | 143 | |
| High Speed Puncture | ASTM D3763-08 | | | | |
| Thickness (mil (mm)) | | 79.5 | (2.02) | 78.3 | (1.99) |
| Peak Force (Resistance) (lbf (Newton)) | | 672.2 | (2990) | 519.3 | (2310) |
| Deformation at Peak Force (inches (mm)) | | 0.68 | (17.3) | 0.70 | (17.7) |
| Energy at Peak Force (ft-lb (Joule)) | | 19.18 | (26.00) | 15.71 | (21.30) |
| Total Energy (ft-lb (Joule)) | | 20.43 | (27.70) | 17.78 | (24.10) |
| Failure Mode | | DUCTILE | | DUCTILE | |
| Stress Whitening | | Light | | None | |

TABLE 7D

Injection Molded Properties of Impact Modified 6013 w/Kraton & Compatibilizers

| | | C09-10-1 Coperion | | C09-10-11 Coperion | | C09-10-10 Coperion | |
|---|---|---|---|---|---|---|---|
| | Compound ID Description | 80.0% 6013X20 T1 20.0% RP6935 | | 78.0% 6013S-04 20.0% RP6935 2.0% Septon 2104 | | 78.0% 6013S-04 20.0% RP6935 2.0% E-140 | |
| Property | Method | English | (Metric) | English | (Metric) | English | (Metric) |
| Specific Gravity (g/cc) | ASTM D792 | | (1.0) | | (1.0) | | (1.0) |
| Haze (%) | ASTM D1003-00 B | 15 | | 15 | | 6 | |
| Clarity (%) | ASTM D1003-00 B | 100 | | 100 | | 100 | |
| Transmittance (%) | ASTM D1003-00 B | 86 | | 86 | | 85 | |
| Gloss (60°) | ASTM D2457 | 141 | | 141 | | 153 | |
| HDT (0.455 Mpa/66 psi) (° C.) | ASTM D648-07 | | (128) | No Test | | | (128) |
| (0.250-inch bars) (° F.) | Method B | 262 | | No Test | | 262 | |
| High Speed Puncture | ASTM D3763-08 | | | | | | |
| Thickness (mil (mm)) | | 79.1 | (2.01) | 77.6 | (1.97) | 77.6 | (2.0) |
| Peak Force (Resistance) (lbf (Newton)) | | 528.3 | (2350) | 541.8 | (2410) | 537.3 | (2390) |
| Deformation at Peak Force (inches (mm)) | | 0.64 | (16.2) | 0.71 | (18) | 0.70 | (17.8) |
| Energy at Peak Force (ft-lb (Joule)) | | 15.56 | (21.1) | 18.81 | (25.5) | 18.66 | (25.3) |
| Total Energy (ft-lb (Joule)) | | 20.50 | (27.8) | 20.21 | (27.4) | 20.06 | (27.2) |
| Failure Mode | | DUCTILE | | DUCTILE | | DUCTILE | |
| Stress Whitening | | Heavy | | Heavy | | Heavy | |
| Flexural Modulus (tangent) (0.125-inch bars) (psi (Mpa)) | ASTM D790-07 Procedure A | 319,000 | (2201) | 303,000 | (2091) | 303,000 | (2091) |
| Flexural Strength* (0.125-inch bars) (psi (Mpa)) | ASTM D790-07 Procedure A | 11,500 | (79.4) | 11,100 | (76.6) | 10,900 | (75.2) |
| Notched Izod Impact (0.250-inch bars) (ft-lb/in (J/m)) | ASTM D256-06a Method A | 2.92 | (155.9) | 3.52 | (188.0) | 2.50 | (133.5) |
| | | Complete | | Complete | | Complete | |

TABLE 7D-continued

Injection Molded Properties of Impact Modified 6013 w/Kraton & Compatibilizers

| Compound ID Description | | C09-10-12 Coperion 78.0% 6013S-04 18.0% RP6935 2.0% E-140 2.0% Septon 2104 | | C09-10-13 Coperion 78.0% 6013S-04 16.0% RP6935 3.0% E-140 3.0% Septon 2104 | |
|---|---|---|---|---|---|
| Property | Method | English | (Metric) | English | (Metric) |
| Specific Gravity (g/cc) | ASTM D792 | | (1.0) | | (1.0) |
| Haze (%) | ASTM D1003-00 B | 6 | | 9 | |
| Clarity (%) | ASTM D1003-00 B | 100 | | 100 | |
| Transmittance (%) | ASTM D1003-00 B | 85 | | 84 | |
| Gloss (60°) | ASTM D2457 | 150 | | 148 | |
| HDT (0.455 Mpa/66 psi) (° C.) | ASTM D648-07 | No Test | | No Test | |
| (0.250-inch bars) (° F.) | Method B | No test | | No Test | |
| High Speed Puncture | ASTM D3763-08 | | | | |
| Thickness (mil (mm)) | | 77.6 | (1.97) | 78.0 | (1.98) |
| Peak Force (Resistance) (lbf (Newton)) | | 537.3 | (2390) | 530.5 | (2360) |
| Deformation at Peak Force (inches (mm)) | | 0.71 | (18.1) | 0.66 | (16.8) |
| Energy at Peak Force (ft-lb (Joule)) | | 19.03 | (25.8) | 16.82 | (22.80) |
| Total Energy (ft-lb (Joule)) | | 20.43 | (27.7) | 18.96 | (25.70) |
| Failure Mode | | DUCTILE | | DUCTILE | |
| Stress Whitening | | | | | |
| Flexural Modulus (tangent) | ASTM D790-07 | | | | |
| (0.125-inch bars) (psi (Mpa)) | Procedure A | No Test | | No Test | |
| Flexural Strength* | ASTM D790-07 | | | | |
| (0.125-inch bars) (psi (Mpa)) | Procedure A | No Test | | No Test | |
| Notched Izod Impact | ASTM D256-06a | | | | |
| (0.250-inch bars) (ft-lb/in (J/m)) | Method A | 2.14 | (114.3) | 1.70 | (90.8) |
| | | Complete | | Complete | |

*= flexural stress at 5% Strain

In general, stress whitening of rigid COC modified with styrene block copolymers was observed during impact testing. Stress whitening is the change in the index of refraction between two polymer phases, such as COC matrix and SBC dispersed phase. Without intending to be bound by theory, it is believed that during an impact event, polymer chain movement causes loss of adhesion between dissimilar phases as impact energy is absorbed. All of the specimens tested for styrene copolymer-COC blends had the appearance of the specimen shown in FIG. 2. As can be seen in that photo, all styrene copolymer—COC compounds exhibit obvious, heavy stress whitening around the impact site, as well as remote stress whitening due to flexing at the clamp. Compatibilizers, either E-140 or other styrene block copolymers, did not noticeably reduce or influence stress whitening as seen in FIG. 2.

6-mil Films From 8007 & 6013 Compounded with E-140 Prior to Film Extrusion (See Table 8A Below)

TOPAS 9506X5 is a "robust" processing grade. This means the polymer can be extruded over a broader temperature range with minimal un-melted polymeric residues. One draw back is higher haze and lower gloss as compared to standard, non-robust COC grades. Specifically, TOPAS 9506X5 has 15 percent total haze and 60 degree gloss of 132. However, clarity and transmittance remains very high, indicating excellent contact clarity. E-140 compounded into either 8007 or 6013 exhibits not only robust processing behavior, but also low total haze. For example, the total haze of TOPAS 8007F-04 with 7.5 and 15 percent E-140 is 4.5 and 8.3 percent respectively. 60 degree gloss improved to 148 and 144. These very favorable results were unexpected.

The appearance of TOPAS 6013S-04 and 6013x20 T1 compounded with 7.5 to 15 percent E-140 were inferior to 9506X5. This can be explained by differences in molecular weight, norbornene comonomer content and refractive indices as a function of temperature. However, a compound containing equal percentages of 8007 and 6013 with 20 percent E-140 (F09-38-5) had 60 degree gloss of 130 and total haze of 19.7 percent. Unexpectedly, the appearance of this compound nearly matches that of TOPAS 9506X5; and much better than 6013S-04 compounds with 15% E-140.

With a glass transition temperature more than 50° C. higher than 9506X5, this compound (F09-38-5) creates new opportunities for COC in film applications. For example, nylon can be replaced by this compound (F09-38-5) to simplify laminated and multilayer coextruded film structures and to enable reclaim and recyclability with other polyolefins. Multilayer coextrusion of polyolefins and non-polyolefins such as nylon and nylon tie layers are very difficult technically and economically to recycle because of chemical dissimilarities.

It is seen from the 6-mil film data that slow puncture of 8007 with 15% E-140 and 8007/6013 with 20% E-140 improved significantly in both puncture resistance and energy versus TOPAS 9506X5. The results are similar with respect to fast puncture. All films exhibit excellent tensile strength and stiffness. Elongation at break of 8007 with 15% E-140 and 8007/6013 with 20% E-140 was significantly higher, especially in the transverse direction. Anisotropic properties are common with cast extruded films. However, greater elongation or ductility is consistent with improved puncture and impact resistance of these blends. Tear resistance of 8007 with either 7.5 or 15 percent E-140 was good. Films with tear resistance values below 100 grams usually tear easily and unexpectedly; which could be a problem for some applications. 6013 with up to 15% E-140 had rather low tear resistance. However, 8007/6013 with 20% E-140 improved MD/TD tear resistance to 140/180 grams.

TABLE 8A 6-mil Film Properties of 8007 and 6013 Pre-Compounded Material and TOPAS 9506X5 Reference

| | Sample ID | F09-38-1 | F09-38-2 | F09-38-4 | F09-38-3 |
|---|---|---|---|---|---|
| | Compound ID | C09-1-1 | C09-1-2 | C09-1-3 | C09-1-4 |
| | Description | 92.5% 8007 7.5% E-140 | 85% 8007 15% E-140 | 90% 6013 10% E-140 | 92.5% 6013X20 T1 7.5% E-140 |
| Property | Method | English | English | English | English |
| Haze (%) | ASTM D1003-00 B | 4.5 | 8.3 | 16.2 | 13.4 |
| Clarity (%) | ASTM D1003-00 B | 98.1 | 98.1 | 92.8 | 95.2 |
| Transmittance (%) | ASTM D1003-00 B | 88.7 | 88.2 | 85.4 | 87.2 |
| Gloss (60°) | ASTM D2457 | 148 | 144 | 128 | 138 |
| Slow Puncture | | | | | |
| Resistance at Break (lbf) | ASTM F1306-90 (mod) | 26.6 | 25.3 | 7.25 | 7.61 |
| Displacement (in) | ASTM F1306-90 (mod) | 0.54 | 0.56 | 0.06 | 0.06 |
| Energy (lb-in) | ASTM F1306-90 (mod) | 9.06 | 9.00 | 0.27 | 0.28 |
| Fast Puncture | | | | | |
| Resistance (lbf) | ISO 7765-2 (1994)E | 15.55 | 17.55 | 13.98 | 13.75 |
| Displacement (in) | ISO 7765-2 (1994)E | 0.096 | 0.107 | 0.092 | 0.087 |
| Energy at Peak Force (ft-lb) | ISO 7765-2 (1994)E | 0.057 | 0.070 | 0.046 | 0.048 |
| Total Energy (ft-lbs) | ISO 7765-2 (1994)E | 0.073 | 0.089 | 0.063 | 0.059 |
| Tensile Modulus (1% Secant) | | | | | |
| MD (psi) | ASTM D 882-02 | 305,000 | 286,000 | 332,000 | 336,000 |
| TD (psi) | ASTM D 882-02 | 301,000 | 271,000 | 314,000 | 335,000 |
| Tensile at Break | | | | | |
| MD (psi) | ASTM D 882-02 | 7,850 | 7,350 | 8,290 | 8,360 |
| TD (psi) | ASTM D 882-02 | 6,310 | 4,780 | 7,120 | 7,270 |
| Elongation at Break | | | | | |
| MD (%) | ASTM D 882-02 | 3.2 | 3.2 | 3.3 | 3.3 |
| TD (%) | ASTM D 882-02 | 3.0 | 62.0 | 3.1 | 2.9 |
| Tensile at Yield | | | | | |
| MD (psi) | ASTM D 882-02 | | | | |
| TD (psi) | ASTM D 882-02 | 6,510 | 5,840 | | |
| Elongation at Yield | | | | | |
| MD (%) | ASTM D 882-02 | | | | |
| TD (%) | ASTM D 882-02 | 2.8 | 2.9 | | |
| Tear Resistance | | | | | |
| MD (grams) | ASTM D1922-06a | 417 | 203 | 101 | 79 |
| TD (grams) | ASTM D1922-06a | 885 | 257 | 49 | 39 |

| | Sample ID | F09-38-6 | F09-38-5 | F08-5-6 | F07-74-2 |
|---|---|---|---|---|---|
| | Compound ID | C09-1-5 | C09-1-6 | | |
| | Description | 85% 6013 15% E-140 | 40% 6013 40% 8007 20% E-140 | 100% 9506X5 | |
| Property | Method | English | English | English | |
| Haze (%) | ASTM D1003-00 B | 25.9 | 19.7 | 15.0 | |
| Clarity (%) | ASTM D1003-00 B | 92.6 | 98.4 | 99.0 | |
| Transmittance (%) | ASTM D1003-00 B | 81.0 | 86.6 | 91.2 | |
| Gloss (60°) | ASTM D2457 | 100 | 130 | 132 | |
| Slow Puncture | | | | | |
| Resistance at Break (lbf) | ASTM F1306-90 (mod) | 7.94 | 23.50 | 18.0 | |
| Displacement (in) | ASTM F1306-90 (mod) | 0.07 | 0.51 | 0.28 | |
| Energy (lb-in) | ASTM F1306-90 (mod) | 0.39 | 7.73 | 3.93 | |
| Fast Puncture | | | | | |
| Resistance (lbf) | ISO 7765-2 (1994)E | 12.58 | 16.11 | 17.4 | |
| Displacement (in) | ISO 7765-2 (1994)E | 0.083 | 0.100 | 0.07 | |
| Energy at Peak Force (ft-lb) | ISO 7765-2 (1994)E | 0.047 | 0.062 | | |
| Total Energy (ft-lbs) | ISO 7765-2 (1994)E | 0.054 | 0.080 | 0.07 | |

TABLE 8A-continued 6-mil Film Properties of 8007 and 6013 Pre-Compounded Material and
TOPAS 9506X5 Reference

| Tensile Modulus (1% Secant) | | | | |
|---|---|---|---|---|
| MD (psi) | ASTM D 882-02 | 339,000 | 283,000 | 319,000 |
| TD (psi) | ASTM D 882-02 | 322,000 | 254,000 | 317,000 |
| Tensile at Break | | | | |
| MD (psi) | ASTM D 882-02 | 8,030 | 7,660 | 5,750 |
| TD (psi) | ASTM D 882-02 | 6,130 | 4,910 | 7,090 |
| Elongation at Break | | | | |
| MD (%) | ASTM D 882-02 | 3.0 | 3.6 | 57 |
| TD (%) | ASTM D 882-02 | 3.4 | 72.0 | 2.8 |
| Tensile at Yield | | | | |
| MD (psi) | ASTM D 882-02 | | | |
| TD (psi) | ASTM D 882-02 | 6,830 | 5,490 | |
| Elongation at Yield | | | | |
| MD (%) | ASTM D 882-02 | | | |
| TD (%) | ASTM D 882-02 | 2.8 | 3.4 | |
| Tear Resistance | | | | |
| MD (grams) | ASTM D1922-06a | 78 | 144 | |
| TD (grams) | ASTM D1922-06a | 39 | 181 | |

Pellet-Blended Film (See Table 8B)

6-mil monolayer films were extruded from pellet blends of several COC grades with between 15 and 30 weight percent E-140. Glass transition temperatures range between 33° and 160° C. for these COC grades. Four films, each with 9903, 9506, 8007 or 6013 contain 15% E-140. In addition to glass transition temperature, each grade differs with respect to molecular weight. All property changes correlate well to these changes in glass transition temperature and in molecular weight of rigid COC. Optical properties in general and total haze in particular increase from 1.9 percent to over 20 percent for blends made with 9903 and 6013 respectively. Slow puncture force and energy gradually declined with 9903, 9506 and 8007; but precipitously dropped with 6013; suggesting considerably less compatibility of E-140 and very high Tg COC grades such as 6013. Fast puncture force decreases from 48 pounds force to 15 foot pound and respective total energies decreases from 2.54 to 0.07 ft-lbs. As one would expect, tensile modulus, tensile strength at yield and ultimate tensile strength at break gradually increased. Differences between machine and transverse direction properties are not uncommon for cast extruded films. These properties tend to be higher in the machine direction because the film is pulled uniaxially, orienting the molecular chains in the machine direction during fabrication. Elongation at yield and elongation at break, which mirrors puncture properties, declined. Tear resistance of COC films is usually very low. 9903 and 9506 films with 15% E-140 had better than expected tear resistance, suggesting E-140 can perform as a tear resistance modifier with these specific grades.

Films made from high Tg COC are more desirable for applications which require heat resistance. Properties such as total haze, puncture resistance, especially force and energy, and tear resistance are much lower as compared against films made from low Tg COC. Blends of high and low Tg COC do improve these properties. For example, comparing 80% 8007 with 20% E-140 versus 40% 8007, 40% 9506 and 20% E-140 shows total haze decline from 12.4 to 11.3 percent; fast puncture resistance increase from 26.5 to 36 pound force; fast puncture total energy increase from 0.71 to 1.01 ft-lbs; and MD/TD tear resistance increased from 193/218 to 203/278 gram force. And, comparing 80% 6013 with 20% E-140 versus 40% 6013, 40% 9506 and 20% E-140 shows significant total haze decline from 21.3 to 14 percent; gloss measured at 60 degrees increase from 119 to 133; slow puncture resistance increased from 11.1 to 22.3 pounds force; slow puncture total energy increased from 0.71 to 6.27 lb-in; fast puncture resistance increased from 14.7 to 19.3 pounds force; fast puncture total energy increased from 0.072 to 0.101 ft-lbs. and MD/TD tear resistance increased from 99/106 to 173/180 grams force. Film structure made from 6015, COC with Tg of 160° C., will have more heat resistance than similar film from 6013 even though most mechanical properties did not change significantly.

TABLE 8B

Film Properties of 9903, 9506, 8007, 6013 and 6015 Pellet Blended with E-140

| 6-mil Films Pellet Blended | Description | 85% 9903D-10 15% E-140 | 85% 9506F-04 15% E-140 | 85% 8007 15% E-140 |
|---|---|---|---|---|
| Property | Method | | | |
| Sample ID | Sample ID | F10-15-8 | F10-15-2 | F09-14-14 |
| Total Haze (%) | ASTM D1003-00 B | 1.9 | 4.6 | 10.3 |
| Clarity (%) | ASTM D1003-00 B | 92.4 | 93.1 | 98.5 |
| Transmittance (%) | ASTM D1003-00 B | 90.2 | 89.1 | 88.8 |

TABLE 8B-continued

Film Properties of 9903, 9506, 8007, 6013 and 6015 Pellet Blended with E-140

| | | | | |
|---|---|---|---|---|
| Gloss (20°) | ASTM D2457 | 100 | 116 | 115 |
| Gloss (60°) | ASTM D2457 | 138 | 140 | 142 |
| Gloss (85°) | ASTM D2457 | 101 | 100 | 101 |
| Slow Puncture | | | | |
| Resistance at Break (lbf) | ASTM F1306-90 (mod) | 23.5 | 25.2 | 25.3 |
| Displacement (in) | ASTM F1306-90 (mod) | 0.91 | 0.61 | 0.56 |
| Energy (lb-in) | ASTM F1306-90 (mod) | 12.6 | 9.52 | 9.01 |
| Fast Puncture | | | | |
| Resistance (lbf) | ISO 7765-2 (1994)E | 48.5 | 26.1 | 18.6 |
| Displacement (in) | ISO 7765-2 (1994)E | 0.842 | 0.198 | 0.111 |
| Energy at Peak Force (ft-lbs) | ISO 7765-2 (1994)E | 2.39 | 0.25 | 0.077 |
| Total Energy (ft-lbs) | ISO 7765-2 (1994)E | 2.54 | 0.538 | 0.097 |
| Tensile Modulus (1% Secant) | | | | |
| MD (psi) | ASTM D 882-02 | 252,000 | 260,000 | 289,000 |
| TD (psi) | ASTM D 882-02 | 152,000 | 240,000 | 250,000 |
| Tensile at Break | | | | |
| MD (psi) | ASTM D 882-02 | 4,340 | 6,380 | 6,960 |
| TD (psi) | ASTM D 882-02 | 4,800 | 4,130 | 4,390 |
| Elongation at Break | | | | |
| MD (%) | ASTM D 882-02 | 210.0 | 3.1 | 2.9 |
| TD (%) | ASTM D 882-02 | 370.0 | 52.0 | 21.0 |
| Tensile at Yield | | | | |
| MD (psi) | ASTM D 882-02 | 4,580 | — | — |
| TD (psi) | ASTM D 882-02 | 4,120 | 5,060 | 5,200 |
| Elongation at Yield | | | | |
| MD (%) | ASTM D 882-02 | 2.6 | — | — |
| TD (%) | ASTM D 882-02 | 6.3 | 2.8 | 2.7 |
| Tear Resistance | | | | |
| MD (grams) | ASTM D1922-06a | 648 | 265 | 192 |
| TD (grams) | ASTM D1922-06a | 900 | 407 | 296 |
| 6-mil Films Pellet Blended | Description | 85% 6013 15% E-140 | 80% 8007 20% E-140 | 40% 8007F-04 40% 9506F-04 20% E-140 |

| Property | Method | | | |
|---|---|---|---|---|
| Sample ID | Sample ID | F09-14-10 | F09-14-18 | F10-15-12 |
| Total Haze (%) | ASTM D1003-00 B | 21.9 | 12.4 | 11.3 |
| Clarity (%) | ASTM D1003-00 B | 90.9 | 96.9 | 87.4 |
| Transmittance (%) | ASTM D1003-00 B | 86.1 | 88.7 | 88.4 |
| Gloss (20°) | ASTM D2457 | 68 | 95 | 93 |
| Gloss (60°) | ASTM D2457 | 119 | 133 | 125 |
| Gloss (85°) | ASTM D2457 | 94 | 99 | 96 |
| Slow Puncture | | | | |
| Resistance at Break (lbf) | ASTM F1306-90 (mod) | 10.8 | 23.5 | 23.7 |
| Displacement (in) | ASTM F1306-90 (mod) | 0.11 | 0.56 | 0.59 |
| Energy (lb-in) | ASTM F1306-90 (mod) | 0.61 | 8.53 | 8.79 |
| Fast Puncture | | | | |
| Resistance (lbf) | ISO 7765-2 (1994)E | 15.3 | 26.5 | 36.0 |
| Displacement (in) | ISO 7765-2 (1994)E | 0.099 | 0.175 | 0.265 |
| Energy at Peak Force (ft-lbs) | ISO 7765-2 (1994)E | 0.058 | 0.221 | 0.439 |
| Total Energy (ft-lbs) | ISO 7765-2 (1994)E | 0.074 | 0.717 | 1.01 |
| Tensile Modulus (1% Secant) | | | | |
| MD (psi) | ASTM D 882-02 | 292,000 | 276,000 | 238,000 |
| TD (psi) | ASTM D 882-02 | 249,000 | 222,000 | 202,888 |
| Tensile at Break | | | | |
| MD (psi) | ASTM D 882-02 | 8,000 | 6,140 | 6,090 |
| TD (psi) | ASTM D 882-02 | 4,860 | 4,630 | 4,320 |
| Elongation at Break | | | | |
| MD (%) | ASTM D 882-02 | 4.3 | 4.0 | 3.2 |
| TD (%) | ASTM D 882-02 | 24.0 | 200.0 | 160.0 |

TABLE 8B-continued

Film Properties of 9903, 9506, 8007, 6013 and 6015 Pellet Blended with E-140

| | | | | |
|---|---|---|---|---|
| Tensile at Yield | | | | |
| MD (psi) | ASTM D 882-02 | — | 6,150 | — |
| TD (psi) | ASTM D 882-02 | 5,360 | 4,660 | 4,550 |
| Elongation at Yield | | | | |
| MD (%) | ASTM D 882-02 | — | 2.7 | — |
| TD (%) | ASTM D 882-02 | 3.6 | 3.2 | 3.3 |
| Tear Resistance | | | | |
| MD (grams) | ASTM D1922-06a | 103 | 193 | 203 |
| TD (grams) | ASTM D1922-06a | 100 | 218 | 278 |
| 6-mil Films Pellet Blended | Description | 80% 6013 20% E-140 | 40% 6013X20 40% 9506F-04 20% E-140 | 40% 6015S-04 40% 9506F-04 20% E-140 |
| Property | Method | | | |
| Sample ID | Sample ID | F09-14-6 | F10-15-14 | F10-15-16 |
| Total Haze (%) | ASTM D1003-00 B | 21.3 | 14.0 | 16.1 |
| Clarity (%) | ASTM D1003-00 B | 91.4 | 91.8 | 64.3 |
| Transmittance (%) | ASTM D1003-00 B | 86.4 | 87.2 | 87.7 |
| Gloss (20°) | ASTM D2457 | 65 | 106 | 23 |
| Gloss (60°) | ASTM D2457 | 115 | 133 | 82 |
| Gloss (85°) | ASTM D2457 | 94 | 100 | 91 |
| Slow Puncture | | | | |
| Resistance at Break (lbf) | ASTM F1306-90 (mod) | 11.10 | 22.3 | 22.0 |
| Displacement (in) | ASTM F1306-90 (mod) | 0.12 | 0.42 | 0.46 |
| Energy (lb-in) | ASTM F1306-90 (mod) | 0.71 | 6.27 | 6.78 |
| Fast Puncture | | | | |
| Resistance (lbf) | ISO 7765-2 (1994)E | 14.7 | 19.3 | 17.1 |
| Displacement (in) | ISO 7765-2 (1994)E | 0.097 | 0.108 | 0.098 |
| Energy at Peak Force (ft-lbs) | ISO 7765-2 (1994)E | 0.055 | 0.076 | 0.062 |
| Total Energy (ft-lbs) | ISO 7765-2 (1994)E | 0.072 | 0.101 | 0.082 |
| Tensile Modulus (1% Secant) | | | | |
| MD (psi) | ASTM D 882-02 | 297,000 | 262,000 | 269,000 |
| TD (psi) | ASTM D 882-02 | 238,000 | 212,000 | 238,000 |
| Tensile at Break | | | | |
| MD (psi) | ASTM D 882-02 | 8,090 | 6,770 | 7,090 |
| TD (psi) | ASTM D 882-02 | 5,150 | 4,720 | 4,820 |
| Elongation at Break | | | | |
| MD (%) | ASTM D 882-02 | 4.3 | 3.3 | 3.4 |
| TD (%) | ASTM D 882-02 | 9.8 | 62 | 63 |
| Tensile at Yield | | | | |
| MD (psi) | ASTM D 882-02 | — | — | — |
| TD (psi) | ASTM D 882-02 | 5,150 | 5,450 | 5,430 |
| Elongation at Yield | | | | |
| MD (%) | ASTM D 882-02 | — | — | — |
| TD (%) | ASTM D 882-02 | 4.1 | 4.7 | 3.9 |
| Tear Resistance | | | | |
| MD (grams) | ASTM D1922-06a | 99 | 173 | 166 |
| TD (grams) | ASTM D1922-06a | 106 | 180 | 157 |

Comparison of Nylon and Modified COC Film (See Tables 9, 10 Below)

Toughness of polymer films is usually not captured in a single test. Typically several tests are used to quantify the various dimensions of toughness including slow and fast puncture, tear resistance, elongation at break and Gelbo flex crack resistance. Under ASTM F392-93 protocols, a film specimen is attached around a circular fixed and moveable mandrel, forming a cylinder. During one cycle, the moveable mandrel comes forward, simultaneously compressing and twisting the film and releases, returning to original position. Tests can run from 10 to 1000 cycles. Condition C specifies 250 cycles. After subjecting the film to predetermined number of cycles, the number of pinholes and cracks in the film is counted. Fewer pinholes imply that the film is flex crack resistant; which further implies that the film is durable.

Nylon films are very tough and durable. They are used in many packaging applications where tensile strength, transparency and toughness are required. An example of 6-mil 80/20 nylon 6/amorphous nylon film is shown in Table 9. This film (F09-14-2) has slow puncture resistance of 36 pounds force, fast puncture resistance of 56 pounds force, MD/TD elongation at break of 480 and 420 percent, tear resistance of 300-320 grams, and 12 pinholes or fewer after 250 Gelbo flex cycles. Moisture sensitivity is one of the deficiencies of nylon films. For this reason, nylon films are usually one or more layers of multilayer coextrusion or laminations. In multilayer structures, nylon layers typically require one or more adhesive layers to enable them to bond to polyolefins such as LLDPE, LDPE, HDPE and PP.

Surprisingly, four E-140 modified COC films are not only tough, but compare favorably to the performance of nylon. Total haze and gloss measured at 60 degrees of two films, 9903D-10 (F10-15-8) and 9506F-04 (F10-15-2), each modified with 15 percent E-140, was 1.9 percent and 138 and 4.6 percent and 140 respectively. Both were close enough to that of the nylon film (F09-14-2) for many multilayer applications. Fast puncture resistance for 85/15 9903D-10/E-140 (F10-15-2) and 70/30 9506F-04/E-140 (F10-15-6) were close to the 56 pound force of the nylon film; 48 and 53 pounds force respectively. Total energy, however, was much higher; 2.5 and 2.4 foot-pounds versus 0.8 foot pounds for the nylon film. MD/TD tear resistance for 85/15 9903D-10/ E-140 (F10-15-2) film compared favorably with the nylon film (F09-14-2), 265/407 versus 323/309 grams force respectively. MD/TD tear resistance for 85/15 9506-F-04/ E-140 (F10-15-2) film exceeded that of the nylon film, more than doubling to 648/900 grams force. Flex crack resistance of 70/30 9506F-04/E-140 (F10-15-6) versus nylon film (F09-14-2) was similar after 100, 250 and 500 cycles. Further optimization of COC blends consisting of 9903D-10, 9506-F094, 8007F-04 and E-140 would show additional mechanical property enhancements, some of which would be superior to nylon film.

Therefore, E-140 modified COC can be used to replace nylon in multilayer film packaging applications. E-140 modified COC are polyolefins and do not require any special tie layer resin to promote adhesion between polar and non-polar polymers. Replacement of both nylon and adjacent tie layers with impact modified COC layer or layers, free of adjacent chemically dissimilar tie layers, will enable a more sustainable and recyclable all olefin film.

TABLE 9

Film Properties of 6-mil Nylon 6/Amorphous Nylon Blend Versus Modified COC

| | | 6-mil Films Description | | | | |
|---|---|---|---|---|---|---|
| Property | Method | Nylon 80% Ultramid B33 20% Selar PA-3426 | 40% 8007F-04 40% 9506F-04 20% E-140 | 85% 9903D-10 15% E-140 | 85% 9506F-04 15% E-140 | 70% 9506F-04 30% E-140 |
| Sample ID | Sample ID | F09-14-2 | F10-15-12 | F10-15-8 | F10-15-2 | F10-15-6 |
| Total Haze (%) | ASTM D1003-00 B | 0.4 | 11.3 | 1.9 | 4.6 | 11.3 |
| Gloss (60°) | ASTM D2457 | 163 | 125 | 138 | 140 | 125 |
| Slow Puncture | | | | | | |
| Resistance at Break (lbf) | ASTM F1306-90 (mod) | 36.6 | 23.7 | 23.5 | 25.2 | 24.7 |
| Displacement (in) | ASTM F1306-90 (mod) | 0.99 | 0.59 | 0.91 | 0.61 | 0.7 |
| Energy (lb-in) | ASTM F1306-90 (mod) | 22.9 | 8.79 | 12.6 | 9.52 | 10.7 |
| Fast Puncture | | | | | | |
| Resistance (lbf) | ISO 7765-2 (1994)E | 56.7 | 36.0 | 48.5 | 26.1 | 53.9 |
| Displacement (in) | ISO 7765-2 (1994)E | 0.200 | 0.265 | 0.842 | 0.198 | 0.76 |
| Energy at Peak Force (ft-lbs) | ISO 7765-2 (1994)E | 0.398 | 0.439 | 2.39 | 0.25 | 2.28 |
| Total Energy (ft-lbs) | ISO 7765-2 (1994)E | 0.833 | 1.01 | 2.54 | 0.538 | 2.40 |
| Tensile Modulus (1% Secant) | | | | | | |
| MD (psi) | ASTM D 882-02 | 222,000 | 238,000 | 252,000 | 260,000 | 229,000 |
| TD (psi) | ASTM D 882-02 | 259,000 | 202,888 | 152,000 | 240,000 | 306,000 |
| Tensile at Break | | | | | | |
| MD (psi) | ASTM D 882-02 | 10,100 | 6,090 | 4,340 | 6,380 | 4,490 |
| TD (psi) | ASTM D 882-02 | 9,640 | 4,320 | 4,800 | 4,130 | 6,260 |
| Elongation at Break | | | | | | |
| MD (%) | ASTM D 882-02 | 480 | 3.2 | 210.0 | 3.1 | 87.0 |
| TD (%) | ASTM D 882-02 | 420 | 160.0 | 370.0 | 52.0 | 160.0 |
| Tear Resistance | | | | | | |
| MD (grams) | ASTM D1922-06a | 323 | 203 | 648 | 265 | 220 |
| TD (grams) | ASTM D1922-06a | 309 | 278 | 900 | 407 | 225 |
| Flex (Gelbo) Durability (# pinholes) | | | | | | |
| 100 Cycles (MD) | ASTM F392-93 | 5 | | 3 | 21 | 1 |
| 100 Cycles (TD) | Modified Condition C | 4 | | 3 | 25 | 2 |
| 250 Cycles (MD) | | 10 | | 15 | 39 | 7 |
| 250 Cycles (TD) | (Lab Average) | 12 | | 19 | 45 | 12 |

TABLE 9-continued

Film Properties of 6-mil Nylon 6/Amorphous Nylon Blend Versus Modified COC

| | | 6-mil Films Description | | | | |
|---|---|---|---|---|---|---|
| Property | Method | Nylon 80% Ultramid B33 20% Selar PA-3426 | 40% 8007F-04 40% 9506F-04 20% E-140 | 85% 9903D-10 15% E-140 | 85% 9506F-04 15% E-140 | 70% 9506F-04 30% E-140 |
| 500 Cycles (MD) | | 21 | 25 | | 49 | 18 |
| 500 Cycles (TD) | | 21 | 29 | | 53 | 14 |

Typical Cast Film Process Conditions (Table 10)

Typical cast film processing conditions are summarized in Table 10 for several 6-mil films of 8007 and 6013 impact modified with 15 or 20 percent E-140. Mechanical properties of these films are shown in Table 8A and Table 8B. Typical film extrusion processing conditions are seen in Table 10 for pellet blends and pre-compounded material on the same film extrusion line and it is seen extrusion conditions are similar.

An added benefit of the invention is that pre-compounding is not required, due in part to excellent compatibility. Total haze 6-mil film compounded (F09-38-2) versus pellet blend (F09-14-14) is 8.3 and 10.3 percent respectively. 60 degree gloss is 144 and 142 respectively. A similar comparison can be made for 6013 with 15 percent E-140. Total haze and 60 degree gloss of 6-mil film compounded (F09-38-6) versus pellet blend (F09-14-10) are 25.9 and 21.9 percent and 100 and 119 respectively. It is seen in Table 8A and Table 8B that pellet blends have similar film properties to the extruded pre-compounded material, eliminating the need for pre-compounding provided that the extruders provide adequate mixing. E-140 mixes and disperses easily into rigid COC. Thus, a film producer can tailor the properties of the film without having to produce or inventory pre-compounded materials.

TABLE 10

Typical Film Extrusion Process Conditions For Pre-Compounded and Pellet Blends

| | F09-38-1 C09-1-1 92.5% 8007 7.5% E-140 | F09-38-2 C09-1-2 85% 8007 15% E-140 | F09-14-14 PELLET BLEND 85% 8007 15% E-140 | F09-38-4 C09-1-3 90% 6013 10% E-140 |
|---|---|---|---|---|
| Extrusion Method | Cast | Cast | Cast | Cast |
| Number of Layers | Monolayer | Monolayer | Monolayer | Monolayer |
| Screw Type | Barrier | Barrier | Barrier | Barrier |
| Rate (lb/hr) | 25 | 25 | 18.6 | 25 |
| Line Speed (FPM) | 12.6 | 12.6 | 12 | 12.6 |
| Nominal Gauge (mil) | 6 | 6 | 6 | 6 |
| Extrusion Temperature (° C.) Zone 1 (Feed) | 225 | 214 | 226 | 236 |
| Zone 2 | 225 | 220 | 230 | 240 |
| Zone 3 | 225 | 225 | 230 | 246 |
| Zone 4 (Die) | 225 | 225 | 230 | 245 |
| Clamp Ring Temperature (° C.) | 225 | 225 | 230 | 245 |
| Inlet Adaptor Temperature (° C.) | 225 | 225 | 230 | 245 |
| Pump Temperature (° C.) | 225 | 225 | 230 | 245 |
| Outlet Adaptor 1 Temperature (° C.) | 225 | 225 | 230 | 246 |
| Outlet Adaptor 2 Temperature (° C.) | 225 | 225 | 230 | 245 |
| Melt Barrel Temperature (° C.) | 252 | 252 | 256 | 272 |
| Melt Pump Temperature (° C.) | 239 | 240 | 245 | 259 |
| Feed Block 1 Temperature (° C.) | 225 | 225 | 230 | 245 |
| Feed Block 2 Temperature (° C.) | 225 | 225 | 230 | 245 |
| Die 1 Temperature (° C.) | 230 | 230 | 230 | 245 |
| Die 2 Temperature (° C.) | 231 | 231 | 230 | 247 |
| Die 3 Temperature (° C.) | 230 | 230 | 230 | 245 |
| Die Lip Heater 1 Temperature (° C.) | 230 | 230 | 231 | 246 |
| Die Lip Heater 2 Temperature (° C.) | 230 | 230 | 224 | 246 |
| Screw AMPS | 10.61 | 10.47 | 9.3 | 9.55 |
| Screw Speed (RPM) | 120 | 124 | 126 | 144 |
| Melt Barrel Pressure (psig) | 1,287 | 1,289 | 1,343 | 1,248 |
| Pump AMPS | 1.14 | 0.43 | 0.42 | 0.43 |
| Pump Speed (RPM) | 17.44 | 17.2 | 16.42 | 16.98 |
| Melt Pump Pressure (psig) | — | — | — | — |
| Melt Adaptor (psig) | 498 | 491 | 640 | 576 |
| Die Pressure (psig) | 66 | 75.7 | 68.4 | 222.2 |
| Die Gap (inch) | 0.025 | 0.025 | 0.015 | 0.025 |
| Right Roll Speed (RPM) | 12.56 | 12.45 | 11.95 | 11.35 |
| Middle Roll Speed (RPM) | 12.58 | 12.47 | 11.97 | 11.37 |
| Left Roll Speed (RPM) | 12.54 | 12.45 | 11.93 | 11.35 |
| Haul-Off Roll Speed (RPM) | 12.65 | 12.49 | 12.06 | 11.44 |
| Right Roll Temperature (° F.) | 170 | 170 | 140 | 230 |
| Middle Roll Temperature (° F.) | 160 | 160 | 150 | 215 |
| Left Roll Temperature (° F.) | 150 | 150 | 160 | 200 |

TABLE 10-continued

Typical Film Extrusion Process Conditions For Pre-Compounded and Pellet Blends

| | F09-38-3<br>C09-1-4<br>92.5% 6013X20 T1<br>7.5% E-140 | F09-38-6<br>C09-1-5<br>85% 6013<br>15% E-140 | F09-14-10<br>PELLET BLEND<br>85% 6013<br>15% E-140 | F09-38-5<br>C09-1-6<br>40% 6013<br>40% 8007<br>20% E-140 |
|---|---|---|---|---|
| Extrusion Method | Cast | Cast | Cast | Cast |
| Number of Layers | Monolayer | Monolayer | Monolayer | Monolayer |
| Screw Type | Barrier | Barrier | Barrier | Barrier |
| Rate (lb/hr) | 25 | 25 | 18.6 | 25 |
| Line Speed (FPM) | 12.6 | 12.6 | 12 | 12.6 |
| Nominal Gauge (mil) | 6 | 6 | 6 | 6 |
| Extrusion Temperature (° C.) Zone 1 (Feed) | 235 | 236 | 250 | 230 |
| Zone 2 | 240 | 241 | 250 | 235 |
| Zone 3 | 246 | 245 | 250 | 240 |
| Zone 4 (Die) | 245 | 246 | 251 | 240 |
| Clamp Ring Temperature (° C.) | 245 | 245 | 250 | 240 |
| Inlet Adaptor Temperature (° C.) | 245 | 245 | 250 | 240 |
| Pump Temperature (° C.) | 245 | 245 | 250 | 240 |
| Outlet Adaptor 1 Temperature (° C.) | 244 | 246 | 250 | 240 |
| Outlet Adaptor 2 Temperature (° C.) | 245 | 246 | 250 | 240 |
| Melt Barrel Temperature (° C.) | 273 | 273 | 277 | 267 |
| Melt Pump Temperature (° C.) | 261 | 262 | 265 | 253 |
| Feed Block 1 Temperature (° C.) | 245 | 245 | 250 | 240 |
| Feed Block 2 Temperature (° C.) | 245 | 245 | 250 | 240 |
| Die 1 Temperature (° C.) | 245 | 245 | 250 | 245 |
| Die 2 Temperature (° C.) | 247 | 247 | 250 | 246 |
| Die 3 Temperature (° C.) | 245 | 245 | 250 | 246 |
| Die Lip Heater 1 Temperature (° C.) | 245 | 246 | 250 | 245 |
| Die Lip Heater 2 Temperature (° C.) | 245 | 245 | 244 | 245 |
| Screw AMPS | 9.71 | 9.14 | 8.50 | 9.42 |
| Screw Speed (RPM) | 140 | 155 | 132 | 147 |
| Melt Barrel Pressure (psig) | 1,219 | 1,216 | 1,294 | 1,292 |
| Pump AMPS | 0.42 | 0.38 | 0.39 | 0.43 |
| Pump Speed (RPM) | 15.9 | 16 | 17.1 | 18 |
| Melt Pump Pressure (psig) | — | — | — | — |
| Melt Adaptor (psig) | 525 | 503 | 703 | 454 |
| Die Pressure (psig) | 112.3 | 127 | 210 | 280.8 |
| Die Gap (inch) | 0.025 | 0.025 | 0.015 | 0.025 |
| Right Roll Speed (RPM) | 11.23 | 11.23 | 11.66 | 11.35 |
| Middle Roll Speed (RPM) | 11.26 | 11.26 | 11.66 | 11.37 |
| Left Roll Speed (RPM) | 1.23 | 11.23 | 11.64 | 11.35 |
| Haul-Off Roll Speed (RPM) | 11.35 | 11.26 | 11.71 | 11.44 |
| Right Roll Temperature (° F.) | 225 | 225 | 230 | 190 |
| Middle Roll Temperature (° F.) | 200 | 200 | 220 | 170 |
| Left Roll Temperature (° F.) | 175 | 170 | 175 | 150 |

20-mil Sheet Extruded from E-140 Compounds (See Table 11 Below)

With the exception of the 85/15 TOPAS 6013/E-140 compound (F09-38-12), the total haze was either equivalent to or lower for all compounds as compared to TOPAS 8007-F400 and TOPAS 9506X5. These results are consistent with thinner gauge films.

TABLE 11

Sheet Properties of 20-mil 8007 and 6013 Compounded with E-140 and Control Films - 9506X5 and 8007F-400

| | | Sample ID | | | | | | | |
|---|---|---|---|---|---|---|---|---|---|
| | | F09-69-2 | F09-49-1 | F09-38-7 | F09-38-8 | F09-38-10 | F09-38-9 | F09-38-12 | F09-38-11 |
| | | | | Description | | | | | |
| Property | Method | 9506X5 | 8007F-400 | C09-1-1<br>92.5% 8007<br>7.5% E-140 | C09-1-2<br>85% 8007<br>15% E-140 | C09-1-3<br>90% 6013<br>10% E-140 | C09-1-4<br>92.5%<br>6013X20T1<br>7.5% E-140 | C09-1-5<br>85% 6013<br>15% E-140 | C09-1-6<br>40% 6013<br>40% 8007<br>20% E-140 |
| Gauge (mil) | | 20 | 20 | 20 | 20 | 20 | 20 | 20 | 20 |
| Total Haze (%) | ASTM D1003-00 B | 43.0 | 69.5 | 29.3 | 48.9 | 44.6 | 34.2 | 68.9 | 42 |
| Clarity (%) | ASTM D1003-00 B | | 92.6 | 97.1 | 95.2 | 97.2 | 97.8 | 95.1 | 95 |
| Transmittance (%) | ASTM D1003-00 B | | 88.9 | 87.4 | 85.3 | 78.8 | 75.0 | 58.7 | 77 |

TABLE 11-continued

Sheet Properties of 20-mil 8007 and 6013 Compounded with E-140 and Control Films - 9506X5 and 8007F-400

| | | Sample ID | | | | | | | |
|---|---|---|---|---|---|---|---|---|---|
| | | F09-69-2 | F09-49-1 | F09-38-7 | F09-38-8 | F09-38-10 | F09-38-9 | F09-38-12 | F09-38-11 |
| | | | | | | Description | | | |
| Property | Method | 9506X5 | 8007F-400 | C09-1-1 92.5% 8007 7.5% E-140 | C09-1-2 85% 8007 15% E-140 | C09-1-3 90% 6013 10% E-140 | C09-1-4 92.5% 6013X20T1 7.5% E-140 | C09-1-5 85% 6013 15% E-140 | C09-1-6 40% 6013 40% 8007 20% E-140 |
| Gloss (20°) | ASTM D2457 | | 62 | 98 | 89 | 89 | 85 | 78 | 78 |
| Gloss (60°) | ASTM D2457 | 108 | 88 | 110 | 101 | 103 | 99 | 93 | 97 |
| Gloss (85°) | ASTM D2457 | | 97 | 100 | 98 | 99 | 99 | 97 | 97 |

Modified COCs for Nylon Replacement in Multilayer Films (See Table 12 Below)

COCs are blended with polyolefins such as LLDPE to improve processing, toughness and to reduce cost. However, this routine practice "dilutes" the benefits of using COCs, especially transparency. Modified COC offers impact resistance and little or no loss in stiffness, strength, heat resistance, transparency and moisture barrier. Resin cost neutral substitution of modified COCs for nylon and elimination of functional tie layers in multilayer films opens up new creative possibilities and advantages. Benefits include simplification of film structures; creation of an all olefin film structure with PP, HDPE, MDPE, LLDPE and COC; and improved sustainability.

Viability of modified COC substitution for nylon can be illustrated in a simple three layer structure. Nylon blend-tie-PE is a common food packaging structure (F09-2-2). Nylon blend is composed of 80/20 nylon 6 and amorphous nylon. Low total haze, high gloss and toughness are its attributes. Production scrap or reclaim cannot be used because the polymers are incompatible and will cause haziness. 6013 modified with TOPAS 9903-D10 and COC E and two layers of LLDPE is a simple nylon replacement example (F09-2-4). Functional tie layer materials are not needed in polyolefin coextrusion with COC. Nylon and functional tie layer resins are usually more expensive than polyolefin resins. Modified 6013 film was designed to be resin cost neutral to the nylon structure at 5.1 mil thickness. This modified 6013 film has higher 60 degree gloss and very good slow puncture resistance, especially puncture energy absorbed.

The replacement of nylon layers in multilayer packaging film with modified COC layers is illustrated in Table 12. Both "skin" layer and "core" layer type structures are included. Films with modified 8007 layers performed well; especially after splitting the core layer into two layers.

Advantages of nylon blend replacement are seen in multilayer structures where either nylon or the inventive blends are located in the core layer. In this structure, nylon layer requires two functional tie layers (F09-3-2). Modified cycloolefin structure can be simplified from a 5 layer to a 3 layer (F09-3-4); or the modified COC layer can be split into two layers (F09-3-6). For these examples, resin costs of the modified COC films are slightly less than the nylon structure. Three and five layer modified 6013 film (F09-3-4) and (F09-3-6) showed minor improvement in 60 degree gloss as compared to the nylon structure (F09-3-2). However, by splitting the modified 6013 into two layers (F09-3-6) all tensile properties are significantly improved, especially elongation at break.

TABLE 12

Modified COC with E-140 and 9903-D10 for Nylon Replacement in Packaging Films

| Film ID | | F09-2-2 | F09-2-4 | F09-3-2 |
|---|---|---|---|---|
| Description | | A: 72.2% o-LLDPE | A: 41% o-LLDPE | A: 31.3% o-LLDPE |
| | | B: 5.6% Tie (Elastomer) | B: 41% o-LLDPE | B: 5.3% Tie (elastomer) |
| | | C: 22.2% Nylon 6 Blend | C: 18% 6013F-04, Modified | C: 26.7% Nylon 6, Blend |
| | | | | D: 5.3% Tie (elastomer) |
| | | | | E: 31.3% o-LLDPE |
| Blend Composition | | Nylon 6 Blend 80% Ultramid B33 20% Selar PA-3426 | Modified COC 80% 6013F-04 10% 9903-D10 10% E-140 | Nylon 6 Blend 80% Ultramid B33 20% Selar PA-3426 |
| Property | Method | | | |
| Gauge (mil) | | 5.1 | 5.1 | 5.9 |
| COC Content (%) | | 0 | 18 | 0 |
| Material Cost ($/MSI) | | 0.159 | 0.165 | 0.207 |
| Haze (%) | ASTM D1003-00-B | 10.4 | 14 | 13 |
| Clarity (%) | ASTM D1003-00-B | 98.7 | 96.1 | 95.4 |
| Transmittance (%) | ASTM D1003-00-B | 90.3 | 89.8 | 90.4 |
| Gloss (60°) | ASTM D2457 | 115 | 132 | 117 |
| Slow Puncture | | | | |
| Resistance at Break (lbf) | ASTM F1306-90 (mod) | 9.5 | 10.4 | 13.4 |

TABLE 12-continued

Modified COC with E-140 and 9903-D10 for Nylon Replacement in Packaging Films

| | | | | |
|---|---|---|---|---|
| Displacement (in) | ASTM F1306-90 (mod) | 0.85 | 1.3 | 0.83 |
| Energy (lb-in) | ASTM F1306-90 (mod) | 5.12 | 9.68 | 6.98 |
| Fast Puncture | | | | |
| Resistance (lbf) | ISO 7765-2 (1994) B | 23.8 | 6.5 | 37.1 |
| Energy at peak Force (ft-lbs) | ISO 7765-2 (1994) B | 1.19 | 0.03 | 2.29 |
| Energy (ft-lbs) | ISO 7765-2 (1994) B | 1.40 | 0.10 | 2.80 |
| Tensile Modulus (1% Secant) | | | | |
| MD (psi) | ASTM D882-02 | 39,000 | 87,000 | 93,900 |
| TD (psi) | ASTM D882-02 | 82,000 | 101,000 | 90,000 |
| Tensile Break | | | | |
| MD (psi) | ASTM D882-02 | 4,500 | 2,800 | 4,900 |
| TD (psi) | ASTM D882-02 | 4,100 | 2,900 | 4,600 |
| Elong. Break | | | | |
| MD (%) | ASTM D882-02 | 293 | 155 | 268 |
| TD (%) | ASTM D882-02 | 229 | 255 | 248 |
| Tear Resistance | | | | |
| MD (grams) | ASTM D1922-06a | 1,394 | 397 | 490 |
| TD (grams) | ASTM D1922-06a | 1,138 | 366 | 406 |

| Film ID | | F09-3-4 | F09-3-6 |
|---|---|---|---|
| Description | | A: 32% o-LLDPE<br>B: 8% o-LLDPE<br>C: 20% 8007F-04, modified<br>D: 8% o-LLDPE<br>E: 32% o-LLDPE | A: 31% o-LLDPE<br>B: 10% 8007F-04, modified<br>C: 18% o-LLDPE<br>D: 10% 8007F-04, modified<br>E: 31% o-LLDPE |
| Blend Composition | | Modified COC<br>80% 8007F-04<br>10% 9903-D10<br>10% E-140 | Modified COC<br>80% 8007F-04<br>10% 9903-D10<br>10% E-140 |

| Property | Method | | |
|---|---|---|---|
| Gauge (mil) | | 5.9 | 5.9 |
| COC Content (%) | | 20 | 20 |
| Material Cost ($/MSI) | | 0.197 | 0.197 |
| Haze (%) | ASTM D1003-00-B | 16.8 | 16.9 |
| Clarity (%) | ASTM D1003-00-B | 91.0 | 96.3 |
| Transmittance (%) | ASTM D1003-00-B | 89.5 | 89.9 |
| Gloss (60°) | ASTM D2457 | 122 | 123 |
| Slow Puncture | | | |
| Resistance at Break (lbf) | ASTM F1306-90 (mod) | 11.0 | 11.8 |
| Displacement (in) | ASTM F1306-90 (mod) | 0.62 | 0.66 |
| Energy (lb-in) | ASTM F1306-90 (mod) | 4.83 | 5.21 |
| Fast Puncture | | | |
| Resistance (lbf) | ISO 7765-2 (1994) B | 25.9 | 26.8 |
| Energy at peak Force (ft-lbs) | ISO 7765-2 (1994) B | 0.68 | 0.75 |
| Energy (ft-lbs) | ISO 7765-2 (1994) B | 0.80 | 0.90 |
| Tensile Modulus (1% Secant) | | | |
| MD (psi) | ASTM D882-02 | 83,800 | 91,500 |
| TD (psi) | ASTM D882-02 | 78,000 | 86,500 |
| Tensile Break | | | |
| MD (psi) | ASTM D882-02 | 3,000 | 3,400 |
| TD (psi) | ASTM D882-02 | 2,900 | 3,100 |
| Elong. Break | | | |
| MD (%) | ASTM D882-02 | 80 | 164 |
| TD (%) | ASTM D882-02 | 62 | 150 |
| Tear Resistance | | | |
| MD (grams) | ASTM D1922-06a | 161 | 299 |
| TD (grams) | ASTM D1922-06a | 198 | 172 |

Multilayer COC Films

Mechanical properties of four COC containing films are compared against those of 5-layer nylon (F09-3-2) film. All films have essentially equivalent material cost on standard unit basis. All COC comparative films have simpler 3-layer structure consisting of 3.5 dg/mm melt flow, 0.912 density metallocene catalyzed LLDPE, manufactured by Exxon-Mobil as Exceed 3512 CB. 2 weight percent antiblock was added to most films to reduce tackiness. All core layers consisted of one or more TOPAS COC Polymers. COC film with TOPAS 8007F-400 (F10-49-2) had essentially equivalent high speed puncture resistance and elongation at break, but was much hazier and less glossy than the nylon film. Total high speed puncture energy and tear resistance was noticeably less than the nylon film and would not be a suitable nylon replacement film. Three remaining films contain E-140. It has been shown that two monolayer films consisting of 85/15 9903D-10/E-140 and 70/30 9506F-04/E-140 are very tough films and compare favorably to the mechanical performance of monolayer nylon blend film. Either structure as the COC core layer in a 3-layer nylon replacement film shows many similar properties to that of the 5-layer nylon film. Total haze, 60 degree gloss, high speed puncture resistance, tensile modulus and tear resistance for the COC film with 85/15 9903D-10/E-140 (F10-49-5) are essentially equivalent to the 5-layer nylon film. Elongation at break is much more, but tensile strength and high speed puncture energy were a little less. The COC films with 70/30 9506F-04/E-140 and 60/25/15 8007F-04/E-140/9903D-10 core layers offer better stiffness and elongation at break, but a little less puncture resistance, total puncture energy and tear resistance.

TABLE 13

Film Properties: Three Layer W/ COC Core For Nylon Replacement

| Compound ID | | F09-3-2 | | F10-49-2 | | F10-49-5 | |
|---|---|---|---|---|---|---|---|
| Description | | 31.30% o-LLDPE<br>5.30% Tie (elastomer)<br>26.70% Nylon Blend<br>5.30% Tie (elastomer)<br>31.30% o-LLDPE<br>Nylon 6 Blend:<br>80% Ultamid B33<br>20% Selar PA-3426 | | 40.0% Exceed 3512CB<br>20.0% 100% 8007F-400<br>40.0% Exceed 3512CB | | 40.0% Exceed 3512CB<br>20.0% 85% 9903D-10<br>15% E-140<br>40.0% Exceed 3512CB<br>Skin Layers 2%<br>Antiblock | |
| Property | Method | English | (Metric) | English | (Metric) | English | (Metric) |
| Gauge (mil) | | 5.9 | | 5.9 | | 5.9 | |
| Yield (lb/MSI) | | 0.208 | | 0.199 | | 0.198 | |
| Material Cost (August 2010) ($/MSI) | | 0.266 | | 0.247 | | 0.268 | |
| Haze (%) | ASTM D1003-00 B | 13 | | 38 | | 14 | |
| Clarity (%) | ASTM D1003-00 B | 95.4 | | 93 | | 98 | |
| Transmittance (%) | ASTM D1003-00 B | 90.4 | | 88 | | 89 | |
| Gloss (20°) | ASTM D2457 | | | 34 | | 89 | |
| Gloss (60°) | ASTM D2457 | 117 | | 84 | | 118 | |
| Gloss (85°) | ASTM D2457 | | | 94 | | 99 | |
| High Speed Puncture | ISO 7765-2: 1994(E) | | | | | | |
| Thickness (mil (mm)) | | 5.9 | | 5.8 | (0.147) | 6.0 | (0.153) |
| Peak Force (Resistance) (lbf (Newton)) | | 37.1 | | 35.1 | (156) | 38.9 | (173) |
| Deformation at Peak Force (inches (mm)) | | | | 0.52 | (13.1) | 1.23 | (31.3) |
| Energy at Peak Force (ft-lb (Joule)) | | 2.29 | | 0.95 | (1.29) | 1.73 | (2.34) |
| Total Energy (ft-lb (Joule)) | | 2.80 | | 1.04 | (1.41) | 1.85 | (2.51) |
| Tensile Modulus | ASTM D882-09 | | | | | | |
| MD (psi (Mpa)) | | 93,900 | | 140,000 | (966) | 78,400 | (541) |
| TD (psi (Mpa)) | | 90,000 | | 138,000 | (952) | 91,300 | (630) |
| Tensile Strength @ Yield | ASTM D882-09 | | | | | | |
| MD (psi (Mpa)) | | | | 2,490 | (17.2) | 1,840 | (12.7) |
| TD (psi (Mpa)) | | | | 2,590 | (17.9) | 1,770 | (12) |
| Elongation @ Yield | ASTM D882-09 | | | | | | |
| MD (%) | | | | 8 | | 4 | |
| TD (%) | | | | 8 | | 9 | |
| Tensile Strength @ Break | ASTM D882-09 | | | | | | |
| MD (psi (Mpa)) | | 4,900 | | 2,930 | (20.2) | 3,310 | (23) |
| TD (psi (Mpa)) | | 4,600 | | 3,030 | (20.9) | 3,420 | (24) |
| Elongation @ Break | ASTM D882-09 | | | | | | |
| MD (%) | | 268 | | 330 | | 500 | |
| TD (%) | | 248 | | 330 | | 510 | |
| Tear Resistance | ASTM D1922-09 | | | | | | |
| MD (grams) | | | (490) | | (125) | | (356) |
| TD (grams) | | | (406) | | (139) | | (374) |

TABLE 13-continued

Film Properties: Three Layer W/ COC Core For Nylon Replacement

| Compound ID | | F10-49-8 | | F10-49-11 | |
|---|---|---|---|---|---|
| Description | | 40.0% Exceed 3512CB | | 40.0% Exceed 3512CB | |
| | | 20.0% 70% 9506-F04 | | 20.0% 60% 8007-F04 | |
| | | 30% E-140 | | 25% E-140 | |
| | | 40.0% Exceed 3512CB | | 15% 99D3-10 | |
| | | | | 40.0% Exceed 3512CB | |
| | | Skin Layers 2% Antiblock | | Skin Layers 2% Antiblock | |
| Property | Method | English | (Metric) | English | (Metric) |
| Gauge (mil) | | 5.9 | | 5.9 | |
| Yield (lb/MSI) | | 0.198 | | 0.198 | |
| Material Cost (August 2010) ($/MSI) | | 0.269 | | 0.263 | |
| Haze (%) | ASTM D1003-00 B | 16 | | 16 | |
| Clarity (%) | ASTM D1003-00 B | 97 | | 96 | |
| Transmittance (%) | ASTM D1003-00 B | 89 | | 89 | |
| Gloss (20°) | ASTM D2457 | 73 | | 88 | |
| Gloss (60°) | ASTM D2457 | 116 | | 117 | |
| Gloss (85°) | ASTM D2457 | 100 | | 99 | |
| High Speed Puncture | ISO 7765-2: 1994(E) | | | | |
| Thickness (mil (mm)) | | 5.9 | (0.150) | 5.9 | (0.151) |
| Peak Force (Resistance) (lbf (Newton)) | | 34.4 | (153) | 34.4 | (153) |
| Deformation at Peak Force (inches (mm)) | | 0.62 | (15.8) | 0.61 | (15.6) |
| Energy at Peak Force (ft-lb (Joule)) | | 1.12 | (1.52) | 1.11 | (1.5) |
| Total Energy (ft-lb (Joule)) | | 1.32 | (1.79) | 1.34 | (1.82) |
| Tensile Modulus | ASTM D882-09 | | | | |
| MD (psi (Mpa)) | | 106,000 | (731) | 88,300 | (609) |
| TD (psi (Mpa)) | | 95,200 | (657) | 97,200 | (671) |
| Tensile Strength @ Yield | ASTM D882-09 | | | | |
| MD (psi (Mpa)) | | 2,010 | (13.9) | 2,090 | (14.4) |
| TD (psi (Mpa)) | | 1,970 | (14) | 2,010 | (14) |
| Elongation @ Yield | ASTM D882-09 | | | | |
| MD (%) | | 9 | | 9 | |
| TD (%) | | 12 | | 12 | |
| Tensile Strength @ Break | ASTM D882-09 | | | | |
| MD (psi (Mpa)) | | 3,220 | (22) | 3,250 | (22) |
| TD (psi (Mpa)) | | 3,400 | (23) | 3,390 | (23) |
| Elongation @ Break | ASTM D882-09 | | | | |
| MD (%) | | 450 | | 470 | |
| TD (%) | | 480 | | 500 | |
| Tear Resistance | ASTM D1922-09 | | | | |
| MD (grams) | | | (159) | | (166) |
| TD (grams) | | | (172) | | (174) |

Film structures described in Table 14 are similar to those described in Table 13. The difference is number of layers in the COC films is increased from 3 to 5 layers. COC layers are uniformly split into two layers. Thickness of the skin layers of metallocene catalyzed LLDPE are reduced to create a new core layer. Quantities of each resin, film yield and material cost are the same between the 3 and 5 layer films. However, distribution of these resins within the film structure accounts for the difference. COC film with TOPAS 8007F-400 (F10-50-2) had slightly better properties than the non-split layer version, including high speed puncture, tensile modulus and tensile strength. Total haze was much lower, 19 versus 38 percent; MD/TD elongation at break was much higher, 410/430 versus 330/330 percent; and MD/TD tear resistance was much higher, 192/214 versus 125/139 grams force. COC film with 85/15 9903D-10/E-140 (F10-50-5) had better high speed impact resistance and total energy, making this film equivalent to the 5-layer nylon blend film. Elongation at break and tear resistance are better.

The other two split layer COC films show similar enhancement in puncture and tensile properties versus the single layer counterpart. Appearance and tear resistant properties are similar. Performance of these films compares favorably to the 5-layer nylon film in most ways; and this is done at an equivalent material cost.

TABLE 14

Film Properties: Five Layer W/ Split COC Layer For Nylon Replacement

| | Compound ID | F09-3-2 | | F10-50-2 | | F10-50-5 | |
|---|---|---|---|---|---|---|---|
| | Description | 31.30% o-LLDPE | | 31.0% Exceed 3512CB | | 31.0% Exceed 3512CB | |
| | | 5.30% Tie (elastomer) | | 10.0% 100% 8007F-400 | | 10.0%: 85% 9903D-10; | |
| | | 26.70% Nylon Blend | | 18.0% Exceed 3512CB | | 15% E-140 | |
| | | 5.30% Tie (elastomer) | | 10.0% 100% 8007F-400 | | 18.0% Exceed 3512CB | |
| | | 31.30% o-LLDPE | | 31.0% Exceed 3512CB | | 10.0%: 85% 9903D-10; | |
| | | | | | | 15% E-140 | |
| | | | | | | 31.0% Exceed 3512CB | |
| | | Nylon 6 Blend: 80% | | Skin Layers 2% | | Skin Layers 2% | |
| | | Ultamid B33; 20% | | Antiblock | | Antiblock | |
| | | Selar PA-3426 | | | | | |
| Property | Method | English | (Metric) | English | (Metric) | English | (Metric) |
| Gauge (mil) | | 5.9 | | 5.9 | | 5.9 | |
| Yield (lb/MSI) | | 0.208 | | 0.199 | | 0.198 | |
| Material Cost (August 2010) ($/MSI) | | 0.266 | | 0.247 | | 0.268 | |
| Haze (%) | ASTM D1003-00 B | 13 | | 19 | | 13 | |
| Clarity (%) | ASTM D1003-00 B | 95.4 | | 97 | | 98 | |
| Transmittance (%) | ASTM D1003-00 B | 90.4 | | 89 | | 88 | |
| Gloss (20°) | ASTM D2457 | | | 90 | | 98 | |
| Gloss (60°) | ASTM D2457 | 117 | | 113 | | 123 | |
| Gloss (85°) | ASTM D2457 | | | 100 | | 100 | |
| High Speed Puncture | ISO 7765-2: 1994(E) | | | | | | |
| Thickness (mil (mm)) | | 5.9 | | 5.9 | (0.149) | 5.9 | (0.150) |
| Peak Force (Resistance) (lbf (Newton)) | | 37.1 | | 34.4 | (153) | 42.7 | (190) |
| Deformation at Peak Force (inches (mm)) | | | | 0.47 | (12) | 1.00 | (25.5) |
| Energy at Peak Force (ft-lb (Joule)) | | 2.29 | | 0.83 | (1.13) | 2.28 | (3.09) |
| Total Energy (ft-lb (Joule)) | | 2.80 | | 0.97 | (1.32) | 2.40 | (3.26) |
| Tensile Modulus | ASTM D882-09 | | | | | | |
| MD (psi (Mpa)) | | 93,900 | | 134,000 | (925) | 84,300 | (582) |
| TD (psi (Mpa)) | | 90,000 | | 139,000 | (959) | 51,800 | (357) |
| Tensile Strength @ Yield | ASTM D882-09 | | | | | | |
| MD (psi (Mpa)) | | | | 2,510 | (17.3) | 1,700 | (11.7) |
| TD (psi (Mpa)) | | | | 2,480 | (17.1) | 1,740 | (12) |
| Elongation @ Yield | ASTM D882-09 | | | | | | |
| MD (%) | | | | 8 | | 4 | |
| TD (%) | | | | 8 | | 13 | |
| Tensile Strength @ Break | ASTM D882-09 | | | | | | |
| MD (psi (Mpa)) | | 4,900 | | 3,370 | (23.3) | 3,420 | (24) |
| TD (psi (Mpa)) | | 4,600 | | 3,530 | (24.4) | 3,480 | (24) |
| Elongation @ Break | ASTM D882-09 | | | | | | |
| MD (%) | | 268 | | 410 | | 520 | |
| TD (%) | | 248 | | 430 | | 530 | |
| Tear Resistance | ASTM D1922-09 | | | | | | |
| MD (grams) | | | (490) | | (192) | | (344) |
| TD (grams) | | | (406) | | (214) | | (721) |

| | Compound ID | F10-50-8 | | F10-50-11 | |
|---|---|---|---|---|---|
| | Description | 31.0% Exceed 3512CB | | 31.0% Exceed 3512CB | |
| | | 10.0%: 70% 9506-F04; | | 10.0%: 60% 8007-F04; | |
| | | 30% E-140 | | 25% E-140; 15% 99D3-10 | |
| | | 18.0% Exceed 3512CB | | 18.0% Exceed 3512CB | |
| | | 10.0%: 70% 9506-F04; | | 10.0%: 60% 8007-F04; | |
| | | 30% E-140 | | 25% E-140; 15% 99D3-10 | |
| | | 31.0% Exceed 3512CB | | 31.0% Exceed 3512CB | |
| | | Skin Layers 2% Antiblock | | Skin Layers 2% Antiblock | |
| Property | Method | English | (Metric) | English | (Metric) |
| Gauge (mil) | | 5.9 | | 5.9 | |
| Yield (lb/MSI) | | 0.198 | | 0.198 | |
| Material Cost (August 2010) ($/MSI) | | 0.269 | | 0.263 | |
| Haze (%) | ASTM D1003-00 B | 16 | | 15 | |
| Clarity (%) | ASTM D1003-00 B | 97 | | 97 | |
| Transmittance (%) | ASTM D1003-00 B | 89 | | 89 | |
| Gloss (20°) | ASTM D2457 | 95 | | 89 | |
| Gloss (60°) | ASTM D2457 | 120 | | 117 | |

TABLE 14-continued

Film Properties: Five Layer W/ Split COC Layer For Nylon Replacement

| | | | | | |
|---|---|---|---|---|---|
| Gloss (85°) | ASTM D2457 | 100 | | 99 | |
| High Speed Puncture | ISO 7765-2: 1994(E) | | | | |
| Thickness (mil (mm)) | | 5.9 | (0.149) | 5.9 | (0.150) |
| Peak Force (Resistance) (lbf (Newton)) | | 40.9 | (182) | 38.9 | (173) |
| Deformation at Peak Force (inches (mm)) | | 0.82 | (20.8) | 0.72 | (18.3) |
| Energy at Peak Force (ft-lb (Joule)) | | 1.77 | (2.4) | 1.48 | (2.01) |
| Total Energy (ft-lb (Joule)) | | 1.94 | (2.63) | 1.70 | (2.30) |
| Tensile Modulus | ASTM D882-09 | | | | |
| MD (psi (Mpa)) | | 62,300 | (430) | 68,900 | (475) |
| TD (psi (Mpa)) | | 51,100 | (353) | 56,500 | (390) |
| Tensile Strength @ Yield | ASTM D882-09 | | | | |
| MD (psi (Mpa)) | | 1,990 | (13.7) | 2,210 | (15.2) |
| TD (psi (Mpa)) | | 1,880 | (13) | 2,000 | (14) |
| Elongation @ Yield | ASTM D882-09 | | | | |
| MD (%) | | 9 | | 4 | |
| TD (%) | | 13 | | 14 | |
| Tensile Strength @ Break | ASTM D882-09 | | | | |
| MD (psi (Mpa)) | | 3,550 | (24) | 3,700 | (26) |
| TD (psi (Mpa)) | | 3,680 | (25) | 3,740 | (26) |
| Elongation @ Break | ASTM D882-09 | | | | |
| MD (%) | | 500 | | 520 | |
| TD (%) | | 540 | | 530 | |
| Tear Resistance | ASTM D1922-09 | | | | |
| MD (grams) | | | (183) | | (188) |
| TD (grams) | | | (210) | | (237) |

Figure 16:
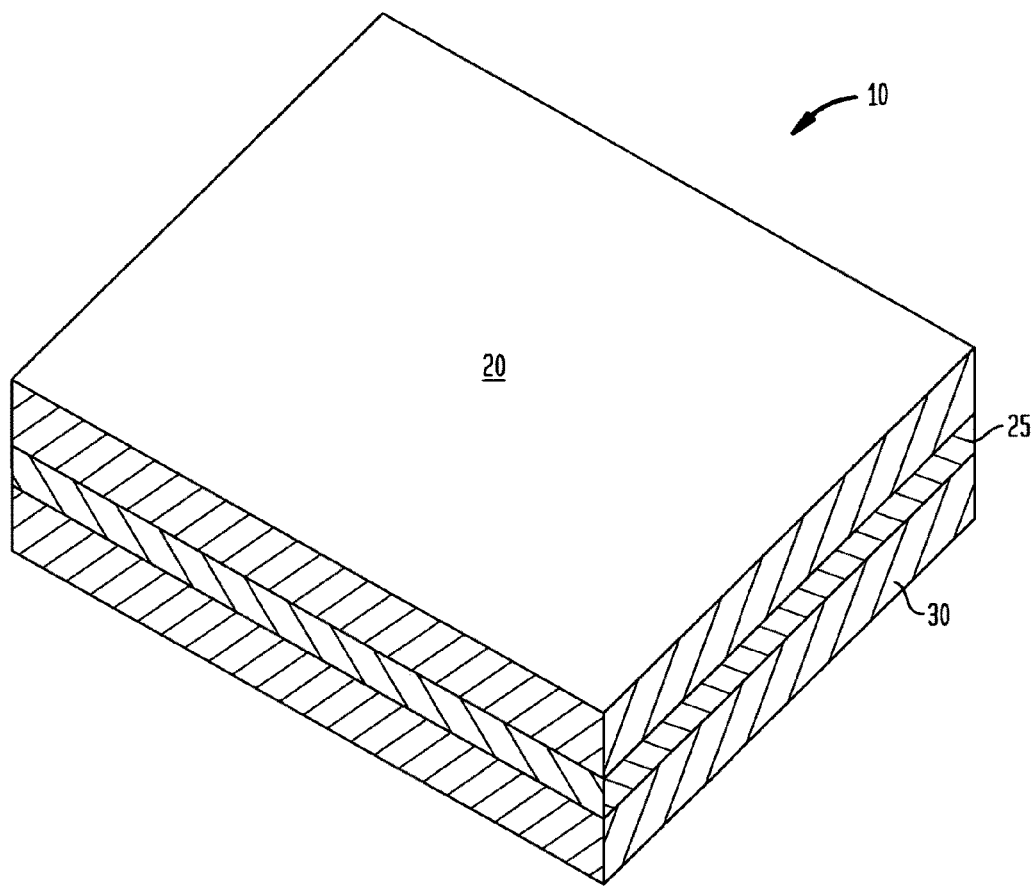
FIG. 16 is a view in perspective of a section of three (3) layer film continuously extruded in accordance with the invention.
Figure 17:
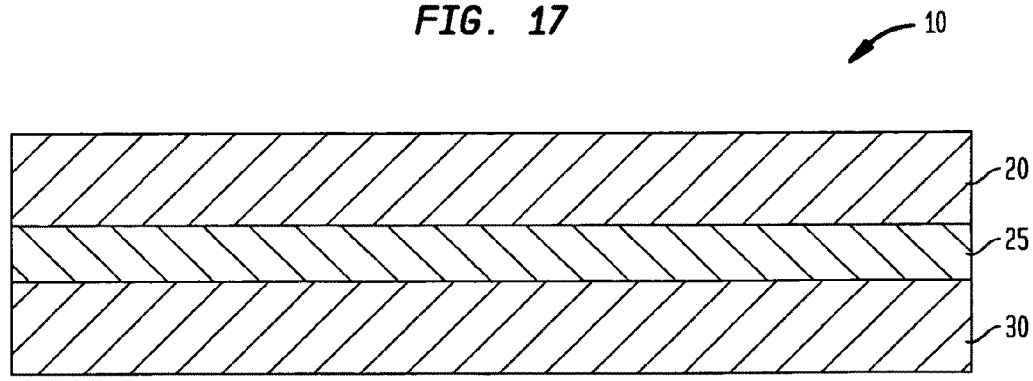
FIG. 17 is an enlarged cross-sectional view of the film of FIG. 16.

Multilayer films of the invention may thus be produced having the structures shown in FIGS. 16, 17, 18 and 19. FIGS. 16, 17 are schematic representations of a three (3) layer film 10 having a first outer layer 20 consisting essentially of LLDPE polymer, a core layer 25 consisting essentially of a melt-blend of the present invention and a second outer layer 30 consisting essentially of LLDPE polymer. Overall gauge is about five (5) mil and the relative amount of material in each layer is 40/40/20. Each of the layers is directly bonded to adjacent layers; that is, in surface-to-surface contact without tie layers to provide an all-olefin film.

Figure 18:
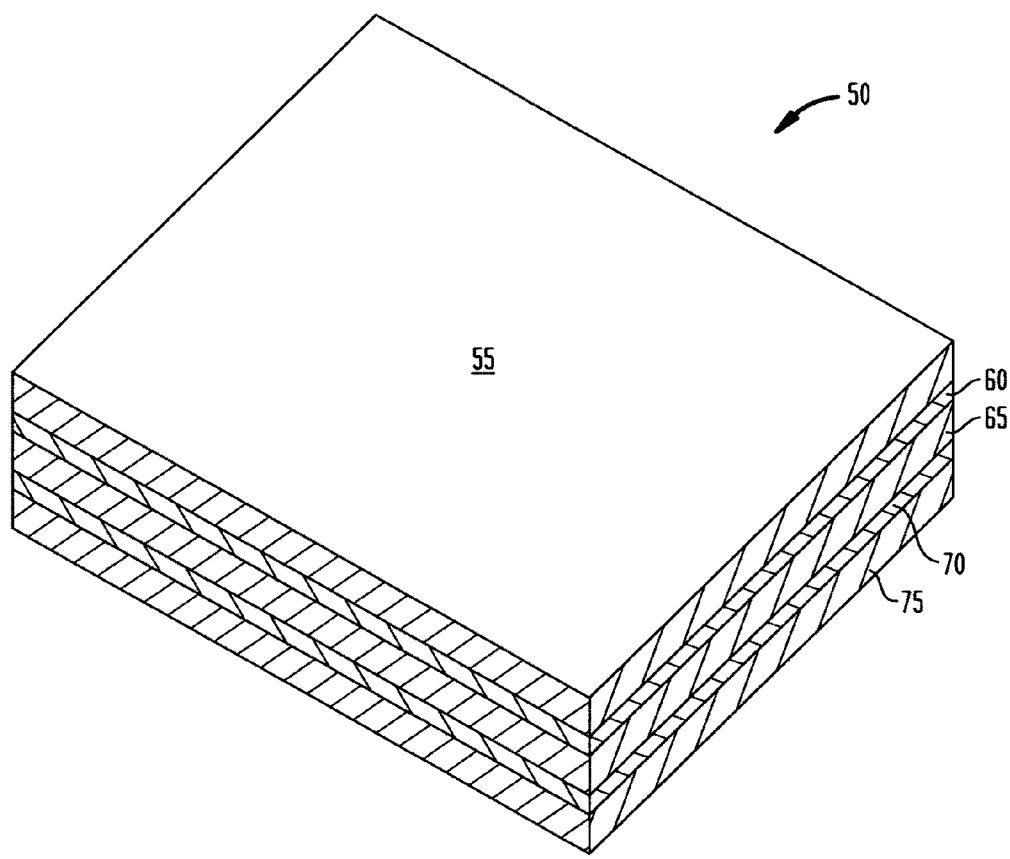
FIG. 18 is a view in perspective of a section of a five (5) layer film continuously extruded in accordance with the invention.
Figure 19:
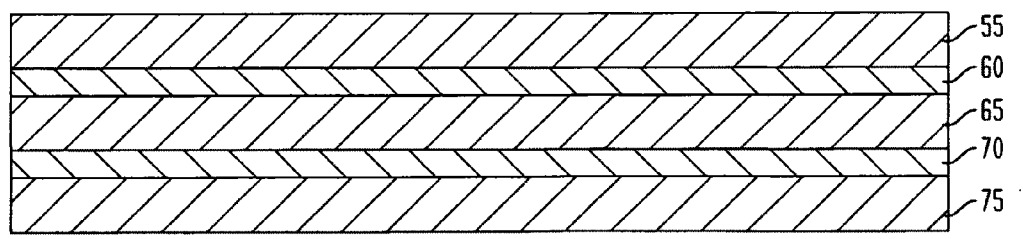
FIG. 19 is an enlarged cross-section view of the film of FIG. 18.

FIGS. 18, 19 are schematic representations of a five (5) layer film 50 having a first outer layer 55 consisting essentially of LLDPE polymer, a first core layer 60 consisting essentially of a melt-blend of the invention, a second core layer 65 consisting essentially of an LLDPE resin, a third core layer 70 consisting essentially of a melt-blend of the invention and a second outer layer 75 consisting essentially of an LLDPE resin. The relative amount of material in each layer is about 30/10/20/10/30 and the overall gauge is typically 5-6 mil. Here again, each of the layers is directly bonded to adjacent layers; that is, in continuous surface-to-surface contact without tie layers to provide an all-olefin film.

In the various multilayer films, There is optionally included in each layer recycle material including scrap reclaim from an extrusion line such that any layer may consist of one olefin polymer such as LLDPE or may be blended with varying levels of COC elastomer. So also, in single layer films, sheet, pellets and injection molded products, recycled material including scrap reclaim may be included.

Preferred Embodiments

From the foregoing discussion and examples, it will be apparent to one of skill in the art that among the various embodiments of the invention are those enumerated below.

Embodiment No. 1 is a melt-blend resin composition prepared by melt-blending: (a) from 60 parts to 99 parts per hundred weight resin in the blend of an amorphous cycloolefin polymer composition exhibiting a glass transition temperature (Tg) in the range of from 30° C. to 200° C.; and (b) from 40 parts to 1 part per hundred weight resin in the blend of a partially crystalline, cycloolefin elastomer of norbornene and ethylene having a glass transition temperature (Tg) of less than 30° C., a crystalline melting temperature of less than 125° C. and a % crystallinity by weight of 40% or less.

Embodiment No. 2 is the melt-blend resin composition according to Embodiment No. 1, wherein the blend contains from 65 parts to 97.5 parts per hundred weight resin in the blend of the amorphous cycloolefin copolymer composition exhibiting a glass transition temperature in the range of from 30° C. to 200° C. and from 35 parts to 2.5 parts per hundred weight of the partially crystalline cycloolefin elastomer of norbornene and ethylene having a glass transition temperature (Tg) of less than 30° C., a crystalline melting temperature of less than 125° C. and a % crystallinity by weight of 40% or less.

Embodiment No. 3 is the melt-blend resin composition according to Embodiment No. 1, wherein the blend contains from 75 parts to 95 parts per hundred weight resin in the blend of the amorphous cycloolefin copolymer composition exhibiting a glass transition temperature in the range of from 30° C. to 200° C. and from 25 parts to 5 parts per hundred weight of the partially crystalline cycloolefin elastomer of norbornene and ethylene having a glass transition temperature (Tg) of less than 30° C., a crystalline melting temperature of less than 125° C. and a % crystallinity by weight of 40% or less.

Embodiment No. 4 is the melt-blend resin composition according to Embodiment No. 1, wherein the blend contains from 85 parts to 92.5 parts per hundred weight resin in the blend of the amorphous cycloolefin copolymer composition exhibiting a glass transition temperature in the range of from 30° C. to 200° C. and from 15 parts to 7.5 parts per hundred weight of the partially crystalline cycloolefin elastomer of norbornene and ethylene having a glass transition temperature (Tg) of less than 30° C., a crystalline melting temperature of less than 125° C. and a % crystallinity by weight of 40% or less.

Embodiment No. 5 is the melt-blend resin composition according to Embodiment No. 1, wherein the blend contains from 77.5 parts to 82.5 parts per hundred weight resin in the blend of the amorphous cycloolefin copolymer composition exhibiting a glass transition temperature in the range of from 30° C. to 200° C. and from 17.5 parts to 22.5 parts per hundred weight of the partially crystalline cycloolefin elastomer of norbornene and ethylene having a glass transition temperature (Tg) of less than 30° C., a crystalline melting temperature of less than 125° C. and a % crystallinity by weight of 40% or less.

Embodiment No. 6 is the melt-blend resin composition according to Embodiment No. 1, wherein the amorphous cycloolefin copolymer composition has a Tg in the range of from 40° to 150° C.

Embodiment No. 7 is the melt-blend resin composition according to Embodiment No. 1, wherein the amorphous cycloolefin copolymer composition has a Tg in the range of from 100° to 135° C.

Embodiment No. 8 is the melt-blend resin composition according to Embodiment No. 1, wherein the amorphous cycloolefin copolymer composition has a Tg in the range of from 30° to 70° C.

Embodiment No. 9 is the melt-blend resin composition according to Embodiment No. 1, wherein the amorphous cycloolefin copolymer composition has a Tg in the range of from 30° to 40° C.

Embodiment No. 10 is the melt-blend resin composition according to Embodiment No. 1, wherein the partially crystalline elastomer of norbernene and ethylene has a glass transition temperature (Tg) in the range of from −10° C. to 15° C. and a crystalline melting temperature in the range of from 60° C. to 125° C. and a % crystallinity by weight in the range of from 2.5% to 40%.

Embodiment No. 11 is the melt-blend resin composition according to Embodiment No. 10, wherein the partially crystalline elastomer of norbornene and ethylene has a glass transition temperature (Tg) in the range of from 0° to 10° C.

Embodiment No. 12 is the melt-blend resin composition according to Embodiment No. 10, wherein the partially crystalline, cycloolefin elastomer of norbornene and ethylene exhibits a first glass transition temperature (Tg) in the range of from −10° C. to 15° C. and a second glass transition temperature (Tg) at less than −90° C.

Embodiment No. 13 is the melt-blend resin composition according to Embodiment No. 1, wherein the partially crystalline elastomer of norbornene has a Melt Volume Rate @ 230° C. and 2.16 kg load of from 0.25 to 25.

Embodiment No. 14 is the melt-blend resin composition according to Embodiment No. 10, wherein the partially crystalline elastomer of norbornene has a Melt Volume Rate @ 230° C. and 2.16 kg load of from 0.5 to 2.

Embodiment No. 15 is the melt-blend resin composition according to Embodiment No. 10, wherein the partially crystalline elastomer of norbornene has a Melt Volume Rate @ 230° C. and 2.16 kg load of from 2.5 to 4.5.

Embodiment No. 16 is the melt-blend resin composition according to Embodiment No. 10, wherein the partially crystalline elastomer of norbornene has a Melt Volume Rate @ 230° C. and 2.16 kg load of from 4 to 8.

Embodiment No. 17 is the melt-blend resin composition according to Embodiment No. 10, wherein the partially crystalline elastomer of norbornene has a Melt Volume Rate @ 230° C. and 2.16 kg load of from 8 to 15.

Embodiment No. 18 is the melt-blend resin composition according to Embodiment No. 10, wherein the partially crystalline elastomer of norbornene and ethylene has a melting temperature in the range of from 70° to 100° C.

Embodiment No. 19 is the melt-blend resin composition according to Embodiment No. 10, wherein the partially crystalline elastomer of norbornene and ethylene has a melting temperature in the range of from 80° to 90° C.

Embodiment No. 20 is the melt-blend resin composition according to Embodiment No. 10, wherein the partially crystalline elastomer of norbornene and ethylene has a % crystallinity by weight in the range of from 5% to 40%.

Embodiment No. 21 is the melt-blend resin composition according to Embodiment No. 10, wherein the partially crystalline elastomer of norbornene and ethylene has a % crystallinity by weight in the range of from 10% to 30%.

Embodiment No. 22 is the melt-blend resin composition according to Embodiment No. 10, wherein the partially crystalline elastomer of norbornene and ethylene has a norbornene content in the range of from 3 mol % to 20 mol %.

Embodiment No. 23 is the melt-blend resin composition according to Embodiment No. 10, wherein the partially crystalline elastomer of norbornene and ethylene has a norbornene content in the range of from 5 mol % to 15 mol %.

Embodiment No. 24 is the melt-blend resin composition according to Embodiment No. 10, wherein the partially crystalline elastomer of norbornene and ethylene has a norbornene content in the range of from 7 mol % to 11 mol %.

Embodiment No. 25 is the melt-blend resin composition according to Embodiment No. 10, wherein the partially crystalline elastomer of norbornene and ethylene has a weight average molecular weight in the range of from 25,000 to 500,000 Daltons.

Embodiment No. 26 is the melt-blend resin composition according to Embodiment No. 10, wherein the partially crystalline elastomer of norbornene and ethylene has a weight average molecular weight in the range of from 50,000 to 450,000 Daltons.

Embodiment No. 27 is the melt-blend resin composition according to Embodiment No. 10, wherein the partially crystalline elastomer of norbornene and ethylene has a weight average molecular weight in the range of from 75,000 to 300,000 Daltons.

Embodiment No. 28 is the melt-blend resin composition according to Embodiment No. 10, wherein the partially crystalline elastomer of norbornene and ethylene has a weight average molecular weight in the range of from 100,000 to 200,000 Daltons.

Embodiment No. 29 is the melt-blend resin composition according to Embodiment No. 10, wherein the partially crystalline elastomer of norbornene and ethylene exhibits a Melt Volume Rate @ 260° C. and 2.16 kg load of from 2 ml/10 min to 50 ml/10 min.

Embodiment No. 30 is the melt-blend resin composition according to Embodiment No. 10, wherein the partially crystalline elastomer of norbornene and ethylene exhibits a Melt Volume Rate @ 260° C. and 2.16 kg load of from 4 ml/10 min to 35 ml/10 min.

Embodiment No. 31 is the melt-blend resin composition according to Embodiment No. 10, wherein the partially crystalline elastomer of norbornene and ethylene exhibits a Melt Volume Rate @ 260° C. and 2.16 kg load of from 6 ml/10 min to 24 ml/10 min.

Embodiment No. 32 is the melt-blend resin composition according to Embodiment No. 10, wherein the partially crystalline elastomer of norbornene and ethylene exhibits a Melt Volume Rate @ 260° C. and 2.16 kg load of from 8 ml/10 min to 16 ml/10 min.

Embodiment No. 33 is the melt-blend resin composition according to Embodiment No. 1, wherein the partially crystalline elastomer exhibits an elongation at break of at least 50% at a temperature of −50° C.

Embodiment No. 34 is the melt-blend resin composition according to Embodiment No. 1, wherein the partially crystalline elastomer exhibits an elongation at break of at least 75% at a temperature of −50° C.

Embodiment No. 35 is the melt-blend resin composition according to Embodiment No. 1, wherein the partially crystalline elastomer exhibits an elongation at break of at least 100% at a temperature of −50° C.

Embodiment No. 36 is the melt-blend resin composition according to Embodiment No. 1, wherein the melt-blend resin composition consists essentially of (a) from 60 parts to 99 parts per hundred weight resin in the blend of an amorphous cycloolefin polymer composition exhibiting a glass transition temperature in the range of from 30° C. to 200° C.; and (b) from 40 parts to 1 part per hundred weight resin in the blend of a partially crystalline, cycloolefin elastomer of norbornene and ethylene having a glass transition temperature in the range of from −10° C. to 15° C. and a crystalline melting temperature in the range of from 60° C. to 125° C. and a % crystallinity by weight in the range of from 5% to 40%.

Embodiment No. 37 is the melt-blend resin composition according to Embodiment No. 1, wherein the composition exhibits characteristic localized stress whitening only upon high speed impact testing in accordance with ASTM Test Method D 3763.

Embodiment No. 38 is the melt-blend resin composition according to Embodiment No. 1, wherein the composition exhibits characteristic localized stress whitening only upon high speed impact testing in accordance with ASTM Test Method D 3763 and has a characteristic localized stress whitening index of less than 3.

Embodiment No. 39 is the melt-blend resin composition according to Embodiment No. 1, wherein the composition exhibits characteristic localized stress whitening only upon high speed impact testing in accordance with ASTM Test Method D 3763 and has a characteristic localized stress whitening index of less than 2.

Embodiment No. 40 is the melt-blend resin composition according to Embodiment No. 1, wherein the composition exhibits characteristic localized stress whitening only upon high speed impact testing in accordance with ASTM Test Method D 3763 and has a characteristic localized stress whitening index of less than 1.

Embodiment No. 41 is the melt-blend resin composition according to Embodiment No. 1, wherein the composition exhibits characteristic localized stress whitening only upon high speed impact testing in accordance with ASTM Test Method D 3763 and has a characteristic localized stress whitening index of less than 0.5.

Embodiment No. 42 is the melt-blend resin composition according to Embodiment No. 1, wherein the melt-blend resin composition is extruded into a film or sheet.

Embodiment No. 43 is the film or sheet according to Embodiment No. 42, wherein the film or sheet exhibits a Relative High Speed Impact Strength of at least 1.5 and up to 100.

Embodiment No. 44 is the film or sheet melt-blend resin composition according to Embodiment No. 42, wherein the film or sheet exhibits a Relative High Speed Impact Strength of at least 2.

Embodiment No. 45 is the film or sheet melt-blend resin composition according to Embodiment No. 42, wherein the film or sheet exhibits a Relative High Speed Impact Strength of at least 2.5.

Embodiment No. 46 is the film or sheet melt-blend resin composition according to Embodiment No. 42, wherein the film or sheet exhibits a Relative High Speed Impact Strength of at least 3.

Embodiment No. 47 is the film or sheet melt-blend resin composition according to Embodiment No. 42, wherein the film or sheet exhibits a Relative High Speed Impact Strength of from 2.5 to 15.

Embodiment No. 48 is a film according to Embodiment No. 42, wherein the film exhibits a 6 mil haze value of less than 20%.

Embodiment No. 49 is a film according to Embodiment No. 42, wherein the film exhibits a 6 mil haze value of less than 15%.

Embodiment No. 50 is a film according to Embodiment No. 42, wherein the film exhibits a 6 mil haze value of less than 10%.

Embodiment No. 51 is a film according to Embodiment No. 42, wherein the film exhibits a 6 mil haze value of less than 5%.

Embodiment No. 52 is a film according to Embodiment No. 42, wherein the film exhibits a 6 mil haze value of less than 2.5%.

Embodiment No. 53 is the melt-blend resin composition according to Embodiment No. 1, wherein the melt-blend resin composition is injection molded into a shaped article.

Embodiment No. 54 is the injection molded shaped article according to Embodiment No. 53, wherein the article exhibits a Relative High Speed Impact Strength of at least 1.5 and up to 100.

Embodiment No. 55 is the injection molded shaped article according to Embodiment No. 53, wherein the article exhibits a Relative High Speed Impact Strength of at least 2.

Embodiment No. 56 is the injection molded shaped article according to Embodiment No. 53, wherein the article exhibits a Relative High Speed Impact Strength of at least 2.5.

Embodiment No. 57 is the injection molded shaped article according to Embodiment No. 53, wherein the article exhibits a Relative High Speed Impact Strength of at least 3.

Embodiment No. 58 is the injection molded shaped article according to Embodiment No. 53, wherein the article exhibits a Relative High Speed Impact Strength of from 2.5 and up to 15.

Embodiment No. 59 is the melt-blend resin composition according to Embodiment No. 1, wherein the melt-blend further includes one or more of oxidative and thermal stabilizers, lubricants, release agents, flame-retarding agents, oxidation inhibitors, oxidation scavengers, neutralizers, antiblock agents, dyes, pigments and other coloring agents, ultraviolet light absorbers and stabilizers, organic or inorganic fillers including particulate and fibrous fillers, reinforcing agents, nucleators, plasticizers, waxes, melt adhesives, crosslinkers or vulcanizing agents and combinations thereof.

Embodiment No. 60 is a melt-blend resin composition prepared by melt-blending: (a) from 60 parts to 99 parts per hundred weight resin in the blend of an amorphous cycloolefin polymer composition consisting essentially of one or more copolymers of ethylene and norbornene exhibiting a glass transition temperature in the range of from 30° C. to 200° C.; and (b) from 40 parts to 1 part per hundred weight resin in the blend of a partially crystalline, cycloolefin elastomer of norbornene and ethylene having a glass transition temperature (Tg) of less than 30° C., a crystalline melting temperature of less than 125° C. and a % crystallinity by weight of 40% or less.

Embodiment No. 61 is the melt-blend resin composition according to Embodiment No. 60, comprising an amorphous cycloolefin polymer of ethylene and norbornene having a weight average molecular weight of from 25,000 Daltons to 400,000 Daltons.

Embodiment No. 62 is the melt-blend resin composition according to Embodiment No. 60, comprising an amorphous cycloolefin polymer of ethylene and norbornene having a weight average molecular weight of from 50,000 Daltons to 250,000 Daltons.

Embodiment No. 63 is the melt-blend resin composition according to Embodiment No. 60, comprising an amorphous cycloolefin polymer of ethylene and norbornene having a weight average molecular weight of from 75,000 Daltons to 150,000 Daltons.

Embodiment No. 64 is a melt-blend resin composition prepared by melt-blending: (a) from 20 parts to 60 parts per hundred weight resin in the blend of a first amorphous cycloolefin polymer composition exhibiting a first glass transition temperature (Tg); (b) from 20 parts to 60 parts per hundred weight resin in the blend of a second amorphous cycloolefin polymer composition exhibiting a second glass transition temperature (Tg) which differs from the first glass transition temperature of the first amorphous cycloolefin copolymer composition; and (c) from 25 parts to 1 part per hundred weight resin in the blend of a partially crystalline, cycloolefin elastomer of norbornene and ethylene having a glass transition temperature (Tg) of less than 30° C., a crystalline melting temperature of less than 125° C. and a % crystallinity by weight of 40% or less.

Embodiment No. 65 is the melt-blend resin composition according to Embodiment No. 64, wherein the first glass transition temperature (Tg) of the first amorphous cycloolefin polymer composition is in the range of from 30° C. to 70° C. and the second glass transition temperature (Tg) of the second amorphous cycloolefin polymer composition is in the range of from 75° C. to 200° C.

Embodiment No. 66 is the melt-blend resin composition according to Embodiment No. 64, wherein the first glass transition temperature (Tg) of the first amorphous cycloolefin polymer composition is in the range of from 30° C. to 70° C. and the second glass transition temperature (Tg) of the second amorphous cycloolefin polymer composition is in the range of from 120° C. to 200° C.

Embodiment No. 67 is the melt-blend resin composition according to Embodiment No. 64, wherein the first glass transition temperature (Tg) of the first amorphous cycloolefin polymer composition is in the range of from 30° C. to 70° C. and the second glass transition temperature (Tg) of the second amorphous cycloolefin polymer composition is in the range of from 75° C. to 120° C.

Embodiment No. 68 is the melt-blend resin composition according to Embodiment No. 64, wherein the first glass transition temperature (Tg) of the first amorphous cycloolefin polymer composition is in the range of from 30° C. to 50° C. and the second glass transition temperature (Tg) of the second amorphous cycloolefin polymer composition is in the range of from 75° C. to 200° C.

Embodiment No. 69 is the melt-blend resin composition according to Embodiment No. 64, wherein the first glass transition temperature (Tg) of the first amorphous cycloolefin polymer composition is in the range of from 30° C. to 50° C. and the second glass transition temperature (Tg) of the second amorphous cycloolefin polymer composition is in the range of from 120° C. to 200° C.

Embodiment No. 70 is the melt-blend resin composition according to Embodiment No. 64, wherein the first glass transition temperature (Tg) of the first amorphous cycloolefin polymer composition is in the range of from 30° C. to 50° C. and the second glass transition temperature (Tg) of the second amorphous cycloolefin polymer composition is in the range of from 75° C. to 120° C.

Embodiment No. 71 is the melt-blend resin composition according to Embodiment No. 64, wherein the first glass transition temperature (Tg) of the first amorphous cycloolefin polymer composition is in the range of from 55° C. to 100° C. and the second glass transition temperature (Tg) of the second amorphous cycloolefin polymer composition is in the range of from 120° C. to 200° C.

Embodiment No. 72 is the melt-blend resin composition according to any one of Embodiment Nos. 64 to 71 wherein the melt-blend resin composition consists essentially of a ternary mixture of the first amorphous cycloolefin polymer composition and the second amorphous cycloolefin polymer composition and the partially crystalline, cycloolefin elastomer of norbornene and ethylene which has a glass transition temperature (Tg) in the range of from −10° C. to 15° C., a crystalline melting temperature in the range of from 60° C. to 125° C. and a % crystallinity by weight in the range of from 5% to 40%.

Embodiment No. 73 is the melt-blend resin composition according to any one of Embodiment Nos. 64 to 72, wherein the first amorphous cycloolefin polymer composition is miscible with the second amorphous cycloolefin polymer composition as characterized by a single glass transition temperature (Tg) intermediate of the glass transition of the first amorphous cycloolefin polymer composition and the second amorphous cycloolefin polymer composition.

Embodiment No. 74 is the melt-blend resin composition according to anyone of Embodiment Nos. 64 to 72, wherein the first amorphous cycloolefin polymer composition consists essentially of a first copolymer of ethylene and norbornene and second amorphous cycloolefin polymer composition consists essentially of a second copolymer of ethylene and norbornene.

Embodiment No. 75 is a melt-blend resin composition prepared by melt-blending: (a) from 60 parts to 94.5 parts per hundred weight resin in the blend of an amorphous cycloolefin polymer composition exhibiting a glass transition temperature (Tg) in the range of from 30° C. to 200° C.; (b) from 30-5 parts by weight of a thermoplastic elastomer; and (c) from 10 parts to 0.5 parts per hundred weight resin in the blend of a partially crystalline, cycloolefin elastomer of norbornene and ethylene having a glass transition temperature (Tg) of less than 30° C., a crystalline melting temperature of less than 125° C. and a % crystallinity by weight of 40% or less.

Embodiment No. 76 is the melt-blend resin according to Embodiment No. 75, wherein the thermoplastic elastomer is selected from styrene/butadiene block copolymers (SBS), styrene/ethylene/butadiene block copolymers (SEBS), styrene/isoprene block copolymers (SIS) and styrene/ethylene/propylene block copolymers (SEPS).

Embodiment No. 77 is the melt-blend resin according to Embodiment No. 76, wherein the thermoplastic elastomer is a SEBS block copolymer.

Embodiment No. 78 is the melt-blend resin according to Embodiment No. 75, wherein the composition contains from 5 to 0.75 parts per hundred weight resin in the blend of the partially crystalline cycloolefin elastomer.

Embodiment No. 79 is the melt-blend resin according to Embodiment No. 75, wherein the composition contains from 3 to 1 parts per hundred weight resin in the blend of the partially crystalline cycloolefin elastomer.

Embodiment No. 80 is a multilayer, all-olefin film comprising a layer formed of a blend comprising: (a) from 60 parts to 99 parts per hundred weight resin in the blend of an amorphous cycloolefin polymer composition exhibiting a glass transition temperature (Tg) in the range of from 30° C. to 200° C.; and (b) from 40 parts to 1 part per hundred weight resin in the blend of a partially crystalline, cycloolefin elastomer of norbornene and ethylene having a glass transition temperature (Tg) of less than 30° C., a crystalline melting temperature (Tg) of less than 125° C. and a % crystallinity by weight of 40% or less.

Embodiment No. 81 is the all-olefin multilayer film according to Embodiment No. 80, having at least 3 layers.

Embodiment No. 82 is the all-olefin multilayer film according to Embodiment No. 81, wherein said film is prepared without tie layers.

Embodiment No. 83 is the all-olefin multilayer film according to Embodiment No. 82, wherein at least one layer comprises linear low density polyethylene.

Embodiment No. 84 is the all-olefin multilayer film according to Embodiment No. 83, wherein at least two layers comprise linear low density polyethylene.

Embodiment No. 85 is the all-olefin multilayer film according to Embodiment No. 81, wherein at least two layers comprise linear low density polyethylene.

Embodiment No. 86 is the all-olefin multilayer film according to Embodiment No. 81, wherein the film has two outer polyethylene layers and a core layer formed of a blend comprising: (a) from 60 parts to 99 parts per hundred weight resin in the blend of an amorphous cycloolefin polymer composition exhibiting a glass transition temperature (Tg) in the range of from 30° C. to 200° C.; and (b) from 40 parts to 1 part per hundred weight resin in the blend of a partially crystalline, cycloolefin elastomer of norbornene and ethylene having a glass transition temperature (Tg) in the range of from −10° C. to 15° C. and a crystalline melting temperature in the range of from 60° C. to 125° C. and a % crystallinity by weight in the range of from 5% to 40%.

Embodiment No. 87 is the all-olefin multi layer film according to Embodiment No. 80, having at least 5 layers.

Embodiment No. 88 is the all-olefin multilayer film according to Embodiment No. 87, wherein said film is prepared without tie layers.

Embodiment No. 89 is the all-olefin multilayer film according to Embodiment No. 80, wherein the film has two outer polyethylene layers and at least one core layer formed of a blend comprising: (a) from 60 parts to 99 parts per hundred weight resin in the blend of an amorphous cycloolefin polymer composition exhibiting a glass transition temperature (Tg) in the range of from 30° C. to 200° C.; and (b) from 40 parts to 1 part per hundred weight resin in the blend of a partially crystalline, cycloolefin elastomer of norbornene and ethylene having a glass transition temperature (Tg) in the range of from −10° C. to 15° C. and a crystalline melting temperature in the range of from 60° C. to 125° C. and a % crystallinity by weight in the range of from 5% to 40%.

Embodiment No. 90 is an all-olefin multilayer film according to any of Embodiment Nos. 80 to 89, wherein the film exhibits a 6 mil haze value of less than 20%

Embodiment No. 91 is an all-olefin multilayer film according to any of Embodiment Nos. 80 to 89, wherein the film exhibits a 6 mil haze value of less than 15%

Embodiment No. 92 is an all-olefin multilayer film according to any of Embodiment Nos. 80 to 89, wherein the film exhibits a 6 mil haze value of less than 10%

Embodiment No. 93 is an all-olefin multilayer film according to any of Embodiment Nos. 80 to 89, wherein the film exhibits a 6 mil haze value of less than 5%.

Embodiment No. 94 is an all-olefin multilayer film according to any of Embodiment Nos. 80 to 89, wherein the film exhibits a 6 mil haze value of less than 2.5%.

Embodiment No. 95 is a method of making a melt-blended film or sheet comprising: (a) preparing a molten resin blend composition by melt-blending: (i) from 60 parts to 99 parts per hundred weight resin in the blend of an amorphous cycloolefin polymer composition exhibiting a glass transition temperature in the range of from 30° C. to 200° C.; and (ii) from 40 parts to 1 part per hundred weight resin in the blend of a partially crystalline, cycloolefin elastomer of norbornene and ethylene having a glass transition temperature (Tg) of less than 30° C., a crystalline melting temperature of less than 125° C. and a % crystallinity by weight of 40% or less; and (b) contemporaneously with step (a), extruding the melt-blended resin composition into a film.

Embodiment No. 96 is the method of making a melt-blended film or sheet according to Embodiment No. 95, wherein the amorphous cycloolefin polymer composition and the cycloolefin elastomer of norbornene and ethylene are fed to an extruder as dry blended salt and pepper pellet mixture of a first pellet ensemble including the amorphous cycloolefin polymer composition and a second pellet ensemble including the partially crystalline, cycloolefin elastomer of norbornene and ethylene which has a glass transition temperature (Tg) in the range of from −10° C. to 15° C. and a crystalline melting temperature in the range of from 60° C. to 125° C. and a % crystallinity by weight in the range of from 5% to 40%.

Embodiment No. 97 is the film or sheet prepared according to Embodiment No. 96, wherein the film or sheet exhibits a Relative High Speed Impact Strength of at least 1.5 and up to 100.

Embodiment No. 98 is the film or sheet prepared according to Embodiment No. 96, wherein the film or sheet melt-blend exhibits a Relative High Speed Impact Strength of at least 2.

Embodiment No. 99 is the film or sheet prepared according to Embodiment No. 96, wherein the film or sheet melt-blend exhibits a Relative High Speed Impact Strength of at least 2.5.

Embodiment No. 100 is the film or sheet prepared according to Embodiment No. 96, wherein the film or sheet melt-blend exhibits a Relative High Speed Impact Strength of at least 3.

Embodiment No. 101 is the film or sheet prepared according to Embodiment No. 96, wherein the film or sheet melt-blend exhibits a Relative High Speed Impact Strength of from 2.5 to 15.

Embodiment No. 102 is a method of making an injection molded shaped article comprising: (a) preparing a resin blend composition by melt-blending: (i) from 60 parts to 99 parts per hundred weight resin in the blend of an amorphous cycloolefin polymer composition exhibiting a glass transition temperature in the range of from 30° C. to 200° C.; and (ii) from 40 parts to 1 part per hundred weight resin in the blend of a partially crystalline, cycloolefin elastomer of norbornene and ethylene having a glass transition temperature (Tg) of less than 30° C., a crystalline melting temperature of less than 125° C. and a % crystallinity by weight of 40% or less; and (b) injection molding the melt-blended resin composition into a shaped article.

Embodiment No. 103 is the method of making an injection molded shaped article according to Embodiment No. 102, wherein the injection molded shaped article contains one or more of oxidative and thermal stabilizers, lubricants, release agents, flame-retarding agents, oxidation inhibitors, oxidation scavengers, neutralizers, dyes, pigments and other coloring agents, ultraviolet light absorbers and stabilizers, organic or inorganic fillers including particulate and fibrous fillers, reinforcing agents, nucleators, plasticizers, waxes, crosslinkers or vulcanizing agents and combinations thereof.

Embodiment No. 104 is the method of making an injection molded shaped article according to Embodiment No. 102, wherein the injection molded shaped article exhibits a Relative High Speed Impact Strength of at least 1.5 and up to 100.

Embodiment No. 105 is the method of making an injection molded shaped article according to Embodiment No. 102, wherein the injection molded shaped article exhibits a Relative High Speed Impact Strength of at least 2.

Embodiment No. 106 is the method of making an injection molded shaped article according to Embodiment No. 102, wherein the injection molded shaped article exhibits a Relative High Speed Impact Strength of at least 2.5.

Embodiment No. 107 is the method of making an injection molded shaped article according to Embodiment No. 102, wherein the injection molded shaped article exhibits a Relative High Speed Impact Strength of at least 3.

Embodiment No. 108 is the method of making an injection molded shaped article according to Embodiment No. 102, wherein the injection molded shaped article exhibits a Relative High Speed Impact Strength of from 2.5 to 15.

While the invention has been described in detail, modifications within the spirit and scope of the invention will be readily apparent to those of skill in the art. In view of the foregoing discussion, relevant knowledge in the art and references including co-pending applications discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A melt-blend resin composition prepared by melt-blending:
    (a) from 60 parts to 99 parts per hundred weight resin in the blend of an amorphous cycloolefin polymer composition exhibiting a glass transition temperature (Tg) in the range of from 30° C. to 200° C.; and
    (b) from 40 parts to 1 part per hundred weight resin in the blend of a partially crystalline, cycloolefin copolymer elastomer of norbornene and ethylene having a glass transition temperature (Tg) of less than 30° C., a crystalline melting temperature in the range of from 60° C. to 125° C. and a % crystallinity by weight of 40% or less.

2. The melt-blend resin composition according to claim 1, wherein the partially crystalline cycloolefin copolymer elastomer of norbernene and ethylene has a glass transition temperature (Tg) in the range of from −10° C. to 15° C. and a % crystallinity by weight in the range of from 2.5% to 40%.

3. The melt-blend resin composition according to claim 1, wherein the partially crystalline cycloolefin copolymer elastomer of norbornene and ethylene has a norbornene content in the range of from 3 mol % to 20 mol %.

4. The melt-blend resin composition according to claim 3, wherein the partially crystalline cycloolefin copolymer elastomer of norbornene and ethylene has a norbornene content in the range of from 5 mol % to 15 mol %.

5. The melt-blend resin composition according to claim 1, wherein the melt-blend resin composition consists essentially of:
    (a) from 60 parts to 99 parts per hundred weight resin in the blend of an amorphous cycloolefin polymer composition exhibiting a glass transition temperature in the range of from 30° C. to 200° C.; and
    (b) from 40 parts to 1 part per hundred weight resin in the blend of a partially crystalline, cycloolefin copolymer elastomer of norbornene and ethylene having a glass transition temperature in the range of from −10° C. to 15° C. and a crystalline melting temperature in the range of from 60° C. to 125° C. and a % crystallinity by weight in the range of from 5% to 40%.

6. The melt-blend resin composition according to claim 1, wherein the composition exhibits characteristic localized stress whitening only upon high speed impact testing in accordance with ASTM Test Method D 3763 and has a characteristic localized stress whitening index of less than 3.

7. The melt-blend resin composition according to claim 1, wherein the melt-blend resin composition is extruded into a film or sheet.

8. The film or sheet according to claim 7, wherein the film or sheet exhibits a Relative High Speed Impact Strength of at least 1.5 and up to 100.

9. The film or sheet melt-blend resin composition according to claim 8, wherein the film or sheet exhibits a Relative High Speed Impact Strength of at least 2.

10. A film according to claim 7, wherein the film exhibits a 6 mil haze value of less than 20%.

11. The melt-blend resin composition according to claim 1, wherein the melt-blend resin composition is injection molded into a shaped article.

12. A melt-blend resin composition prepared by melt-blending:
    (a) from 20 parts to 60 parts per hundred weight resin in the blend of a first amorphous cycloolefin polymer composition exhibiting a first glass transition temperature (Tg);
    (b) from 20 parts to 60 parts per hundred weight resin in the blend of a second amorphous cycloolefin polymer composition exhibiting a second glass transition temperature (Tg) which differs from the first glass transition temperature of the first amorphous cycloolefin copolymer composition; and
    (c) from 25 parts to 1 part per hundred weight resin in the blend of a partially crystalline, cycloolefin copolymer elastomer of norbornene and ethylene having a glass transition temperature (Tg) of less than 30° C., a crystalline melting temperature in the range of from 60° C. to 125° C. and a % crystallinity by weight of 40% or less.

13. A melt-blend resin composition prepared by melt-blending:
(a) from 60 parts to 94.5 parts per hundred weight resin in the blend of an amorphous cycloolefin polymer composition exhibiting a glass transition temperature (Tg) in the range of from 30° C. to 200° C.;
(b) from 30-5 parts by weight of a thermoplastic elastomer; and
(c) from 10 parts to 0.5 parts per hundred weight resin in the blend of a partially crystalline, cycloolefin copolymer elastomer of norbornene and ethylene having a glass transition temperature (Tg) of less than 30° C., a crystalline melting temperature in the range of from 60° C. to 125° C. and a % crystallinity by weight of 40% or less.

14. The melt-blend resin composition according to claim 13, wherein the thermoplastic elastomer is selected from styrene/butadiene block copolymers (SBS), styrene/ethylene/butadiene block copolymers (SEBS), styrene/isoprene block copolymers (SIS) and styrene/ethylene/propylene block copolymers (SEPS).

15. The melt-blend resin composition according to claim 13, wherein the thermoplastic elastomer is a SEBS block copolymer.

16. The melt-blend resin composition according to claim 13, wherein the composition contains from 5 to 0.75 parts per hundred weight resin in the blend of the partially crystalline cycloolefin copolymer elastomer.

17. The melt-blend resin composition according to claim 13, wherein the composition contains from 3 to 1 parts per hundred weight resin in the blend of the partially crystalline cycloolefin copolymer elastomer.

18. The melt-blend resin composition according to claim 1, wherein the partially crystalline cycloolefin copolymer elastomer of norbornene and ethylene has a % crystallinity by weight in the range of from 10% to 30%.

19. The melt-blend resin composition according to claim 12, wherein the partially crystalline cycloolefin copolymer elastomer of norbornene and ethylene has a % crystallinity by weight in the range of from 10% to 30%.

20. The melt-blend resin composition according to claim 13, wherein the partially crystalline cycloolefin copolymer elastomer of norbornene and ethylene has a % crystallinity by weight in the range of from 10% to 30%.

* * * * *